US008446254B2

(12) United States Patent
Carrick et al.

(10) Patent No.: US 8,446,254 B2
(45) Date of Patent: May 21, 2013

(54) METHODS AND APPARATUSES FOR RFID TAG RANGE DETERMINATION

(75) Inventors: John C. Carrick, Wakefield, MA (US); Yael G. Maguire, Somerville, MA (US)

(73) Assignee: ThingMagic, Inc., Cambridge, MA (US)

( * ) Notice: Subject to any disclaimer, the term of this patent is extended or adjusted under 35 U.S.C. 154(b) by 719 days.

(21) Appl. No.: 12/611,687

(22) Filed: Nov. 3, 2009

(65) Prior Publication Data

US 2010/0109844 A1    May 6, 2010

Related U.S. Application Data

(60) Provisional application No. 61/110,670, filed on Nov. 3, 2008.

(51) Int. Cl.
| | |
|---|---|
| *H04Q 5/22* | (2006.01) |
| *G08B 13/14* | (2006.01) |
| *G08B 1/08* | (2006.01) |
| *G08C 19/12* | (2006.01) |
| *G01S 13/08* | (2006.01) |
| *G01S 13/00* | (2006.01) |
| *G01S 5/02* | (2010.01) |

(52) U.S. Cl.
USPC ....... 340/10.1; 340/10.2; 340/10.3; 340/10.4; 340/10.5; 340/10.6; 340/572.1; 340/572.2; 340/572.3; 340/572.4; 340/572.5; 340/539.13; 340/539.21; 340/539.23; 340/13.26; 342/131; 342/70; 342/127; 342/442

(58) Field of Classification Search
USPC ................................................ 342/118–146
See application file for complete search history.

(56) References Cited

U.S. PATENT DOCUMENTS

| | | | |
|---|---|---|---|
| 4,851,851 | A | 7/1989 | Hane |
| 5,025,260 | A | 6/1991 | Colquhoun et al. |
| 5,583,850 | A | 12/1996 | Snodgrass et al. |
| 5,767,409 | A | 6/1998 | Yamaguchi |
| 5,923,284 | A | 7/1999 | Artis et al. |
| 5,969,254 | A | 10/1999 | Yamaguchi |
| 5,974,078 | A | 10/1999 | Tuttle et al. |
| 5,986,570 | A | 11/1999 | Black et al. |
| 6,046,683 | A | 4/2000 | Pidwerbetsky et al. |
| 6,084,530 | A | 7/2000 | Pidwerbetsky et al. |

(Continued)

OTHER PUBLICATIONS

Muehlmann et al., "Two-Frequency CW Radar Approach to Ranging in UHF RFID Systems", Proceedings of the European Microwave Asociation vol. 4, Dec. 2007; 317-322.

(Continued)

*Primary Examiner* — Daniel Wu
*Assistant Examiner* — Muhammad Adnan
(74) *Attorney, Agent, or Firm* — Foley & Lardner LLP; John D. Lanza

(57) ABSTRACT

Apparatus and methods are described which are useful for determining a location characteristic between an RFID tag and an RFID tag reader or a second RFID tag. In various embodiments, signals backscattered from a singulated tag over a range of frequencies are evaluated for in-phase I and in-quadrature Q signal components. The I-Q data is processed to determine phase delay angles associated with each signal frequency. The phase delay data can be processed by a sum of squared errors method or Fourier transform method to determine a distance to the singulated tag. The methods can also be used to determine any of a location, a radial velocity, a directional velocity of the singulated tag, and proximity of the singulated tag to a second tag.

20 Claims, 20 Drawing Sheets

U.S. PATENT DOCUMENTS

| | | |
|---|---|---|
| 6,259,991 B1 | 7/2001 | Nysen |
| 6,313,795 B1 * | 11/2001 | Herrmann et al. ............ 342/442 |
| 6,375,780 B1 | 4/2002 | Tuttle et al. |
| 6,396,438 B1 | 5/2002 | Seal |
| 6,414,626 B1 | 7/2002 | Greef et al. |
| 6,434,506 B1 | 8/2002 | Eckersten et al. |
| 6,452,504 B1 | 9/2002 | Seal |
| 6,456,239 B1 | 9/2002 | Werb et al. |
| 6,499,656 B1 | 12/2002 | Marsh et al. |
| 6,621,467 B1 | 9/2003 | Marsh |
| 6,703,967 B1 | 3/2004 | Kuroda et al. |
| 6,731,908 B2 | 5/2004 | Berliner et al. |
| 6,859,761 B2 | 2/2005 | Bensky et al. |
| 6,868,073 B1 | 3/2005 | Carrender |
| 6,898,415 B2 | 5/2005 | Berliner et al. |
| 6,909,366 B1 | 6/2005 | Marsh et al. |
| 7,030,761 B2 | 4/2006 | Bridgelall et al. |
| 7,071,868 B2 | 7/2006 | Woodington et al. |
| 7,119,738 B2 * | 10/2006 | Bridgelall et al. ............ 342/129 |
| 7,170,412 B2 | 1/2007 | Knox et al. |
| 7,205,931 B2 | 4/2007 | Gila et al. |
| 7,265,674 B2 | 9/2007 | Tuttle |
| 7,355,545 B2 | 4/2008 | Zemany et al. |
| 7,460,052 B2 | 12/2008 | Zemany et al. |
| 7,574,732 B2 | 8/2009 | Knox et al. |
| 2004/0135992 A1 * | 7/2004 | Munro ........................ 356/4.01 |
| 2004/0208523 A1 | 10/2004 | Carrick et al. |
| 2005/0237953 A1 | 10/2005 | Carrender et al. |
| 2005/0285739 A1 * | 12/2005 | Velhal et al. ............... 340/572.1 |
| 2006/0284727 A1 | 12/2006 | Steinke |
| 2006/0293018 A1 | 12/2006 | Reynolds |
| 2007/0001814 A1 * | 1/2007 | Steinke et al. ............ 340/10.31 |
| 2007/0241904 A1 * | 10/2007 | Ozaki et al. ................ 340/572.1 |
| 2007/0257795 A1 | 11/2007 | Overhultz |
| 2007/0268136 A1 | 11/2007 | Adamec et al. |
| 2007/0280369 A1 | 12/2007 | Reynolds |
| 2007/0285245 A1 | 12/2007 | Djuric et al. |
| 2008/0018327 A1 | 1/2008 | Reynolds |
| 2008/0030422 A1 | 2/2008 | Gevargiz et al. |
| 2008/0143584 A1 | 6/2008 | Shoarinejad et al. |
| 2008/0186136 A1 * | 8/2008 | Raphaeli et al. ............ 340/10.1 |
| 2009/0212921 A1 * | 8/2009 | Wild et al. .................. 340/10.5 |
| 2010/0034313 A1 * | 2/2010 | Benavides .................. 375/268 |
| 2010/0039311 A1 * | 2/2010 | Woodington et al. ........... 342/70 |
| 2011/0090062 A1 | 4/2011 | Hofer et al. |

OTHER PUBLICATIONS

Jonathan Collins, "Company aims to turn readers to Radar". Oct. 28, 2005. RFID Journal.

Mayhan et al., "A two-frequency Radar for Vehicle Automatic Lateral Control", Vehicular Technology, IEEE Transactions, Feb. 1982, vol. 31, Issue 1, pp. 32-39.

US Office Action for U.S. Appl. No. 12/611,724 dated Mar. 28, 2012 (6 pages).

* cited by examiner

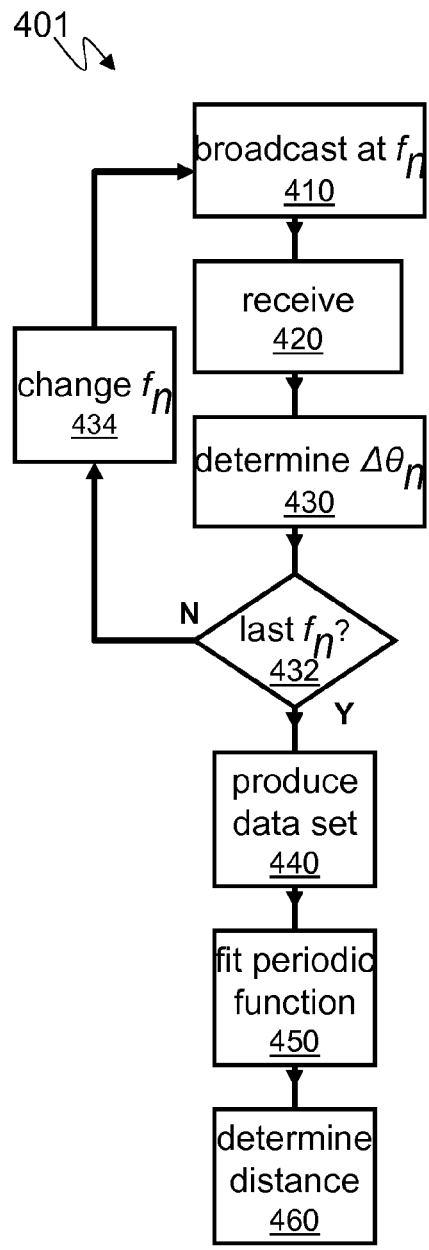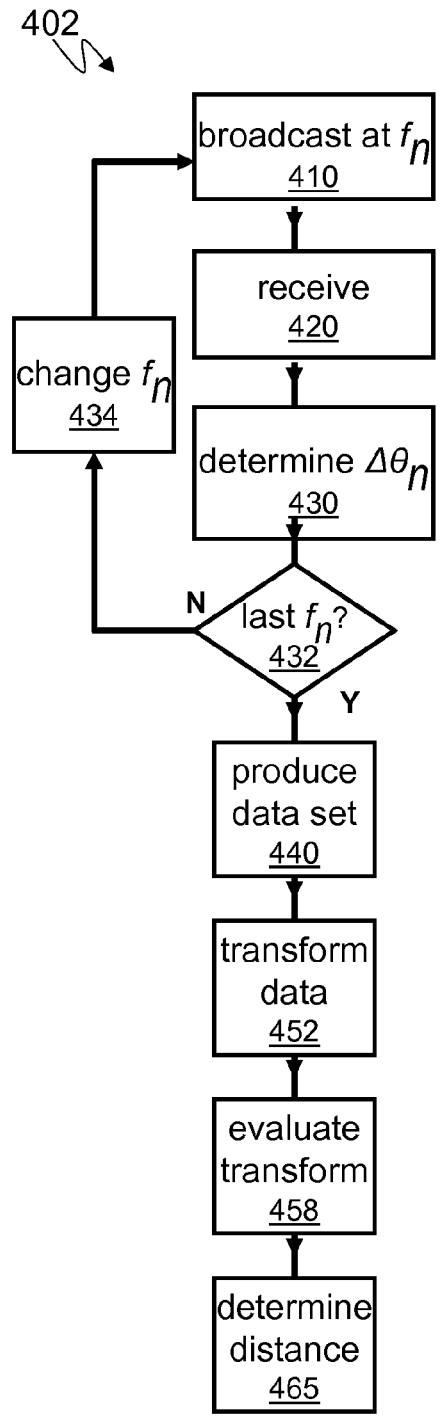
FIG. 4A
FIG. 4B ial application No. 61/110,670, filed Nov. 3, 2008,
METHODS AND APPARATUSES FOR RFID TAG RANGE DETERMINATION

RELATED APPLICATION

This application is related to and claims priority to U.S. Provisional Application No. 61/110,670, filed Nov. 3, 2008, entitled "METHODS AND APPARATUSES FOR RFID TAG RANGE DETERMINATION", which is incorporated herein by reference in its entirety.

FIELD OF THE DISCLOSURE

The methods and apparatuses described herein relate to the field of radio-frequency identification (RFID). In particular, this disclosure relates to methods and apparatuses for determining a distance between an RFID tag and an RFID tag reader's antenna using a plurality of interrogation signals at various signal frequencies.

BACKGROUND

Radio-frequency identification (RFID) of tagged objects is a promising technology with potentially broad applications in commerce, livestock management, wildlife management and security. Currently, RFID tags are replacing bar codes in commercial applications for purposes of inventory tracking and retail check-out. Generally, an RFID system consists of an RFID tag-reading instrument and one or more RFID transponder tags. In some embodiments, the transponder tags are compact, microfabricated, backscatter tags, e.g., tags that do not require an on-board source of power, which respond to a query or interrogation signal broadcasted by the tag reader. These tags can harvest some of the energy from the broadcasted query for on-board processing, and then scatter back some of the incident energy to communicate information, e.g., the identity of the tag, to the tag reader. Because of their potential small size and low cost, RFID tags may be attached to, or placed with, a wide variety of objects such as commercial goods, vehicles, livestock, wildlife, and identification cards or bracelets. Since each RFID tag can be given a unique identification number, an RFID tag reader can quickly detect and record the presence of each RFID transponder tag within the broadcast-and-receive range of the tag reader. Accordingly, an RFID system can be used to inventory goods and livestock, or determine the presence and identity of wildlife or subjects carrying RFID tags.

Although RFID technology is advancing, there have been limited developments in adapting RFID technology to determine tag range, e.g., distance between a particular tag and a tag reader's antenna, or tag location. An embodiment of RFID technology adapted for tag range determination can be found in U.S. Pat. Nos. 7,119,738 and 7,030,761.

SUMMARY

The present methods and apparatuses relate to an RFID system that is useful for determining the presence, identity, range, location, orientation and velocity of one or more RFID-tagged objects that are located within a broadcast and receive range of an RFID tag reader. In some embodiments, the methods can be employed on RFID systems originally designed to detect only the presence of RFID tags. In particular, an RFID tag reader is adapted to interrogate a singulated RFID tag at a plurality of carrier-wave frequencies. The RFID tag reader is further adapted to determine phase delays associated with signals returned to the RFID tag reader from the interrogated tag at each of the plurality of frequencies. The RFID is further adapted to process the determined phase delays to provide an estimate of a distance between the RFID tag reader's antenna and the singulated RFID tag.

In one aspect, a method of determining a position of an RFID tag includes broadcasting, by the tag reader, interrogation signals to the tag at a plurality of discrete frequencies. The tag reader receives returned signals from the tag in response to the interrogation signals. A phase-estimator determines phase delays associated with the returned signals. A processor produces a data set from the determined phase delays. The processor may also select a function having a periodic characteristic which best fits the produced data set. The processor can determine a distance between the RFID tag and the RFID tag reader based upon the selected function.

In some embodiments, the determination of phase delays uses an IIR phase-tracking loop, the phase-tracking loop receiving as input in-phase and in-quadrature components of a returned signal and providing as output an estimated phase delay. The determination of phase delays may comprise clipping or thresholding, by the phase estimator, the output of the IIR phase-tracking loop. The determination of phase delays may comprise approximating, by the phase estimator, a residual angle of a rotated sample as the ratio of an in-quadrature component to an in-phase component of the rotated sample. The sample may be representative of a phase delay of a returned signal. The determination of phase delays may use a first IIR phase-tracking loop providing an estimated phase delay having a first uncertainty and a second IIR phase-tracking loop providing an estimated phase delay having a second uncertainty. The second uncertainty may substantially be larger than the first uncertainty. The determination of phase delays may include clipping or thresholding, by the phase estimator, the output of at least one of the IIR phase-tracking loops. The determination of phase delays may include associating, by the phase estimator, a weighting factor with each determined phase delay. The magnitude of the weighting factor may be based upon the second uncertainty.

In some embodiments, the processor excludes an estimated phase delay from the produced data set when the second uncertainty is greater than a selected value. The method may include comparing an Electronic Product Code (EPC) and/or Tag Identification (TID) (hereafter generally referred to as "EPC") value read for the RFID tag at each frequency, and can exclude from the produced data set determined phase delays at each frequency for which the EPC value read is not in agreement with the commonly read EPC value. The production of a data set may include storing in memory a set of determined phase delays and a frequency associated with each determined phase delay. In some embodiments, the selected function may be substantially saw-tooth shaped.

In some embodiments, selection of a function includes adjusting a parameter of the function. The determination of a distance between the RFID tag and the RFID tag reader may include minimizing a sum of squared differences between the selected function and the produced data set. In one embodiment, the discrete frequencies are selected such that a difference in value between any two adjacent frequencies is such that a corresponding difference in phase delays for the associated returned signals is less than about $\pi$ radians. In some embodiments, the method includes moving, by a user, the tag reader's antenna to plural locations. The method may include determining the distance between the RFID tag and the RFID tag reader at each of the plural locations, and calculating, by the processor, a location of the RFID tag from the distances determined at each of plural locations.

In certain embodiments, the tag reader broadcasts interrogation signals to the tag at a single frequency over a plurality of times. The tag reader may receive returned signals from the tag in response to the interrogation signals. A phase-estimator may determine phase delays associated with the returned signals. The processor may calculate a rate of change in the determined phase delays with respect to time. The processor may also determine a velocity of the tag relative to the RFID tag reader.

In some embodiments, the step of broadcasting includes broadcasting the interrogation signals from one of plural antennas in communication with the RFID tag reader. The step of receiving may include receiving the interrogation signals from one of plural antennas in communication with the RFID tag reader. The tag reader may repeat this for each of plural antennas and the processor can calculate a position of the RFID tag from the distances determined using each of plural antennas. In some embodiments, the method includes repeating these steps a plurality of times and determining, by the processor, a directional velocity of the RFID tag.

In some embodiments, the RFID tag is located within a group of packaged goods. The RFID tag may be disposed on an article located on a conveyor belt. The RFID tag may also be disposed on an article located within a storage facility. In some embodiments, the RFID tag is disposed on an article located within a merchandising facility. The RFID tag may also be physically attached to a mobile vehicle. The RFID tag can be disposed on an animal or human subject. In addition, the RFID tag may be disposed on a parcel or package sent by a sender to a particular destination. The tag reader may display information representative of the calculated position of the RFID tag.

In some embodiments, the method includes comparing, by the processor, the calculated position of the RFID tag to a pre-assigned position for the tag. The tag reader can display information representative of the extent to which the calculated position agrees with the pre-assigned position for the tag. The pre-assigned position may be associated with a position assigned for packaged goods. The pre-assigned position may be associated with an item selected from the following group: a seating arrangement, a standing arrangement, a parking arrangement, an ordered storage arrangement.

In some embodiments, the steps of the method may be repeated for plural RFID tags, wherein the positions of the plural tags have been provided to the tag reader, and the tag reader determines the position of the tag reader. In certain embodiments, the method may include receiving, by the tag reader, a position of an antenna in communication with the RFID tag reader. The tag reader may execute the steps of the method for one or multiple RFID tags, wherein the positions of the one or multiple tags are known and recorded in the tag reader. The processor may calculate a calibration correction associated with the tag reader electronic circuitry and antenna.

In another aspect, a method of determining a position of an RFID tag includes broadcasting, by the tag reader, interrogation signals to the tag at a plurality of discrete frequencies. The tag reader receives returned signals from the tag in response to the interrogation signals. A phase estimator may determine phase delays associated with the returned signals. A processor may produce a data set from the determined phase delays. The processor may also calculate a Fourier transform of the produced data set. Further, the processor may evaluate the Fourier transform. The processor can determine a distance between the RFID tag and the RFID tag reader based upon the evaluation of the Fourier transform. In some embodiments, the production of the data set includes interpolating phase delay data points between the determined phase delays. The evaluation of the Fourier transform may include determining the location of one or more peaks of the Fourier transform.

In still another aspect, a method of determining a position of an RFID tag includes broadcasting, by the tag reader, interrogation signals to the tag at a plurality of discrete frequencies. The tag reader may receive returned signals from the tag in response to the interrogation signals. A phase estimator may determine a phase delay associated with each of the returned signals. The phase estimator can monitor an uncertainty associated with each determined phase delay of each received signal. A processor may assign a weighting coefficient to each determined phase delay, the weighting coefficient based upon the uncertainty associated with each determined phase delay. The processor may produce a data set comprising determined phase delays, frequencies associated with the phase delays, and weighting coefficients associated with the phase delays. The processor may determine a distance between the RFID tag and the RFID tag reader using at least a portion of the data from the produced data set.

In yet another aspect, a method of determining a relative velocity between an RFID tag and an RFID tag reader includes broadcasting, by the tag reader, interrogation signals to the tag at a single frequency. The tag reader can receive returned signals from the tag in response to the interrogation signals. A phase estimator can determine a phase delay associated with each of the returned signals. A processor may determine a rate of change of phase delays associated with the returned signals as a function of time. The processor may also calculate a relative velocity between the RFID tag and the RFID tag reader from the rate of change of the phase delay as a function of time.

In another aspect, a method of determining a position of an RFID tag includes broadcasting, by the tag reader, interrogation signals to the tag at a plurality of discrete frequencies. The tag reader can receive returned signals from the tag in response to the interrogation signals. A phase-estimator can determine phase delays associated with the returned signals. A processor may produce a data set from the determined phase delays. The processor can compare the data set with a second data set of a second RFID tag. Further, the processor may determine proximity of the RFID tag to the second RFID tag based on the comparison.

In some embodiments, the method includes calculating a correlation metric based on the data set and the second data set. The method may further include comparing the calculated correlation metric with a threshold. In certain embodiments, determining the proximity of the RFID tag to the second RFID tag may include estimating the location of the tag relative to the second tag based on a known location of the second tag. The processor may compare the data set with a third data set of a third RFID tag, wherein the locations of the second tag and the third tags are known. The processor may determine, based on the comparison of data sets, the location of the tag relative to the second tag and the third tag.

The foregoing and other aspects, embodiments, and features of the present teachings can be more fully understood from the following description in conjunction with the accompanying drawings. All literature and similar material cited in this application, including, but not limited to, patents, patent applications, articles, books, treatises, and web pages, regardless of the format of such literature and similar materials, are expressly incorporated by reference in their entirety.

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

FIG. 1B depicts singulation of an RFID tag 120a.

FIG. 4A represents an embodiment of a method for determining tag range with an RFID system.

FIG. 4B represents an embodiment of a method for determining tag range with an RFID system.

FIG. 5A is a simplified illustration of broadcasted 510, 520 and received 512, 522 signals for an RFID tag reader 110 and singulated RFID tag 120a;

The features and advantages of the present invention will become more apparent from the detailed description set forth below when taken in conjunction with the drawings.

DETAILED DESCRIPTION OF THE EMBODIMENTS

I. Introduction

Methods and apparatuses relating to RFID tag range determination are described. The methods and apparatuses are useful in an RFID system comprising at least one RFID tag reader and at least one RFID tag. The methods and apparatuses can provide information about any of the following attributes of an RFID tag: the tag's presence, identity, its distance with respect to an RFID tag reader's antenna, its radial velocity, and its directional velocity. The information about a particular tag may be obtained from one tag among a plurality of tags. Methods of data processing relating to RFID tag range determination are also described, as well as various operational methods which may be carried out with the RFID system. Finally, it is noted that the methods and apparatuses are useful for a variety of applications in the fields of commerce, livestock and wildlife management, and security.

II. Overview of the RFID System

Figure 1A:
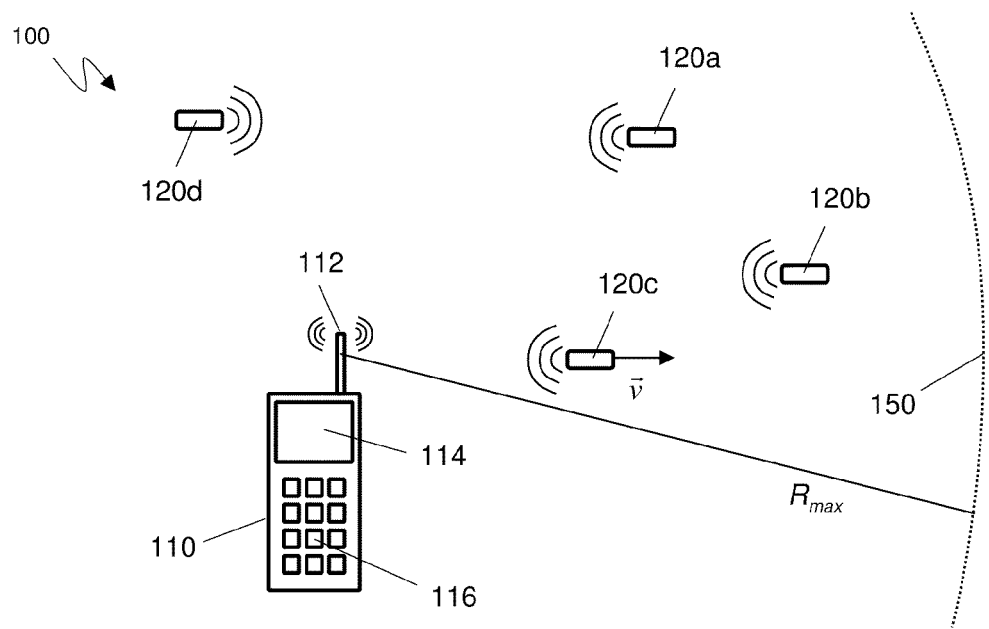
FIG. 1A depicts an embodiment of an RFID system comprising a tag reader 110 and RFID tags 120a-120d.

In overview, an embodiment of an RFID system 100 is depicted in FIG. 1A. The RFID system can comprise an RFID tag reader 110 and plural RFID tags 120a, 120b, 120c, and 120d. The tag reader 110 can be a handheld electronic device having user-interface devices, e.g., data-entry keys 116, a display screen 114, power switches and other electronic controls not shown. The tag reader 110 may further comprise one or more antennas 112, an internal power source, a microprocessor, and memory (not shown). The RFID tags 120a-120d can be passive backscatter tags comprising an RFID chip which harvests some of the signal energy broadcasted from the tag reader 110 for on-board processing, and reflects, retransmits, or scatters back remaining electromagnetic energy. In some embodiments, the tags 120a-120d can include on-board power sources, e.g., batteries or photodiode power systems. The on-board power sources may be used to power signal detection electronics, e.g., signal amplifiers, and signal processing electronics. The on-board power sources may be used to transmit a signal from the tag to the tag reader 110 in response to an interrogation signal broadcasted by the tag reader. The RFID tags 120a-120d each may be affixed to a separate object, e.g., article, commercial good, vehicle, animal, and/or human subject. Although only four tags are depicted in FIG. 1A, there may exists tens, hundreds, or thousands of RFID tags within an RFID system 100. In certain embodiments the tags may be stationary. In some embodiments, one or more tags 120c may be mobile with a velocity $\bar{v}$. In various embodiments, the tags 120a-120d are responsive to interrogation signals transmitted from the tag reader 110.

In operation, the tag reader 110 is adapted to broadcast a plurality of interrogation signals to the RFID tags which are located within a broadcast-and-receive range $R_{max}$ 150 of the tag reader. In various embodiments, the tag reader 110 transmits information and energy via electromagnetic waves to one or more of the tags 120a-120d, and is adapted to receive signals returned from one or more of the tags. In various embodiments, the transmitted information is conveyed on radio-frequency (RF) carrier waves, e.g., electromagnetic radiation having a frequency within a range between about 860 MHz and about 960 MHz. For an embodiment as depicted in FIG. 1A, the tag reader 110 can simultaneously excite all tags 120a-120d within its broadcast-and-receive range 150.

Figure 1B:
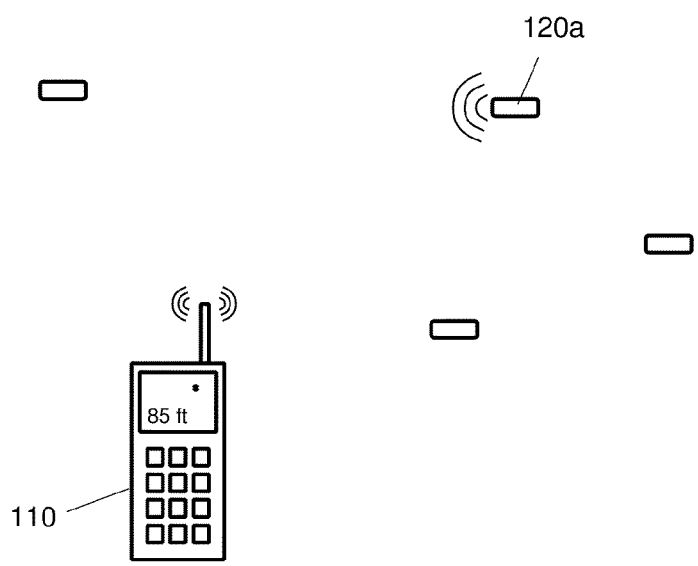

A first type of interrogation signal broadcasted by the tag reader can be one which singulates a particular tag 120a. A singulation signal can cause all other tags 120b-120d within $R_{max}$ 150 to return no signal to the tag reader 110 during a subsequent interrogation interval. FIG. 1B depicts singulation of one tag 120a within a group of tags. A singulation signal can cause only one tag within a group of tags to be responsive to an interrogation signal broadcasted by the tag reader 110. A second type of interrogation signal broadcasted by the tag reader can be one which instructs a tag to return a signal representative of the tag's identity, e.g., an electronic product code (EPC). A third type of interrogation signal can be one which instructs a tag to return a signal providing stored and/or acquired information associated with a tag. The stored or acquired information can comprise manufacture date, serial number, a code for testing purposes, current price, temperature, etc. In operation, the tag reader 110 is further adapted to receive signals returned from the tag in response to the interrogation signals. In various embodiments, the returned signals are processed so that a tag's presence and identity and any information associated with the tag may be determined and made available to a user or database. Additionally, various inventive methods and apparatuses described in Sections IV and V can be employed to determine an approximate distance between an interrogated tag and a tag reader's antenna 112, an approximate location of an interrogated tag, and/or an approximate velocity associated with an interrogated tag which is moving with respect to a tag reader's antenna.

III. RFID Tag Reader

Figure 2:
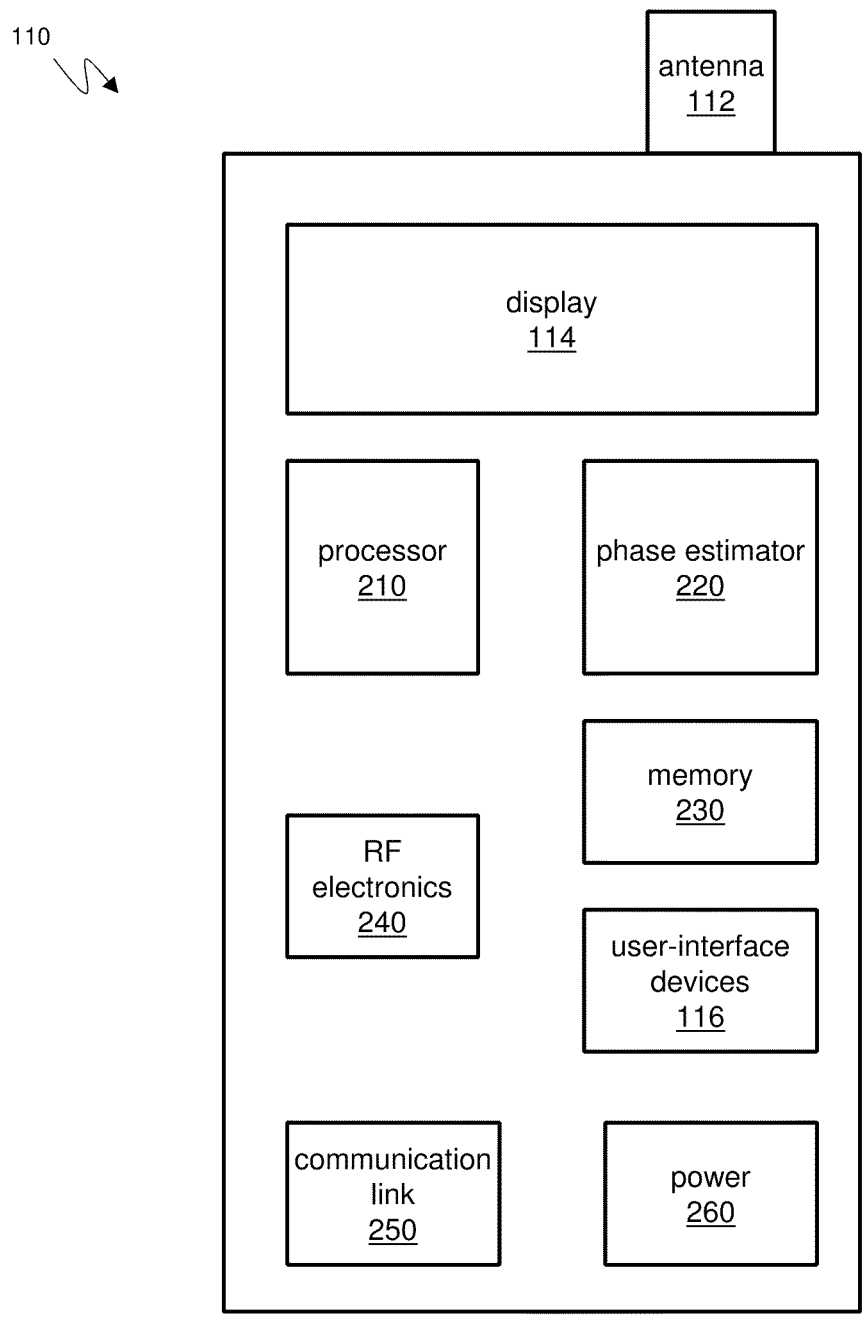
FIG. 2 is a block diagram representative of components included in an embodiment of an RFID tag reader.

FIG. 2 is a block diagram depiction of an embodiment of an RFID tag reader 110 adapted for tag-range determination. In various embodiments, the tag reader 110 comprises a processor 210, a phase estimator 220, memory 230, RF electronics 240, optionally a communication link 250, and power module 260. Each of the components of the tag reader, including the display 114, antenna 112, and any user-interface devices 116 can be in communication directly or indirectly with one or more components of the tag reader. In various embodiments, the user interface devices 116 can comprise buttons, switches, knobs, keypads, touch-sensitive keypads, LED status indicators, a display screen, a touch-sensitive display, and similar components providing for tag-reader operation and data entry. The RFID tag reader 110 can be a hand-held electronic device, or a stand-alone electronic unit. In some embodiments, the reader 110 can be operated in interface with a computer, e.g., connected to a personal computer or laptop through a USB port or wireless port.

The processor 210 can comprise a microprocessor, a microcontroller, a reduced instruction set computer, an application specific integrated circuit, a digital signal processor, or similar processing device. In some embodiments, the processor 210 can comprise a computer or personal computer in communication with the tag reader. In some embodiments, the processor 210 can comprise a combination of a microcontroller located within the tag reader 110 and a remote processor, e.g., a computer, personal computer, or similar processing device, in communication with the tag reader 110. In yet additional embodiments, the processor 210 can comprise a network of processors in communication with the tag reader 110. In various embodiments, the processor 210 participates in managing electronic operations of the tag reader 110. As an example, the processor 210 provides instructions to various tag-reader components, e.g., the display 114, memory 230, phase estimator 220, RF electronics 240, communication link 250, and power module 260, and can coordinate the flow of data within the tag reader, e.g., data received from user-interface devices such as data-entry keys and buttons, data sent to and received from a communication link 250, data sent to and received from the phase estimator 220, data sent to and received from memory 230, data transmitted to and received from antenna 112. The processor 210 can receive power from power module 260.

The phase estimator 220 can be in communication with the processor 210. In some embodiments, the phase estimator 220 comprises an infinite impulse response (IIR) phase-tracking loop. Further details of an IIR phase-tracking loop are described in Section IV-C-2. In various embodiments, the phase estimator 220 receives signals from RF electronics 240 and processes the signals to determine phase delays ΔΘ associated with signals returned to the tag reader 110 from a singulated RFID tag. In some embodiments, the phase estimator 220 can comprise a processor, e.g., a microprocessor, a microcontroller, a reduced instruction set computer, an application specific integrated circuit, a digital signal processor, or similar processing device. The phase estimator 220 can comprise software or firmware running on a processor. In certain embodiments, the phase estimator 220 comprises software or firmware running on the processor 210. In some embodiments, the phase estimator 220 comprises hardware components, or a combination of hardware components and software or firmware running on a processor, adapted to determine phase delays associated with signals returned to the tag reader 110 from an RFID tag 120a. The phase estimator 220 can receive analog or digital input signals, and provide analog or digital output signals representative of the phase delays of signals returned to the tag reader 110 from a singulated RFID tag. The phase estimator 220 can provide its output data to the processor 210 for further processing. The phase estimator 220 can receive power from power module 260.

The tag reader 110 can include memory 230, which can be in communication with the processor 210 and/or phase estimator 220. Memory 230 may comprise any type of electronic or magnetic-based memory device, e.g., DRAM, SRAM, RAM, ROM memory chips, removable memory cards, hard disk drive, or the like. The memory 230 can be used to store data and can be used to store coded instructions for processor 210 and/or phase estimator 220.

In a preferred embodiment, radio frequency (RF) electronics 240 are included with the tag reader 110. The RF electronics 240 can comprise RF power amplifiers, RF power splitters or power dividers, RF phase-delay devices, RF attenuators, RF filters, RF oscillators and frequency sensor, RF mixers, and RF cabling. An embodiment of RF electronics 240 which can be included with a tag reader 110 is depicted in the block diagram of FIG. 3. In some embodiments, the RF electronics 240 can be provided in a separate module which can be placed in communication with an existing or legacy tag reader. For example, a received signal from a legacy reader may be routed through a module comprising RF electronics depicted in FIG. 3.

In certain preferred embodiments, an RFID tag reader's RF electronics 240 are adapted to provide substantially simultaneous in-phase I and in-quadrature Q signal-detection. Such embodiments are preferred in executing inventive methods described in Sections IV and V. However, some embodiments of RF electronics 240 are adapted to provide sequential I-Q detection. The following embodiment of RF electronics 240 provides for substantially simultaneous I-Q detection.

Figure 3:
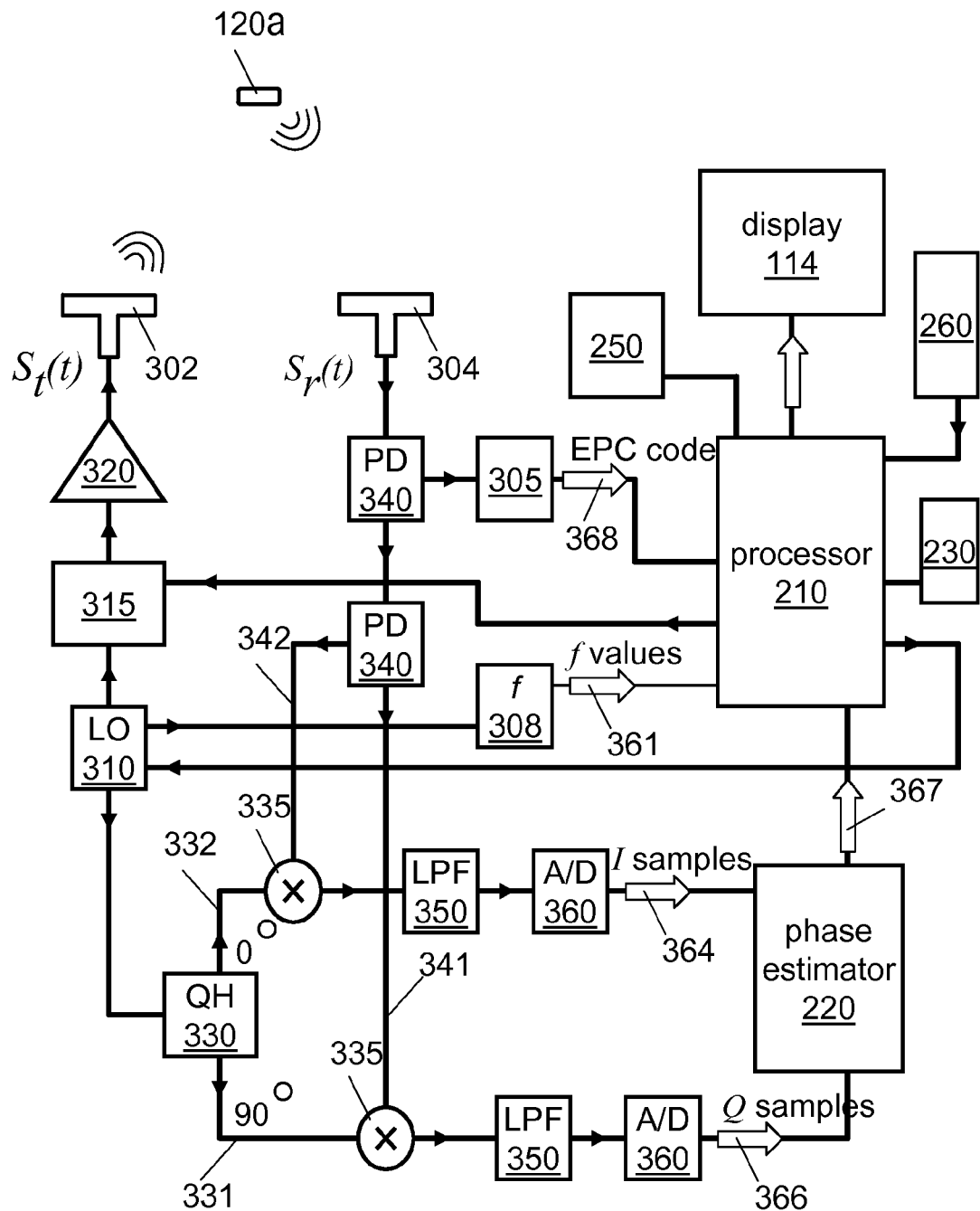
FIG. 3 is a block diagram representative of certain RF components included in an embodiment of an RFID tag reader.

For an embodiment as depicted in FIG. 3, the RF electronics can include a local oscillator (LO) 310, a signal encoder 315, a signal amplifier 320, a broadcast antenna 302, a receiving antenna 304, one or more power splitters 340, a quadrature homodyne divider 330, signal multipliers or mixers 335, and low-pass filters 350. The RF electronics can further include analog-to-digital (A/D) converters 360, a signal decoder 305, and a frequency detector 308. The frequency detector unit 308 can provide the currently-measured frequency value of the local oscillator 310 as data 361 to the processor 210. In some embodiments, processor 210 comprises a Texas Instruments TMS320VC5502 low power digital signal processor. Signals output from the A/D converters 360 can be provided to the phase estimator 220. Certain components, e.g., the amplifier 320, local oscillator 310, A/D converters 360, signal encoder 315, signal decoder 305, and frequency detector 308, can receive power from the power module 260. In certain embodiments, the RF electronics comprises a single antenna 302 and a directional coupler (not shown), which are used for both broadcasting and receiving signals. In various embodiments, the RF electronics can include an additional power splitter 340 which feeds a portion of the received signal to a signal demodulator 305. The demodulator can detect information encoded on the received signal, e.g., EPC value, weight, temperature, fragility, etc, and relay the information as data 368 to the processor 210 for further processing. In some embodiments, signal demodulator 305 can receive input from the AD converters 360, and not from the power divider 340, for signal decoding. In certain embodiments, phase estimator 220 comprises a segment of computer code operable on processor 210. In some embodiments, signal demodulator 305 comprises a segment of computer code operable on processor 210.

In operation, a signal $S_t(t)$ can be broadcasted from the RFID tag reader's antenna 302 to a singulated RFID tag 120a. The RFID tag 120a can modulate and backscatter the signal to provide a returned signal $S_r(t)$ to the RFID tag reader. In some embodiments, the broadcasted signal $S_t(t)$ and returned signal $S_r(t)$ can overlap in time, e.g., be present at substantially the same time. The RFID tag reader 110 can receive the returned signal at a receiving antenna 304, or at a transmitting/receiving antenna if a single antenna is used. The returned signal $S_r(t)$ can be delivered to a power splitter 340 which provides a portion of the returned signal to an I channel path 332-364, and a portion to a Q channel path 331-366. Each portion of the returned and divided signal $S_r(t)$ can be mixed with an in-phase component of the broadcasted signal $S_t(t)$ in the I channel path and in-quadrature component of the broadcasted signal $S_t(t)$ in the Q channel path, respectively.

Referring again to FIG. 2, a communication link 250 can be included optionally with the tag reader 110. The communication link can comprise hardware and software supporting an RF wireless link to a wireless modem in communication with a computer, personal computer, network of computers, another tag reader, or network of tag readers. For a wireless communication link, the communication protocol supported can be SPI, I2C, Bluetooth, Zigbee, 802.11a, 802.11b, 802.11g, 802.11n, or a proprietary data communications protocol. In some embodiments, the communication link 250 may comprise hardware and software supporting a wired link with a computer, personal computer, network of computers, another tag reader, or network of tag readers. Examples of wired links include USB, IEEE-488, RS-232, RS-422, RS-485, SCSI or comparable links. In some embodiments, data acquired by the tag reader 110 is transmitted from the tag reader via communication link 250. The transmitted data may be processed, partially processed or unprocessed data. Communication link 250 can be in communication with processor 210 and receive power from power module 260.

In one embodiment, the tag reader 110 includes a power module 260. Power for operation of tag reader components can be provided through power module 260. In some embodiments, the power module 260 comprises a power jack, which receives a chord providing AC or DC power from an external source of power. In some embodiments, the power module may further comprise a power converter which converts power provided by an external source to regulated power usable by the tag reader. For example, the power module may comprise an AC-to-DC power converter which can convert AC input to one or more DC voltage outputs at selected current limits. In some embodiments, the power module may comprise batteries or rechargeable batteries, which may be combined with DC-DC voltage converters. In some embodiments, the power module may comprise solar cells in combination with rechargeable batteries and associated charging circuitry. The power module 260 may further include a switch and/or relay to apply or terminate the application of power to the tag reader 110. In some embodiments, the processor 210 may monitor activity status of the tag reader and terminate the application of power to the tag reader or to certain components of the tag reader when the tag reader is in an inactive state.

IV. Operation of the RFID Tag Reader

After an RFID tag reader 110 has established communication with and singulated an RFID tag 120a, a method of operation may be executed to determine a distance between the tag reader's antenna and the singulated tag 120a. The inventors have devised several methods for determining tag range. Two methods for tag-range determination will be described first in overview, and then in detail. Additional methods for determining tag range will also be presented.

Referring now to FIG. 4A, in various embodiments, a method 401 of determining a tag range, e.g., a distance between an RFID tag and an RFID tag reader's antenna, comprises the steps of broadcasting 410, by the tag reader 110, interrogation signals to the tag 120a at a plurality of discrete frequencies $f_n$; receiving 420, by the tag reader, signals returned from the tag 120a in response to the interrogation signals; determining 430, by a phase estimator 220, phase delays $\Delta\theta_n$ associated with the returned signals; producing 440, by a processor 210, a data set from the determined phase delays; selecting 450, by the processor 210, a function having a periodic characteristic which best fits the produced data set; and determining 460, by the processor 210, a distance between the RFID tag 120a and the tag reader's antenna based upon the selected function. In various embodiments, the periodic function selected is one associated with an absolute minimum of a sum of squared errors. In certain embodiments, a method 401 of determining a tag range includes an iterative loop, which is repeated until a step of testing 432 for a last broadcast frequency detects that all broadcast frequencies $f_n$ have been used. If all broadcast frequencies have not been used, the loop cycles through a step of changing 434 the broadcast frequency.

Referring now to FIG. 4B, in various embodiments, a method 402 of determining a tag range comprises steps similar to those for the method 401 of FIG. 4A, however the produced data set is processed differently. For this embodiment, the produced data is transformed 452, e.g., a discrete Fourier transform is taken of the produced data set. The method of this embodiment can further comprise evaluating 458 the transformed data and determining 465 the tag range based upon the evaluation of the transformed data.

Details of the methods depicted in FIGS. 4A-4B will now be presented. Additional methods useful for determining tag range will also be described.

IV-A. Broadcasting Signals

The step of broadcasting 410 can comprise broadcasting an interrogation signal to the tag 120a which causes the tag to return, e.g., backscatter, a corresponding signal to the tag reader 110. In various embodiments, the RFID tag reader 110 is adapted to broadcast multiple interrogation signals sequentially to a singulated RFID tag 120a. Each interrogation signal can be encoded on a discrete carrier-wave frequency $f_n$. The multiple broadcasted signals can have different carrier-wave frequencies. The discrete carrier-wave frequencies can comprise a set of frequencies spaced at substantially regular frequency intervals, e.g., $f_1 \approx 902.75$ MHz, $f_2 \approx 903.25$ MHz, $f_3 \approx 903.75$ MHz, $f_4 \approx 904.25$ MHz, . . . , $f_n$, . . . , $f_N \approx 927.25$ MHz. In certain embodiments, the carrier-wave frequencies span an available broadcast frequency range. The tag can subsequently respond and return to the tag reader a corresponding signal at each of the plurality of discrete frequencies.

In various embodiments, the frequency interval or frequency step $\Delta f = f_{n+1} - f_n$ relates to a maximum separation $D_{max}$ between an RFID tag and tag reader's antenna for which a tag range measurement can yield a substantially accurate result. In some embodiments, the phase delay $\Delta \theta_n$ between the broadcasted $S_t(t)$ and received $S_r(t)$ signals at the tag reader 110 cannot exceed about $\pi$ radians when changing the broadcast frequency $f_n$ by the frequency increment $\Delta f$. (In some embodiments, an allowable phase shift of $2\pi$ radians is permitted with additional modifications to phase detection electronics as described in Section IV-D.) Because of current protocols, as provided by Section 6.3.1.3.1 of the EPC Global Class 1 UHF RFID Protocol for Communications at 860 MHz to 960 MHz, Version 1.0.9 an ambiguity in phase from a responding RFID tag arises and this can reduce the allowable phase shift to about $\pi$ radians. In the U.S., the available minimum frequency step is determined by FCC and other regulations to be about 500 kHz, e.g., broadcast signal frequencies are limited to carrier-wave signals broadcasting on channel centers spaced apart by about 500 kHz. The maximum measurable distance $D_{max}$ which can be determined substantially correctly by the inventive RFID system, e.g., the distance which yields a phase shift less than $\pi$ radians for a frequency step $\Delta f$, is given by the following expression.

$$D_{max} = \frac{c}{4 \cdot \Delta f} \quad \text{(EQ. 1)}$$

With $\Delta f = 500$ kHz, the maximum measurable distance for the RFID system is about 150 meters or about 480 feet. In practice, this distance exceeds expected ranges within which RFID tags will be located, so a 500-kHz minimum frequency increment is sufficient for many RFID tag range applications described herein. In some embodiments, e.g., within the U.S., the number of distinct interrogation frequencies may be about 50 due to an FCC regulated limitation on the broadcasting band. For example, 50 carrier-wave frequency values on 500 kHz spacing in a frequency range between about 902.75 MHz and about 927.25 MHz can be used to interrogate an RFID tag.

As an example of broadcasting 410, a tag reader 110 may broadcast a series of repeated interrogation signals requesting a singulated tag's identity, wherein each interrogation signal within the series is broadcast at a different frequency within the plurality of discrete frequencies. In certain embodiments, the order of frequencies chosen for the series of repeated interrogation signals can be random or pseudo random or sequential. In response to each interrogation signal from the tag reader 110, the tag 120a can return a signal with its identity, e.g., the tag's EPC value, encoded thereon. For Class 1 Gen2 tags, commands needed to cause the tag to backscatter its EPC code can be issued by the tag reader 110 during the broadcasted signal.

In operation, a local oscillator 310, which can be programmable and controlled by processor 210 and included with RF electronics 240, can provide a carrier-wave modulation in a radio-frequency range between about 860 MHz and about 960 MHz. In certain embodiments, the frequency of the local oscillator is controlled or adjusted to a particular frequency by processor 210. An interrogation signal generated by the processor 210 can be encoded onto the carrier wave of a particular frequency by encoder 315, amplified in power by amplifier 320 and broadcasted from transmitting antenna 302. The RFID tag 120a can detect the broadcasted interrogation signal and return its response to receiving antenna 304. In some embodiments, the transmitting antenna 302 may also function as a receiving antenna to receive the returned signals. The steps of changing 434 the frequency, encoding, broadcasting 410 and receiving 420 can be repeated for the plurality of discrete frequencies $f_n$.

IV-B. Receiving Signals

The step of receiving 420 can comprise receiving a signal returned from the interrogated tag 120a at a receiving antenna 304, or a tag reader's single antenna, and providing the received signal to RF electronics 240 for electronic processing. In some embodiments, a power divider 340 may split off a portion of the received signal, and the portion can be provided to a signal demodulator or decoding component 305. In some embodiments, the received signal can be amplified by an electronic low-noise amplifier, not shown, before being split. In various embodiments, at least a portion of received signal is split by a power divider 340 into two substantially equivalent signals 341 and 342. In various embodiments, the two signals 341 and 342 travel substantially equal path lengths to and are multiplied at multipliers 335 by signals 331 and 332, respectively. The signals 331 and 332 are output from the quadrature homodyne splitter 330, which produces a 0° phase-shifted (in-phase) version 332, and a 90° phase-shifted (in-quadrature) version 331, of the carrier-wave modulation provided by the local oscillator 310. In various embodiments, signals 331 and 332 also travel substantially equal path lengths to the multipliers 335. The outputs from the multipliers 335 are fed through low-pass filters 350, which substantially integrate the output signals and remove high-frequency noise, and then are sampled by A/D converters 360. The sampled integrated outputs 364 and 366 can be provided as in-phase I and in-quadrature Q digital data to data input ports of the phase estimator 220 for data processing. For embodiments in which the phase estimator comprises a segment of computer code operating on processor 210, the sampled integrated outputs 364 and 366 can be provided as in-phase I and in-quadrature Q digital data to data input ports of the processor 210. In certain embodiments, during the time a tag backscatters its EPC code, the A/D converters 360 produce multiple I-Q data pairs ($I_{nk}$,$Q_{nk}$) at a fixed clock rate at each broadcast frequency $f_n$. In some embodiments, the number of I-Q pairs may be in the thousands for an entire EPC transmission.

IV-C. Determining Phase Delays

In various embodiments, the step of determining 430 phase delays associated with the returned signals is carried out by the phase estimator 220. The phase estimator can receive I-Q data 364, 366 and determine a phase delay $\Delta\theta_n$ from the received I-Q data. In some embodiments, the phase estimator may determine a phase delay for each I-Q data pair received. In some embodiments, the phase estimator may determine a phase delay for a group of I-Q data received, e.g., the phase estimator may provide an average value of phase delay for a set of I-Q data pairs. In various embodiments, the phase estimator provides as output determined phase delays $\Delta\theta_n$ associated with signals returned from a singulated RFID tag. The phase delays can be provided as data 367 to processor 210 for further data processing.

By way of explanation, phase delays associated with signals returned from an RFID tag arise because of the distance between the RFID tag reader's antenna and RFID tag. This can be understood in reference to FIG. 5A, which depicts two carrier-wave modulations 510, 520 at different frequencies $f_1$, $f_2$ which are transmitted to and returned from an RFID tag 120a. In the depiction, both carrier-wave modulations are transmitted from the tag reader 110 with substantially the same initial phase, e.g., $\theta_{1t} \approx \theta_{2t}$. For this depiction, it is assumed that the tag imparts no phase shift to the carrier-wave modulation backscattered from tag. In some embodiments the tag may impart a phase shift to the backscattered modulation and this condition is discussed in Section IV-D. The returned signals 512, 522 arrive back at the tag reader having phases $\theta_{1r}$, $\theta_{2r}$. The phases of the returned signal differ from the initial phases of the transmitted signals. Referring to the figure, the phase delays $\Delta\theta_{1a} \approx \theta_{1t} - \theta_{1r}$ and $\Delta\theta_{2a} \approx \theta_{1t} - \theta_{1r}$ of each carrier-wave modulation can be determined by comparing the returned phase with the initial phase for each signal. In various embodiments, the determining 430 of phase delays is done by in-phase and in-quadrature signal detection and analysis as indicated in FIG. 3 and described below.

Figure 5A:
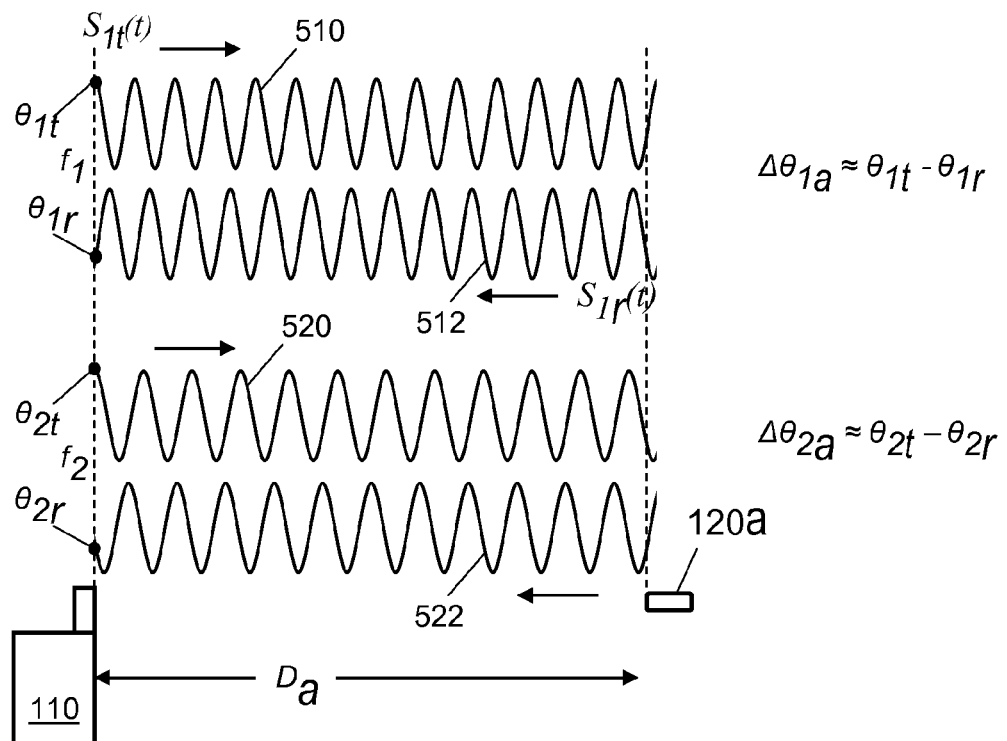
Figure 5B:
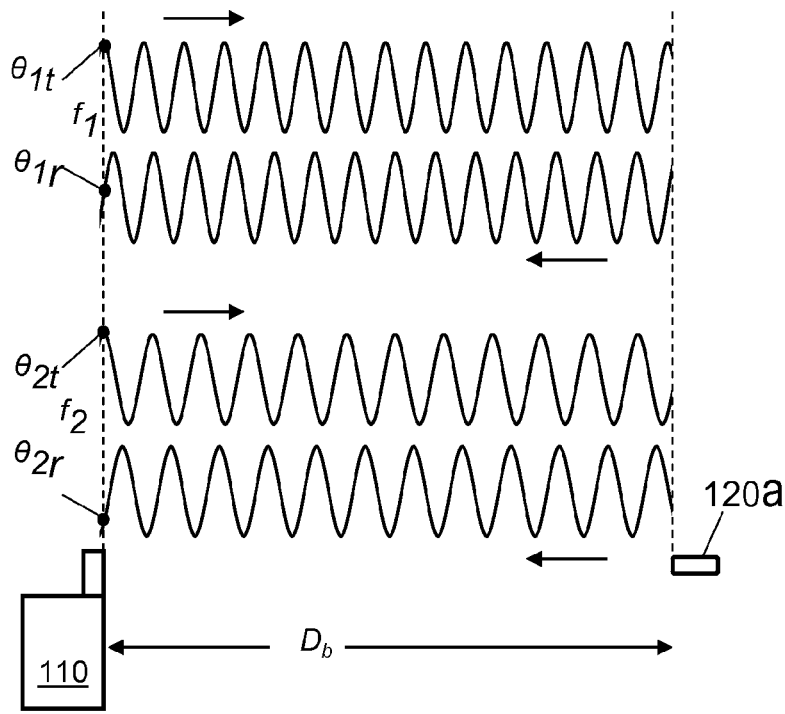
FIG. 5B is similar to FIG. 5A although the tag 120a is farther from the tag reader and its antenna.

In general, the determined and recorded phase delays $\Delta\theta_n$ will be different for different carrier-wave modulation frequencies $f_n$ for a particular distance $D_a$ between the tag reader 110 and RFID tag 120a, as can be seen from FIG. 5A. For the example depicted in the figure, it can be seen that $\Delta\theta_{1a} \neq \Delta\theta_{2a}$. Stated another way, at any particular distance the phase delay will be a function of carrier-wave modulation frequency, which may be represented mathematically as $\Delta\theta(f)$. FIG. 5B illustrates the results when the distance between the tag reader and tag is changed, e.g., increased by a small amount. In general, a different distance $D_b$ will yield different values of phase delays $\Delta\theta_{1b} \neq \Delta\theta_{1a}$, $\Delta\theta_{2b} \neq \Delta\theta_{2a}$ and even though the same modulation frequencies may be used $\Delta\theta_{2a} - \Delta\theta_{1a} \neq \Delta\theta_{2b} - \Delta\theta_{1b}$. Stated another way, the functional form of the phase delay $\Delta\theta(f)$ will be dependent upon the distance between the RFID tag reader 110 and RFID tag 120a.

For purposes of simplifying explanations and illustrations, the determination of phase delays $\Delta\theta_n$ in the inventive RFID system is described with respect to the carrier-wave signal only. However, in a preferred embodiment, phase delays can be determined from sideband signals. Sideband signals can arise from the RFID tag's activity on the received and returned signal. In various embodiments, the interrogated RFID tag 120a modulates the backscattered signal at a frequency $f_m$, e.g., the RFID tag 120a can employ phase shift keying (PSK) to encode information onto the signal returned to the RFID tag reader 110. The result of the tag's modulation is the production of sideband signals at frequencies $f_n \pm f_m$ where $f_n$ represents the frequency of the broadcasted carrier-wave. In certain embodiments, the tag's modulation frequency is about 240 kiloHertz (kHz), so that the sideband signals are not far removed from the carrier-wave frequency, which is in the vicinity of 915 MHz.

In various embodiments, an evaluation of I-Q data 364, 366 received by the phase estimator 220 provides an approximate value of the phase delay associated with a signal returned from an RFID tag. In operation, for each returned signal from an RFID tag at a particular modulation frequency $f_n$, the phase estimator can receive a series of I-Q samples. As an example, the tag reader may receive a signal back from a tag with the tag's EPC value encoded within the signal. During the reception of the EPC signal, the A/D converters 360 can produce a series of ($I_{nk}$,$Q_{nk}$) data pairs, where k is an index representing the $k^{th}$ sample in the series and n is an index associated with the particular modulation frequency $f_n$. An example of I-Q data that can be received by the phase estimator is plotted in the graph of FIG. 6. The example data was obtained while receiving a signal from an RFID tag at one carrier-wave frequency only, $f_n$=903.75 MHz, and represents about 3,000 ($I_{nk}$,$Q_{nk}$) data pairs, i.e. k=1, 2, 3, ..., 3000. The data is plotted in arbitrary units as a connected line rather than individual data points. The 3000 samples were collected during the tag's EPC response plus a transient earlier response. The transient response forms a thin line near vertical in the plot, plus a few lines at the approximate angle of most of the larger cluster 610 of data. The transient response is due to behavior of tag and reader prior to transmission of the tag's EPC response, and may be excluded from data processing. The later portion of the 3000 points form a large elongated cluster 610 in the plot that extends from the upper left to the lower right.

The maximum number of I-Q data points $k_{max}$ sampled at each frequency value $f_n$ can be determined by any one or combination of the following factors: A/D converter 360 sampling rate, temporal length of EPC transmitted response, total range-determination processing time, signal-to-noise ratio. In some embodiments, $k_{max}$ is between about 20 and about 100, between about 100 and about 500, between about 500 and about 1000, between about 1000 and about 2000, and in some embodiments between about 2000 and about 5000. In certain embodiments, shorter measurement times with reduced accuracy may be desired, and the number of I-Q data points may be reduced. Measurement time can be reduced by reducing $k_{max}$ and/or by broadcasting signals at fewer frequency values on larger frequency interval spacing, an interval yet subject to the π or 2π phase constraint.

Figure 6:
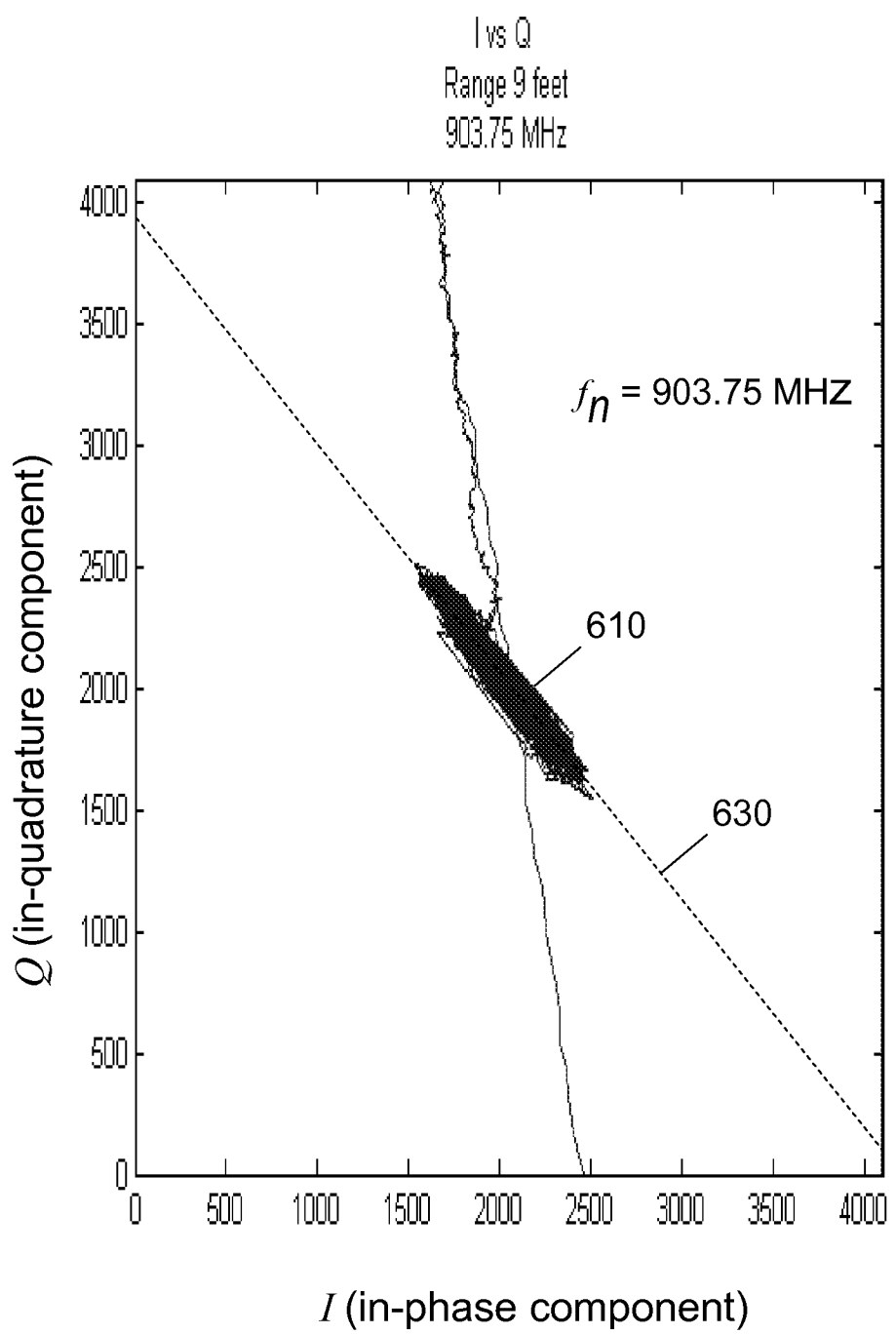
FIG. 6 is a plot of I-Q data derived from a signal at a single carrier-wave frequency encoded with an EPC value and returned from a singulated tag. The data was obtained with a prototype RFID tag reader.

The angle or slope of cluster 610 in the graph of FIG. 6 is substantially representative of the phase delay $\Delta\theta_n$ between a transmitted signal $S_t(t)$ and a received signal $S_r(t)$ at an RFID tag reader's antenna at the particular carrier-wave frequency $f_n$. The phase delay for a $k^{th}$ sample can be determined substantially from the following relation.

$$\Delta\theta_{nk} = \arctan\left(\frac{Q_{nk}}{I_{nk}}\right) \qquad \text{(EQ. 2)}$$

In various embodiments, the step of determining 430 phase delays associated with the returned signals comprises evaluating, by the phase estimator 220, $\Delta\theta_{nk}$ substantially in accordance with EQ. 2. Assuming that $I_{nk}, Q_{nk}$ can take on positive and negative values, the phase delay determined using EQ. 2 will vary between about $-\pi/2$ and about $+\pi/2$ radians.

For an ideal system with no signal distortions, no transient effects, and no modulation of the carrier-wave, all sampled values ($I_{nk}$, $Q_{nk}$) would be identical, and a plot as shown in FIG. 6 would consist of a single point, e.g., all 3,000 samples would fall on the same point on the graph. In practice, at least the amplitude of a received signal will change with time, e.g., due to the tag's modulation of the carrier wave. The change in amplitude of the received signal can cause a change in both the sampled values ($I_{nk}$, $Q_n k$) with time. However, since the phase delay $\Delta\theta_n$ remains substantially constant at a particular frequency, the changing values ($I_{nk}$, $Q_{nk}$) are constrained by EQ. 2. This implies that the ratio $Q_{nk}/I_{nk}$ is substantially constant for all samples at a particular carrier-wave frequency, which can be expressed as $$Q_{nk}=C_n I_{nk} \qquad \text{(EQ. 3)}$$

where $C_n$ is a constant. Accordingly, all changing values ($I_{nk}$, $Q_{nk}$) obtained at a particular carrier-wave frequency $f_n$ fall substantially on a line 630 with slope $C_n$.

The line 630 fitting the cluster 610 can be offset from the origin, i.e., shifted from and not pass through the origin, due to a number of factors. A predominant factor can be a DC component in the ($I_{nk}$, $Q_{nk}$) data due to a returned, non-modulated, carrier-wave signal component from the RFID tag. Recalling the prior discussion regarding sideband signals generated by a responding RFID tag's modulation of the backscattered signal, a component of the backscattered signal may be non-modulated and at $f_n$. This component of the returned signal will mix with carrier-wave signals 331, 332 to provide DC components to the low pass filters 350. In some embodiments, a DC block, e.g., an analog DC block, is provided with the low pass filters 350 to remove the DC components from the signals received by the low pass filters. Removal of the DC components can shift the data and line 630 to the origin in the graph of FIG. 6. The spread of the cluster 610 of data can also be due to a number of factors. A predominant factor can be AC components in the I-Q data due to the RFID tag's modulation of the backscattered signal. Since the mixing at mixers 335 comprise a multiplying a carrier-wave frequency at about $f_n$ with sideband signals at about $f_n \pm f_m$, AC components will result in signals output from the mixers. The AC components can cause the measured ($I_{nk}$, $Q_{nk}$) data to spread or cluster about a line 630 rather than fall substantially on the line. Additional sources, e.g., signal noise, multipath signal interference, electronic DC offsets and/or DC drift from tag reader components, frequency drift, etc, can also contribute to the spread of the data cluster 610 and its shift from the origin.

Combining EQS. 1-2 gives $$\Delta\theta_n = \arctan(C_n) \qquad \text{(EQ. 4)}$$

from which it can be seen that a determination of the slope of the blot 610 of data in FIG. 6 will substantially yield the phase shift $\Delta\theta_n$ between a transmitted signal $S_t(t)$ and a received signal $S_r(t)$ at an RFID reader at the particular carrier-wave frequency $f_n$.

IV-C-1. Determining Phase Delays: Linear Regression

In certain embodiments, the step of determining 430 phase delays comprises determining a value for the slope of a line 630 which best fits a set of I-Q data for each carrier-wave frequency $f_n$. In some embodiments, linear regression techniques may be used to determine the slope of a line 630 best fitting the I-Q data, and hence best determining the phase delay at a particular frequency. Simpler forms of linear regression minimize vertical error between data and a best fit line, and may be useful for some embodiments. However, a minimization of vertical distance can generate a bias towards the horizontal and yield unacceptable slope errors for data with near-vertical slope. In some embodiments, a more complex linear regression method can be used, which minimizes perpendicular distance between the I-Q data and a best fit line. Although this method may not bias the resulting line toward any one direction, it can generate two best-fit lines, one substantially along the desired axis of the data, and one perpendicular to that direction thorough the mean of the data. The correct best-fit line can be resolved by selecting the regression line with the minimum residual error. However, the additional calculation may be an undesirable use of processor time in some applications.

IV-C-2. Determining Phase Delays: IIR Phase-Tracking Loop

In certain embodiments, the step of determining 430 phase delays comprises providing the I-Q data to a phase-tracking loop, which may be in operation within the phase estimator 220. In some embodiments, the phase-tracking loop can be executed on the processor 210. The phase-tracking loop can be seeded with an initial guessed phase delay $\theta_r$ and then operate sequentially on the received data $I_{nk}, Q_{nk}$ to refine the initial guess to an approximately correct phase delay angle. In certain embodiments, the phase-tracking loop utilizes infinite-impulse response (IIR) signal processing techniques.

Figure 7:
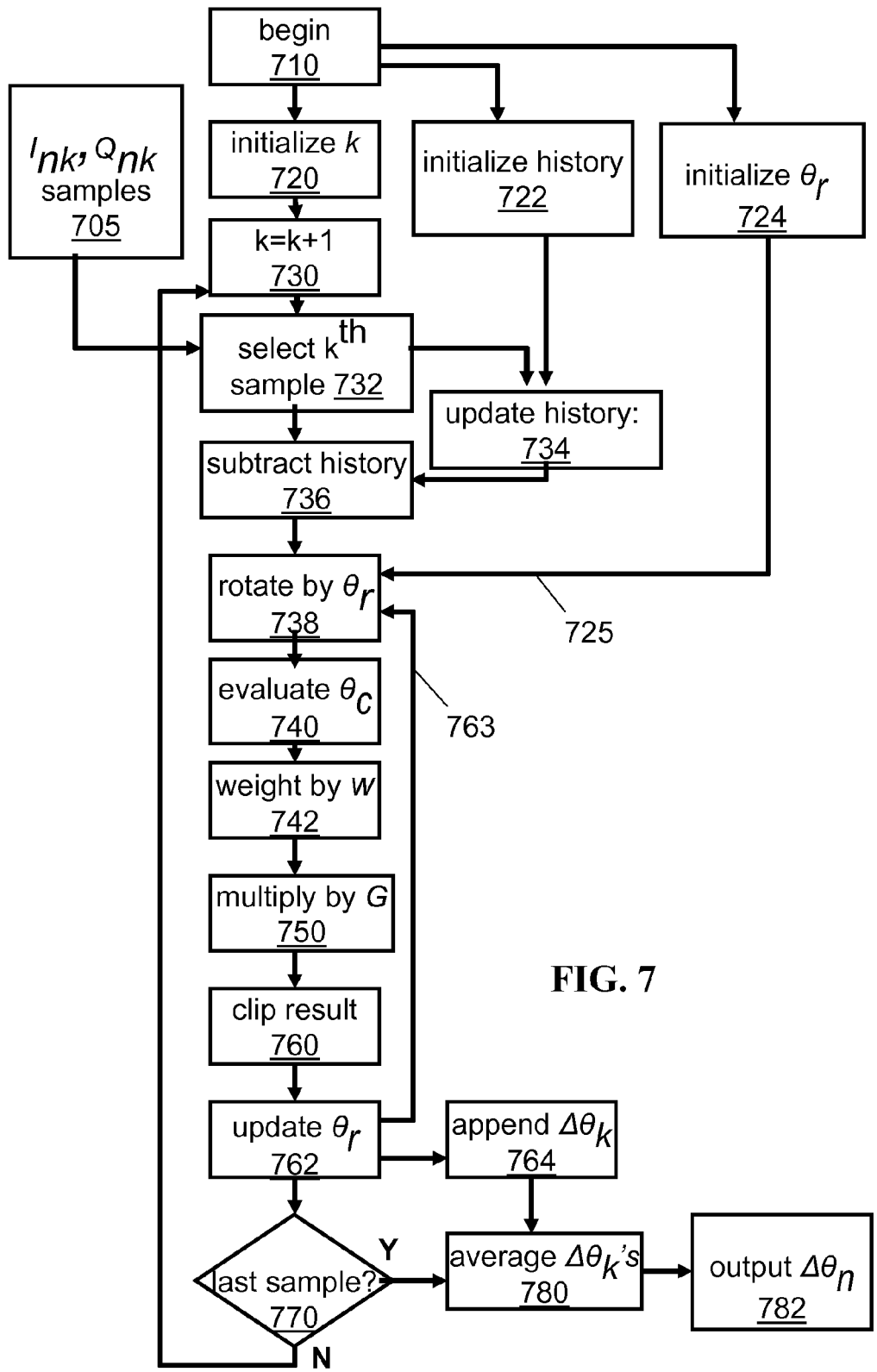
FIG. 7 represents an embodiment of a method for determining a phase delay angle $\Delta\theta_n$ from sampled I-Q signals.

The phase-tracking loop can comprise an iterative method of determining a phase delay angle $\Delta\theta_n$ for each signal returned from an RFID tag at a particular frequency $f_n$. In certain embodiments of the iterative method, any DC component is removed from the $I_{nk}, Q_{nk}$ data. The removal of DC components, and the iteration of the guessed phase delay angle can be implemented as IIR digital filters. A block diagram of a process that removes DC and iterates a guessed value to approximately the phase delay angle of the input I-Q data is depicted in FIG. 7.

In various embodiments, the IIR phase-tracking loop begins 710 with the initialization 720 of data or loop index k, initialization 722 of sample history, and initialization 724 of a rotation angle $\theta_r$ used to rotate received data samples ($I_{nk}$, $Q_{nk}$) as they are received and processed by the phase estimator. For loop index initialization 720, k can be set to 0 for the loop shown, or 1 if index incrementing step 730 follows step 770. In certain embodiments, the initialization of sample history 722 can comprise setting a value representative of history equal to the first sample ($I_{n1}, Q_{n1}$). The initialization 724 of rotation angle $\theta_r$ can comprise setting equal to the first sample quadrant, or an arbitrary angle, e.g., 0 radians. The initialization of the rotation angle substantially constitutes seeding the phase-tracking loop with an initial guess of a phase delay. This guess will be iterated toward the correct angle as, one by one, data samples $(I_{nk}, Q_{nk})$ are examined and processed in the loop. The initialization of loop parameters can occur before, upon or after the broadcasting, by the tag reader, an interrogation signal at a particular frequency $f_n$. In various embodiments, the phase-tracking loop is executed for each signal returned from an RFID tag.

After the parameters are initialized, the index k is incremented and a data sample $(I_{nk}, Q_{nk})$ received. The data samples $(I_{nk}, Q_{nk})$ are received one by one, and fed to an exponentially decaying averager. The averager comprises iteratively updating sample history 734. In certain embodiments, the sample history is updated 734 according to the following equation:

$$\text{history} = \frac{\text{history} \times \text{IIR\_area} + \text{sample}}{\text{IIR\_area} + 1} \quad (\text{EQ. 5})$$

The generated average, or updated sample history, is then subtracted 736 from the current sample to provide a sample value with DC removed. The removal of DC is substantially equivalent to shifting the cluster of data 610 in FIG. 6 to be centered at the origin, rather than at about (2100, 2000), and comprises removing the DC component attributable to the returned non-modulated carrier-wave signal from the RFID tag. The averager can act as a high pass filter. The time constant of its exponential decay controls the high pass corner frequency of this filter. In some embodiments, the corner frequency is selected so as to remove DC yet maintain the information needed to decode the tag EPC response or other tag responses. Such a choice of corner frequency can be advantageous when the EPC decoder operates processes output from the phase rotator. For example, the amplitude-modulated (AM) portion of the tag response can give rise to the major axis of the response cluster 610. A preferred detection method for this embodiment, slices the response cluster 610 perpendicularly to the major axis of the cluster, such that the high and low amplitude values are maximally separated. For example "AM highs" (perhaps the upper left end of cluster 610) and the AM lows at the lower right are best separated by a "decision" line perpendicular to line 630, and through the center of cluster 610. This high/low separation is identical to removing DC, rotating cluster 610 to the real axis, and then separating highs and lows by using the sign of the real part. The decision line that was perpendicular to 630 has become the Y axis after rotation and DC removal. In some embodiments, phase rotation can be quantized to angles of m×45 degrees where m is an integer. In various embodiments, the information used for the EPC decode is the X axis amplitude information from the phase rotation processing.

The data that propagates with DC removed is then fed to the core of the IIR phase-tracking loop, where the received data sample $(I_{nk}, Q_{nk})$ is rotated by angle $\theta_r$. In various embodiments, rotation by $\theta_r$ comprises calculating new values $(I'_{nk}, Q'_{nk})$ for $(I_{nk}, Q_{nk})$ using rotation equations. For the first pass through the loop, the value of the rotation angle $\theta_r$ is the initial guess provided during initialization 724. With each subsequent pass through the loop, the value of $\theta_r$ is modified according to subsequent data processing steps 740, 742, 750, 760, and 762, and returned via data path 763 for use with the subsequent received data pair $(I_{n(k+1)}, Q_{n(k+1)})$ on the next pass through the loop. As the loop cycles, the current value of $\theta_r$ is used to rotate the current received sample pair toward the real axis, e.g., toward the horizontal axis of FIG. 6. After rotation the sample is examined for what residual angle $\theta_c$ remains between it and the real axis. In certain embodiments, the value of $\theta_c$ is determined by evaluating 740 the rotated sample pair in accordance with EQ. 2. For example, $$\theta_c = \arctan\left(\frac{Q'_{nk}}{I'_{nk}}\right) \quad (\text{EQ. 6})$$

where $I'_{nk}, Q'_{nk}$ are the rotated, by $\theta_r$, values of the received data sample $(I_{nk}, Q_{nk})$. The determined value of $\theta_c$ can then be weighted 742, e.g., multiplied by a weighting factor or function w. The residual angle $\theta_c$ can also be scaled by a gain term G. The gain term can be selected such that the closed loop is stable. In various embodiment, the phase-tracking loop acts as an IIR digital filter that settles in on the actual phase delay angle, e.g., $\theta_r$ approaches $\Delta\theta_n$, as the loop cycles.

In certain embodiments, the phase-tracking loop includes a step of clipping (or thresholding) 760 the weighted and scaled residual angle $\theta_c$. After the loop settles to a substantially constant value for $\theta_r$, signal or electronic noise may occasionally generate large erroneous values of $\theta_c$. In order to prevent such large disturbances from perturbing the IIR loop's updating of $\theta_r$, the value of $\theta_c$ can be clipped to a selected maximum value, e.g., between about 2 degrees and about 5 degrees in some embodiments, between about 5 degrees and about 10 degrees, between about 10 degrees and about 20 degrees, and yet between about 20 degrees and about 40 degrees in some embodiments. This can cause the loop to have a smoother output that better tracks the actual phase delay angle.

The weighted, scaled and possibly clipped value of $\theta_c$ can then be used to update 762 the value of $\theta_r$. In various embodiments, the updating 762 of $\theta_r$ comprises adding the weighted, scaled and possibly clipped value of $\theta_c$ to the current value of $\theta_r$.

The updated value of $\theta_r$ is then provided to the step of rotating 738 for use with the next data sample pair. In various embodiments, $\theta_c$ is used as a correction on $\theta_r$ so as to iteratively move $\theta_r$ closer to a value that will result in zero residual angle upon successive passes through the phase tracking loop. When $\theta_c \approx 0$, then $\theta_r$ is approximately equal to the actual phase delay $\Delta\theta_n$ of the signal returned from the RFID tag at the carrier-wave modulation frequency $f_n$.

After updating 762 the rotation angle, the current value of $\theta_r$ may be appended 764 to a data list of rotation angles $\Delta\theta_k$ stored in memory. In various embodiments, the value of the stored rotation angle $\Delta\theta_k$ corresponds to the data sample pair $(I_{nk}, Q_{nk})$, and is set equal to the updated $\theta_r$ determined for that sample pair, e.g., $\Delta\theta_k = \theta_r$. A test 770 may then be executed to determine whether all data samples $I_{nk}, Q_{nk}$ have been received by the loop, e.g., whether $k = k_{max}$. If the last sample has not been received, the phase-tracking loop returns to incrementing 730 index k. Additional samples are processed in like manner.

In certain embodiments, when the last data sample derived from a returned signal at a particular frequency has been verified at the step of testing 770, the loop is exited and an averaging 780 of the recorded rotation angles $\Delta\theta_k$ is carried out. In a noise-free environment, the output of the IIR phase-tracking loop would be a sequence of angles that would become an ever more accurate estimation of the phase delay angle, e.g., $\theta_r$ would approach $\Delta\theta_n$ upon successive passes through the loop. With real-world noise present, the values of $\theta_r$ can bobble about $\Delta\theta_n$ with an RMS error related to the SNR ratio of the incoming I-Q samples. To improve the determination of the phase delay, the sequence of rotation angles $\Delta\theta_k$ can be averaged across many values after the IIR loop has settled. The number of samples used for averaging can be a portion of or nearly all recorded rotation angles $\Delta\theta_k$. In some embodiments, initial values of recorded rotation angles may be excluded from the average, e.g., values obtained near the beginning of the returned signal from an RFID tag when start-up transients associated with signaling protocols, the IIR DC removal and the IIR phase-tracking loops may be present. As an example, in some embodiments the signal returned from an RFID tag may comprise a transmission of the tag's EPC value. During reception of the signal, approximately 3000 data samples $I_{nk},Q_{nk}$ ($k_{max}$=3000) may be obtained. A first portion of the samples, e.g., between about 100 and 200, between about 200 and 400, between about 400 and 800 samples, may be excluded from the average 780 as transients subside. In a low-noise environment, a fraction of the remaining samples may be averaged. In a noisy environment, substantially all of the remaining samples may be averaged. The averaged value determined from the list of recorded rotation angles can then be output 782 as the estimated or measured value of phase delay $\Delta\theta_n$ for the returned signal from the RFID tag at a particular frequency $f_n$.

IV-C-2-a: IIR Phase-Tracking Loop: Small-Angle Approximation

In certain embodiments, the step of evaluating 740 the residual angle $\theta_c$ can be carried out in part using small-angle approximations. In some cases, calculation of the arctangent function can be processor burdensome. The use of small-angle approximations can expedite evaluation of $\theta_c$ within the IIR phase-tracking loop. In certain embodiments, after the IIR loop has settled, e.g., initial transients have decayed away and $\theta_r$ becomes approximately equal, to within a small-angle approximation, to $\Delta\theta_n$, the evaluation of $\theta_c$ generates small values for the residual angle $\theta_c$. When a small-angle state has been reached, e.g., $\theta_c$ falls within a small-angle approximation, the approximation $\arctan(\theta_c)\approx\theta_c$ can be used to evaluate $\theta_c$ 740 rather than a rigorous computation of the arctangent function. For this case EQ. 6 simplifies to $$\theta_c \approx \left(\frac{Q'_{nk}}{I'_{nk}}\right) \quad\text{(EQ. 7)}$$

Figure 8A:
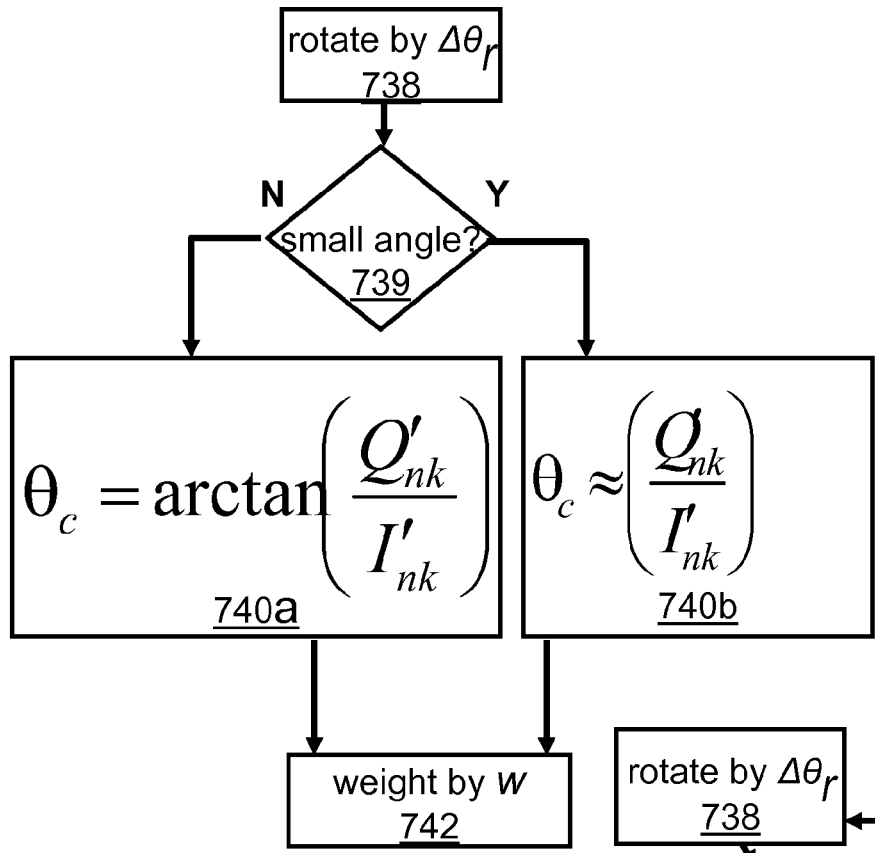
FIG. 8A represents an embodiment of a method which can be used in determining phase delay angle $\Delta\theta_n$. This method provides for optional use of the small-angle approximation.

An embodiment of evaluating $\theta_c$ 740 which incorporates small-angle approximations is depicted in FIG. 8A. After rotating 738 samples by $\theta_r$, a test may be performed to determine whether a small-angle state has been reached. The step of testing 739 can comprise determining whether the current value of $\theta_c$ is within a small-angle approximation range, e.g., $\theta_c$ is between about −0.5 radians and about 0.5 radians, or between about −0.25 radians and about 0.25 radians, or between about −0.12 radians and about 0.12 radians. In some embodiments, the step of testing 739 comprises a test for the value of loop index k, e.g., to determine whether k exceeds a value before which initial transients have decayed away. As an example, it may be discovered by testing the loop with typical data samples that transients normally decay within about the first 100, 200, 300 or 400 data samples. The step of testing 739 can then comprise determining whether k exceeds one of these values, or any value before which initial transients have decayed away. Depending on the outcome of the testing 739 data will be passed to either the step of evaluating 740a based upon rigorous computation of the arctangent function or the step of evaluating 740b based upon the small-angle approximation.

IV-C-2-b: IIR Phase-Tracking Loop: Weighting and Gain

Referring now to FIG. 6 and FIG. 7 and considering the step of weighting 742 the residual angle $\theta_c$, samples that are far from the DC-removed value of (0,0) provide more angle information than samples that are close to the origin (0,0). Samples falling close to the origin might occur as the tag response traverses the cluster from one excursion end to the other, and sampling happens during that traversal. During the traversal and sampling, noise can push the DC-removed and rotated sample off the real axis, resulting in apparent rotation error and a larger-than-expected $\theta_c$. In some embodiments, the evaluated $\theta_c$ can be weighted 742 by a value w that is small for small real parts and large for large real parts, e.g., weighted according to the unsigned distance along the real axis of the sample from the origin. The absolute value of the real part of the rotated sample can provide such a weighting function. For an embodiment which does not use small-angle approximations, the step of weighting 742 can comprise evaluating the right side of the following equation.

$$\theta_c \times w = \arctan\left(\frac{Q'_{nk}}{I'_{nk}}\right) \times |I'_{nk}| \quad\text{(EQ. 8a)}$$

For an embodiment which uses small-angle approximations, the step of weighting 742 can comprise evaluating the right side of the following equation.

$$\theta_c \times w = Q'_{nk} \times \text{sgn}(I'_{nk}) \quad\text{(EQ. 8b)}$$

In certain embodiments, the weighting 742 occurs in cascade with multiplication 750 by the loop gain parameter G. In such an embodiment, the weighting 742 has the effect of changing the overall loop gain sample by sample. It therefore can also change the loop bandwidth sample by sample. This can be advantageous in certain embodiments. For example, tags which may be located near an RFID reader can have large tag response signals, i.e. strong signals, and produce large $I_{nk},Q_{nk}$ excursions. This can generate large weighting values w, and result large loop bandwidth for faster loop settling times than tags located far from an RFID reader. Tags located far from the reader can have weaker signals, which will result in a narrower loop bandwidth, which can be thought of as longer integration times, and slower settling times. In such an embodiment, the loop gain is automatically and advantageously adjusted according to the strength of the received signal. In trials with a prototype RFID reader, IIR phase-tracking loop processing of data samples ($I_{nk},Q_{nk}$) derived from signals returned from tags located far from the reader has been verified to settle sufficiently quickly so that reliable evaluation of phase delay angle $\Delta\theta_n$ can be determined from remaining data samples after the settling of the DC removal and angle tracking loop. The transients died away and the DC and angle tracking loops settled by the end of the EPC response, or within about 2 milliseconds of tag response time for all read distances to more than four meters. Tags at less than two meters had transients and DC and angle tracking loops that would settle within about 1 millisecond due to increased signal strength and the weighting method described in this section.

In some embodiments, a weighting function w can be the square of the real part of the rotated sample $w=(I'_{nk})^2$. This weighting method can have the advantage of avoiding the branch function that may be necessary for some processor implementations of absolute value or sign determination in accordance with EQS. 7a-7b. The function of squaring may require fewer instruction cycles in some processors than those needed to find the sign or absolute value of a sample. It will be appreciated that the weighting based on the square of the real part can cause greater excursions in loop bandwidth than the sign or absolute value methods described above, and may require more careful control of the loop gain parameter G.

For embodiments where weighting 742 with non-unity values is used, it can be necessary to modify the loop gain parameter G to insure loop stability. This can comprise selecting a value for G such that when a maximum value of w is received in the loop, then the product G×w yields an overall loop gain which is within the stability region for the closed phase-tracking loop. In some embodiments, G can be adjusted to a fixed value by an operator of the RFID reader, or set at the factory to a fixed value, based upon cumulative data processing trials involving exemplary signals received from RFID tags. In some embodiments, G can be set to a selected value $G_o$ which is scaled automatically during reader operation, e.g., $G=G_o/|I'_{nk}|$ or $G=G_o/(A+|I'_{nk}|)$ where A may be a selected constant value.

IV-C-2-c: IIR Phase-Tracking Loop: Monitoring Uncertainty

Figure 8B:
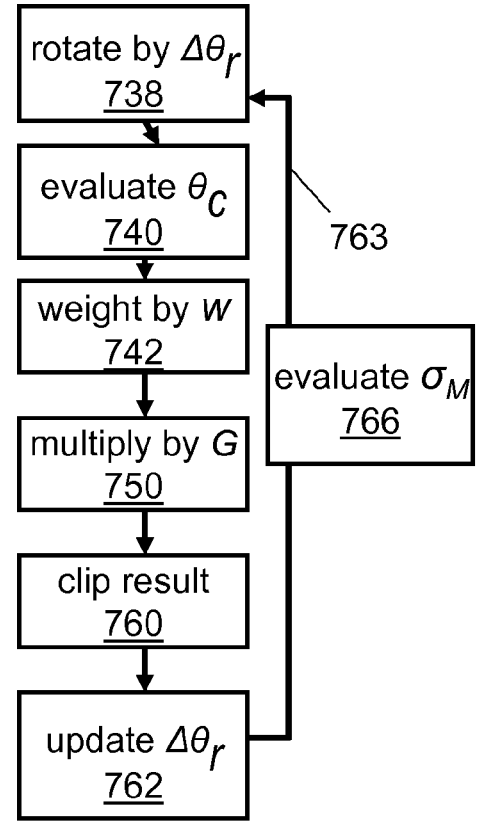
FIG. 8B represents an embodiment of a method which can be used in determining phase delay angle $\Delta\theta_n$. This method provides for monitoring the standard deviation or variance of processed I-Q data while the data is being processed.

Referring now to FIG. 8B an additional embodiment of processing for a portion of the IIR phase-tracking loop is depicted. For this embodiment, the phase-tracking loop further comprises a step of monitoring or evaluating 766 an uncertainty associated with the processed I-Q data. The monitored uncertainty can be the standard deviation σ, of certain processed data, or variance $σ^2$ of the data. For the embodiment shown, the step of evaluating 766 an uncertainty can comprise monitoring the values of rotation angles $θ_r$ fed back to the step of rotating 738, determining an uncertainty σ associated with the values $θ_r$ fed back, and providing as output one or more values of σ. A substantially equivalent method of evaluating 766 would be to determine an uncertainty associated with the values $Δθ_k$ as they are sent for storage in memory. As noted previously, after the loop settles, the values of $θ_r$ will bobble about a substantially constant value. The uncertainty σ represents a measure of the bobbling. In some embodiments, the variance $σ^2$ may be computed. It will also be appreciated that an uncertainty associated with $θ_c$ can be evaluated similarly by monitoring the values of $θ_c$ for each pass through the phase-tracking loop.

The uncertainty or variance can be evaluated from the data in any one of several ways. As an example, a sample variance may be computed or calculated for a set of M data points according to the equation $$\sigma_M^2 = \frac{1}{M} \sum_{i=1}^{M} (\Delta\theta_k - \bar{\theta}_r)$$ (EQ. 9)

where $Δθ_k$ represents the $k^{th}$ measured and determined phase delay angle in the set, and $\bar{θ}_r$ represents a calculated average value of the phase delay angle for the set of M data points. In certain embodiments, M is less than the total number of samples obtained while processing a signal returned from an RFID tag, e.g., $M<k_{max}$. In some embodiments, $\bar{θ}_r$ and $σ_M^2$ are evaluated in a boxcar or sliding boxcar manner during execution of the phase-tracking loop. In some embodiments, M can be any value between about 0 and about $k_{max}$. As an example of boxcar processing, M may be about 200 and $k_{max}$ may be about 3000. After initial transients of a returned signal have subsided, successive sets of 200 values of $Δθ_k$ may be evaluated according to EQ. 9 and the square root of the result taken in evaluating 766 an uncertainty $σ_M$, or standard deviation, associated with the processed data samples $I_{nk},Q_{nk}$. Values of $σ_M$ can be output from the step of evaluating 766 for each successive set of 200 data samples processed. In embodiments employing sliding boxcar processing, the evaluating 766 may be continuously updated as the set of M data points "slides along" the stream of received data samples $I_{nk},Q_{nk}$. One or more new determined values of $Δθ_k$ may be added to the set of M data values with an equivalent number of oldest data values removed from the set, and the step of evaluating 766 repeated for the updated set.

In certain embodiments for which multiple values of $σ_M$ or $σ_M^2$ are determined while processing I-Q data samples associated with a returned signal from an RFID tag at a particular frequency $f_n$, an average value can be determined for either the standard deviation $σ_n$ or the variance $σ_n^2$ and the average value used as a measure of uncertainty associated with the processed data at that frequency. In some embodiments, an entire set of $Δθ_k$ values, e.g., 3000 values minus any values associated with initial transients, are processed together to evaluate a $σ_n$ or $σ_n^2$ associated with processed I-Q data derived from a returned signal from an RFID tag at a particular frequency $f_n$. For example, the step of evaluating 766 may occur after the step of averaging 780 and the step of outputting 782 may further comprise providing $σ_n$ or $σ_n^2$, or in some embodiments a selected value of $σ_M$ or $σ_M^2$, as output data.

There can be certain advantages to evaluating 766 the standard deviation or variance associated with the processed data either during execution of the phase-tracking loop or after execution of the phase-tracking loop. In certain embodiments, a value of σ or $σ^2$ can be associated with the calculated phase delay angle $Δθ_n$ for a returned signal from an RFID tag at a particular frequency $f_n$. The value of σ or $σ^2$ can then be examined during further processing of $Δθ_n$ and may alter the subsequent processing of $Δθ_n$. (An omission of subscripts n and M for σ or $σ^2$ indicates that either respective quantity may be used, e.g., $σ_n$ or $σ_M$ and $σ_n^2$ or $σ_M^2$.) As an example, a weighting factor may be assigned to $Δθ_n$ based upon the value of σ or $σ_M^2$. A large weighting factor may be assigned when σ or $σ^2$ are small in value. In embodiments where $σ_M$ or $σ_M^2$ are evaluated 766 and monitored during execution of the phase-tracking loop, the loop may be exited when $σ_M$ or $σ_M^2$ settles to a value less than a selected amount, and the current value of $θ_r$ taken as $Δθ_n$. This can reduce data processing time and free the phase estimator 220 and/or processor 210 for other tasks.

Although uncertainty, e.g., $σ_M$ or $σ_M^2$, can be monitored and evaluated 766 for a first IIR phase-tracking loop as depicted in FIG. 8B, it will be appreciated that a second IIR phase-tracking loop can be included with the apparatus and method and employed in parallel with the first phase-tracking loop. In certain embodiments, the second phase-tracking loop provides estimated phase delays having a larger uncertainties than those provided by the first phase-tracking loop. In some embodiments, the second phase-tracking loop has a shorter integration time, or computes the variance in accordance with EQ. 9 for a smaller value of M, than the first phase-tracking loop. In such embodiments, uncertainties measured by the second phase tracking loop can be used to establish data weighting factors and/or determine when the first phase-tracking loop may be exited.

IV-C-2-d: IIR Phase-Tracking Loop: Reduction in Processing Time

In some embodiments wherein the phase tracking loop is exited conditionally when σ or $σ^2$ settles to a value less than a selected amount, the tag reader can initiate a process to enable a next measurement at a next carrier-wave frequency $f_{n±1}$. There can be at least two approaches to initiating a sequence to enable a next measurement. In one embodiment which utilizes certain RFID tags which are non-compliant to the Class 1 Generation 2 RFID tag specifications, the tags can have test modes where the tags will backscatter known signal patterns and halt when powered down. For such tags, the tag may be singulated and placed in a test mode backscatter condition. Phase delay data can be collected until σ or σ² settles to a value less than a selected amount, at which point the tag is powered down, e.g., the RFID tag ceases its broadcasting of the carrier wave. The RFID reader can then move to a next frequency and repeat the process of singulating and placing the tag in a test mode backscatter condition, so that phase delay data can be collected again at the next frequency. Employing such a process can reduce overall data acquisition time. In some embodiments, the tags have a long power-down time, e.g., more than about 1 millisecond, which can eliminate the need for re-singulation. As an example, if the shift in tag reader frequency can be achieved in less than about 50 microseconds, while the test mode backscatter condition persists, the tag reader can hop to the next frequency and collect data from the tag without resingulating. For normal Generation 2 compliant tags, power down, shift frequency and power up takes about 1.5 milliseconds.

In an embodiment which utilizes RFID tags in compliance with the Class 1 Generation 2 RFID tag specifications, frequency hopping can be employed during a returned signal from a singulated tag to reduce overall data acquisition time. As an example, a tag can be singulated and requested to return its EPC value, or any data value. In certain embodiments, the tag initiates modulation of the carrier-wave signal to provide its EPC value to the tag reader, and the modulation continues for a period of time between about 20 microseconds (μs) and about 30 μs, between about 30 μs and about 40 μs, between about 40 μs and about 60 μs, between about 60 μs and about 80 μs, and yet between about 80 μs and about 100 μs in some embodiments. Phase delay data can be collected during a portion of the EPC transmission until σ or σ² settles to a value less than a selected amount, at which point the RFID tag reader hops to a next frequency and broadcasts a carrier-wave signal to the tag at the next frequency. In some embodiments, the frequency hop takes less than about 20 μs, less than about 15 μs, and yet less than about 10 μs in certain embodiments. In various embodiments, the frequency hopping is carried out within a time period which is as short as possible but which does not result in spectral splash which would violate channel regulation requirements. In such an embodiment, collection of phase delay data can be carried out for multiple carrier-wave frequencies during a single EPC backscatter interval. Employing such a process can reduce overall phase delay data acquisition time.

IV-D. Producing a Data Set Comprising Phase Delays

Figure 4C:
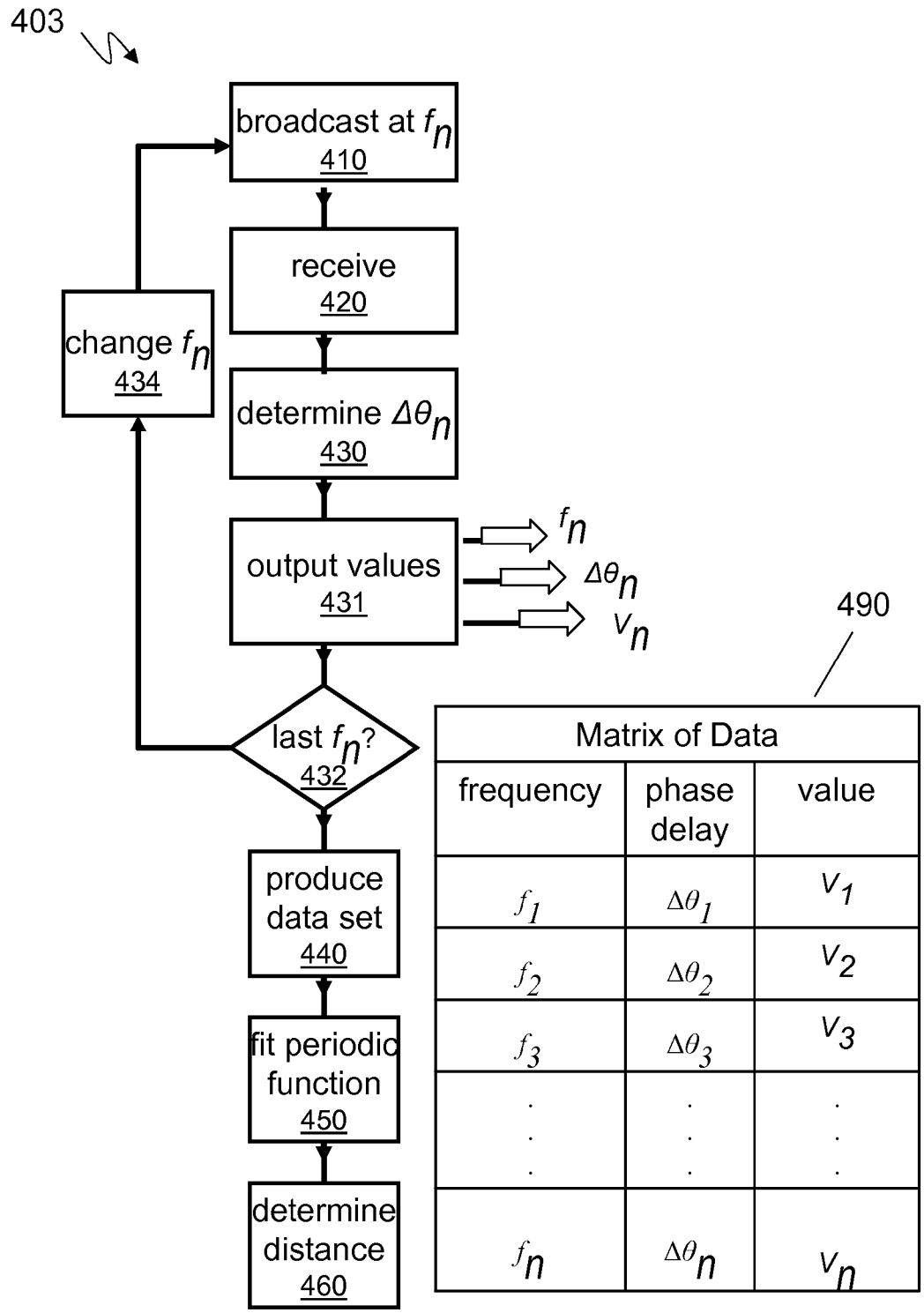
FIG. 4C represents an embodiment of a method for determining tag range with an RFID system.

Referring again to FIGS. 4A-4B, the method of determining a distance between an RFID tag and an RFID tag reader's antenna further comprises the step of producing 440, by the processor 210, a data set from the determined phase delays. In certain embodiments, the produced data set can comprise a list of determined phase delay angles $\Delta\theta_n$ and their associated frequencies $f_n$. In various embodiments, the processed and produced data $f_n$, $\Delta\theta_n$ is representative of $\Delta\theta(f)$. It will be appreciated that the step of producing 440 the data set can occur after all values of $\Delta\theta_n$ have been determined, but in some embodiments can occur as values of $\Delta\theta_n$ are determined. The method depicted in FIG. 4C exemplifies an embodiment in which a data set is produced as values of $\Delta\theta_n$ are determined. In some embodiments, the produced data set can include values $V_n$ in addition to $\Delta\theta_n$ and $f_n$, such as but not limited to, standard deviation σ, variance σ², decoded EPC value of the interrogated RFID tag, or a decoded value returned from a tag which was transmitted to the tag by the tag reader, e.g., a transmitted value reflected back by the RFID tag. In some embodiments, the produced data set may be recorded in a matrix 490 or multiple data arrays or data records. For an embodiment as depicted in FIG. 4C, the step of producing data 440 may be omitted, or it may be a step which comprises refinement of the data set generated from step of outputting values 431. For example, the step of producing data 440 may comprise one or more of the following processes: ordering the data from lowest to highest frequency, removing certain data points from the data set, and expanding the data set by interpolating data points between measured data points.

In theory, the functional form of the phase delay for the RFID tag range measurement can be represented by the following equation $$\Delta\theta(f) = -2\pi \cdot f \cdot \frac{2 \times D}{c} \qquad \text{(EQ. 10a)}$$

where D is the distance between tag reader's antenna and tag, and c is the speed of light. EQ. 10a represents a line of negative slope, for which increasing values of frequency produce ever decreasing phase delay angles. In practice, measurement apparatus typically resolves the measured or determined phase delay angles $\Delta\theta_n$ to a range of about π radians, or in some cases to a range of about 2π radians. Therefore, the phase delay data $\Delta\theta_n$, $f_n$ produced by the tag reader can be represented by a modification of EQ. 10a to include a phase-range constraint, e.g., the calculated phase delay $\Delta\theta$ is restricted to values within a range of about π radians, or in some embodiments about 2π radians, or in some embodiments about π/2 radians wherein the chosen phase-range constraint is dependent upon the detection electronics and data processing methods. In a preferred embodiment of the methods described above, the phase-range constraint is about π radians.

For current RFID tags, e.g., tags produced according to EPC C1G2 specifications (Gen 2 tags), a π phase ambiguity can arise due to the nature of the response from the tag. In some embodiments, because of this ambiguity, the measured data produced by the tag reader can be known to values within a range of about π radians. Accordingly, for such an embodiment, it is desirable to limit the frequency increments Δf between broadcast frequencies $f_n$ such that the resulting change in phase delay between adjacent frequencies will be less than about π radians. Accordingly, the measured data for such an embodiment can be represented by EQ. 10a subject to a phase-range constraint that the calculated phase delay $\Delta\theta$ is restricted to values within a range of about π radians.

In some embodiments with the Gen 2 tags, the phase delay can be determined to modulo 2π if the start of backscatter and/or preamble is included in the signal processing. This can allow for a distinguishing between two tag reflection states: a reflection state "prior" to backscatter and a reflection state "during" backscatter. If the two states are distinguished, then during phase estimation and data processing phase rotations determined for the "prior" state can always be placed to the left on the real axis, and phase rotations for the "during" state can be placed to the right on the real axis, so that the phase delays can be known to within a range of about 2π radians. The ambiguity can also be resolved from examination of the end of a backscatter signal that returns to the "prior" state in a defined manner. However, either approach can require feedback from a bit decoder/correlater, e.g., decoder 305, to determine the "prior" and "during" states, and can add complexity to the RFID system.

Figure 9A:
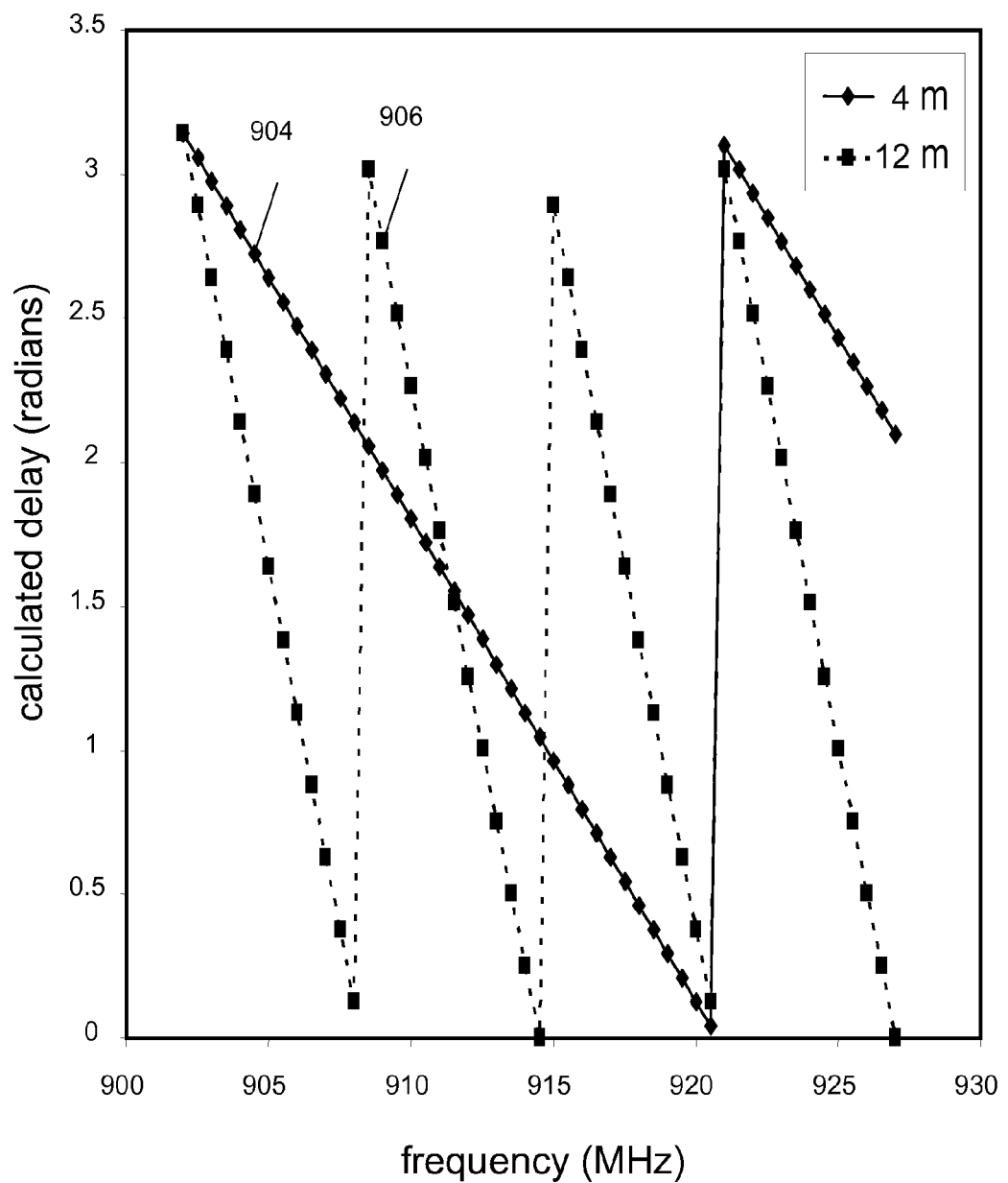
FIG. 9A is a plot of two theoretical calculations of phase delay $\Delta\theta$ as a function of carrier-wave signal frequency f. The functional form of $\Delta\theta(f)$ is periodic and saw-toothed shaped. A tag range of 4 meters was used to obtain one plot 904 and a tag range of 12 meters was used to obtain the second plot 906.

Examples of the functional form of the phase delay $\Delta\theta(f)$ calculated from EQ. 10a subjected to a phase-range constraint of $\pi$ radians are shown in the graph of FIG. 9A. For this graph, $\Delta\theta(f)$ has been plotted for two cases. For the first case, curve 904, the distance D between an RFID tag reader's antenna and RFID tag is taken to be about 4 meters. For the second case, curve 906, the distance between the antenna and tag is about 12 meters. The broadcast frequency band extends between about 902 MHz and about 927 MHz, and frequency increments $\Delta f$ were taken to be about 500 kHz. It can be seen from the data that the functional form of the phase delay $\Delta\theta(f)$ subject to the $\pi$ phase-range limitation has a periodic characteristic and is substantially saw-tooth shaped. The inventors have recognized that the periodicity of the data is related to the distance between the RFID tag reader and an RFID tag.

Figure 9B:
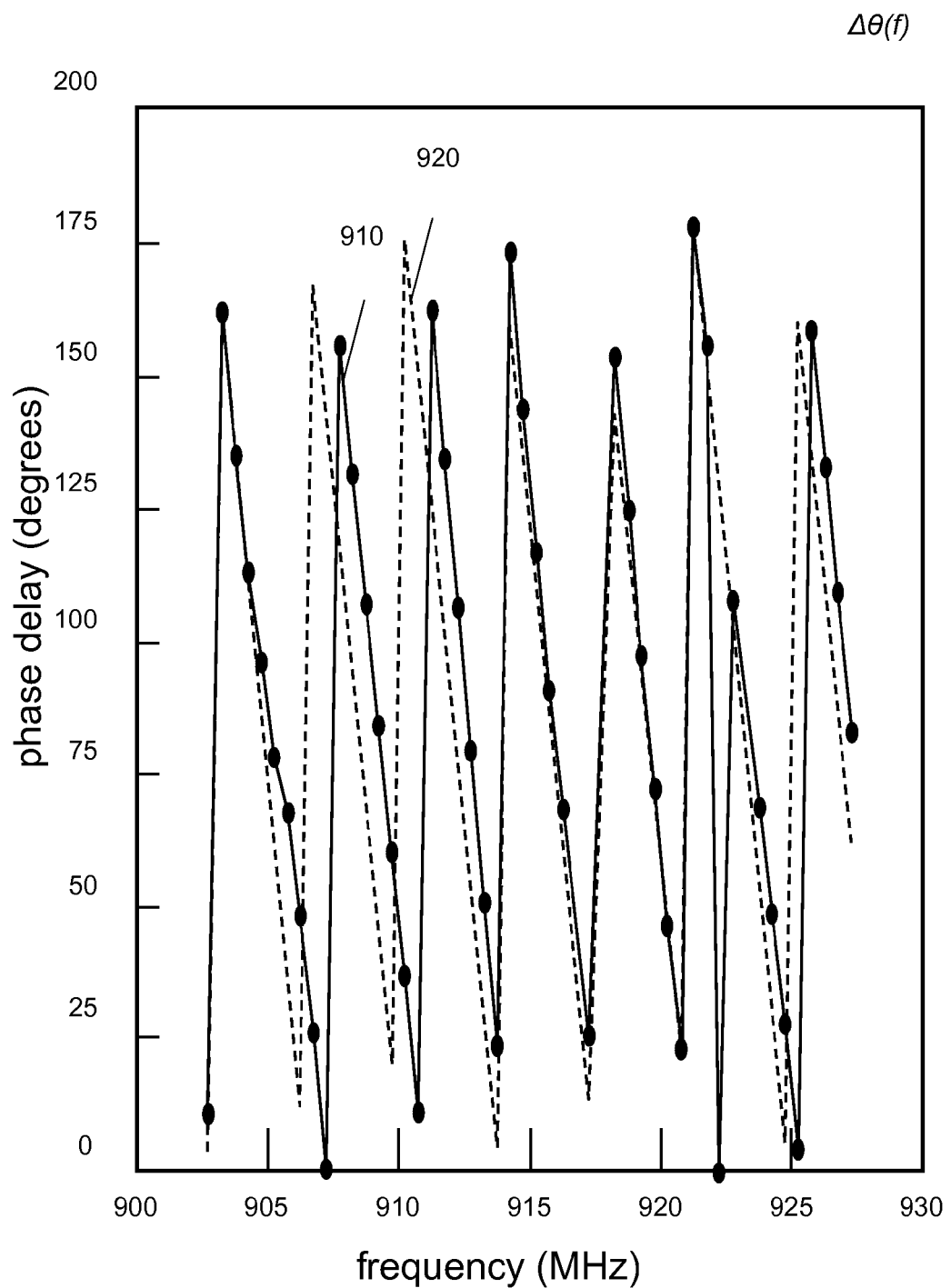
FIG. 9B shows measured phase delays, data points on curve 910, plotted as a function of carrier-wave signal frequency, and a corresponding plot of calculated phase delays, dashed curve 920. The tag range was 14 feet. The plot of calculated phase delays was selected according to a sum of squared errors method and comprises a best fit to the data of curve 910. An adjustable parameter, tag distance, used to obtain the plot 920 of calculated phase delays can provide an estimate of tag range.

In FIG. 9B, values of phase delays (solid circles connected by solid line 910) measured with a prototype RFID tag reader and determined using software code are plotted as a function of the carrier-wave frequency used for broadcasting the interrogation signal. Irregularities in the plotted data can be attributed to signal noise, signal processing errors, and/or systematic processing errors. For the measurement, phase delays were resolved to within modulo $\pi$ radians, i.e., values ranging between about 0 degrees and about 180 degrees. The distance between the antenna 112 and singulated RFID tag 120a was about 4.25 meters for the trial. By comparison with FIG. 9A, it can be seen that the number of cycles or $\pi$ phase wraps in the phase delay function 910 are significantly greater than those for the 4-meter case, curve 904. The difference can be attributed to propagation delays associated with cabling between the RFID reader's local oscillator 310 and antenna 112 in the transmitting and receiving signal paths, and electronic phase delays in these paths, e.g. phase delays associated with RF filters, power dividers, amplifiers. The propagation and phase delays can be approximately accounted for with the following modification to EQ. 10a.

$$\Delta\theta(f) = -2\pi \cdot f \cdot \frac{2(D + D_{\mathit{eff}})}{c} \quad \text{(EQ. 10b)}$$

The value $D_{\mathit{eff}}$ has been incorporated into the equation to account for cabling and electronic delays, and can be determined using a calibration procedure in which an RFID tag is placed at the location of the tag reader's antenna, e.g., D=0. It is $D_{\mathit{eff}}$ that produces extra periods or phase wraps in the measured data, curve 910, of FIG. 9B. Although $D_{\mathit{eff}}$ can be calibrated out of a produced data set, e.g., accounted for and removed from the measured data, in some embodiments described in the following section it can be beneficial to process the data prior to removing $D_{\mathit{eff}}$ from the results. In certain embodiments, an RF component having a selected delay is added to the RF electronics in the signal path to and/or from the tag reader's antenna, so as to provide multiple periods in $\Delta\theta(f)$. Also shown in FIG. 9B is a functional fit, curve 920, to the measured data. The functional fit is based on EQ. 10b subject to a phase-range constraint of about $\pi$ radians.

IV-E. Determining Tag Range

In various embodiments, the step of determining 460, or 465, tag range comprises processing data produced in the step of producing 440 data. For the inventive methods depicted in FIG. 4A and FIG. 4B, the produced data can be processed according to different algorithms to yield tag range. Additional data processing methods, described in this section, can also be employed to provide an estimated tag range from the produced data.

In certain embodiments, the produced data, e.g., phase delay data and/or value data 367, frequency values 361, EPC codes 368, generated during the processing of the signals returned from a singulated RFID tag is output to processor 210 for subsequent processing. The processor 210 can receive all or some of the generated data. The subsequent processing can comprise processing the received data "on the fly" substantially as the data is received, or storing the received data into memory 230, e.g., into a data matrix or plural data arrays. Stored data can be read out of memory for processing at a still later time. In some embodiments, the data may be processed via matrix manipulations, e.g., using matrix operations and transformations.

In certain embodiments, data processing can be carried out with computer code. An example of a computer code which determines a distance between an RFID tag and an RFID tag reader's antenna according to one of the inventive methods is provided in the Appendix. The software code provided in the Appendix has been written for MatLab, however the software can be readily adapted for other programming languages, e.g., Java, C, C+, C++, Fortran, Basic, QuickBasic, Visual Basic, Pascal, Assembly, by one skilled in the art of computer programming.

After the step of producing 440 a data set, e.g., a data set 490 as depicted in FIG. 4C, containing at least a collection of phase delays $\Delta\theta_n$ and their associated frequencies $f_n$, the data set can be further processed to determine 460, or 465, a tag range, e.g., a distance between an RFID tag and RFID tag reader's antenna. There can be at least four methods used to determine a tag range. A first method involves evaluating a slope associated with $\Delta\theta_n(f_n)$. A second method, in accordance with FIG. 4A, includes fitting 450 a periodic function to $\Delta\theta_n(f_n)$. A third method involves counting the number of cycles in $\Delta\theta_n(f_n)$. A fourth method, in accordance with FIG. 4B, includes transforming 452 the produced data set and evaluating 458 the transform of the data. Further details about each of these methods are described in the following sections.

IV-E-1. Determining Tag Range: Linear Fit

Referring again to FIG. 9B, in some embodiments, the measured phase-delay data can be "unwrapped" to produce a set of data that can be represented by a line with a slope m. From EQ. 10b, the slope of a line which represents the unwrapped data is given by $$m = -4\pi \frac{(D + D_{\mathit{eff}})}{c} \quad \text{(EQ. 11)}$$

For this process, a line can be "best fit" to the unwrapped data using any of a variety of fitting techniques, e.g., least squares fit, linear regression, etc. This is similar to the method described in U.S. Pat. No. 7,119,738 which is incorporated by reference. Once a best-fit line is selected, its slope m can be determined Since c=3×10$^8$ m/s, and $D_{\mathit{eff}}$ can be determined by a prior calibration, the tag range D can be determined from EQ. 11.

As an improvement to this method, additional values $V_n$ from the produced data set 490 can be used in the process of determining a best-fit line for the unwrapped data. As an example, the additional values $V_n$ may comprise standard deviations or variances, $\sigma$ or $\sigma^2$, associated with each determined phase delay $\Delta\theta_n$. Each value $V_n$ can then be used to determine a weighting factor $p_n$, e.g., where $0 \leq p_n \leq 1$, for its associated data point in the evaluation of a best-fit line. For example, a large standard deviation or variance reflects low confidence in a determined phase delay $\Delta\theta_n$. A small weighting factor, closer to 0, can then be assigned for that data point. Conversely, a small standard deviation or variance reflects high confidence, and a large weighting factor, closer to 1, can be assigned for that data point. When calculating differences between a candidate line and the set of unwrapped data, differences at each data point can be multiplied by the associated weighting factor $p_n$. According to this improved method of determining a best-fit line to the measured data, more emphasis is given to data points having smaller variances.

As another example of using values $V_n$ from the produced data set 490 in determining a best-fit line, the values $V_n$ can be used to cull the data. In certain embodiments, the value of $V_n$ can comprise an EPC value or other transmitted value which has been decoded from the signal returned from the RFID tag. As the data set 490 is processed, each value $V_n$ can be checked to determine whether the value is in agreement with an expected value. A value which is not in agreement with an expected value can indicate poor signal conditions. For data points which have values $V_n$ not in agreement with an expected value, the data point can be excluded from the set during subsequent processing, or assigned a weighting factor $p_n=0$, which would effectively cull the data from the set. The processes of data weighting or culling can be used in the following methods for determining tag range.

IV-E-2. Determining Tag Range: Periodic Functional Fit

In certain embodiments, a second process used to determine a tag range comprises fitting 450 a periodic function to a produced data set comprising at least phase delays $\Delta\theta_n$ and associated frequencies $f_n$. For this process, a function having a periodic characteristic which best fits the produced data set can be selected by the processor 210. Candidate functions can be generated by the processor based upon EQ. 10b subject to a phase-range constraint. For each trial function calculated, a particular value $D_i$ can be used as the guessed tag distance from the reader's antenna. The discrete interrogation frequency values $f_n$ can be used as frequency values for f. The processor 210 can then generate calculated phase delays for each trial function, and determine differences between the calculated phase delays and measured phase delays $\Delta\theta_n$. The processor 210 can then select from among the candidate functions a function having a periodic characteristic which best fits the produced data set. In some embodiments, the best fit function is the one having an absolute minimum sum of squared errors between a candidate function's values and the measured data. Once the best-fit function is selected, the tag range can be determined using the guessed distance associated with the selected function and subtracting $D_{eff}$.

Figure 10A:
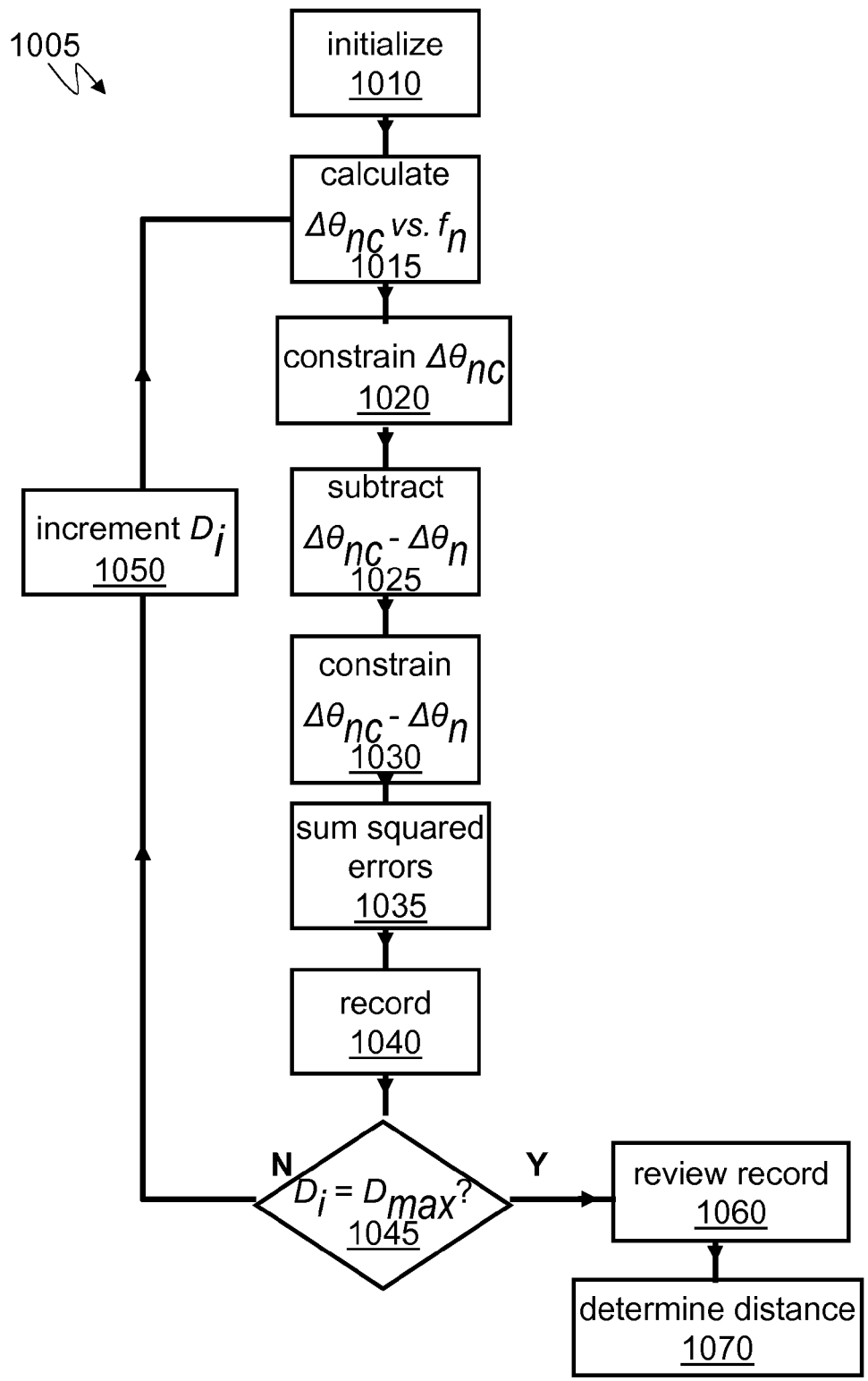
FIG. 10A represents an embodiment of a method for determining tag range or distance.

An embodiment of the second process which can be used to determine tag range is depicted in FIG. 10A. The process 1005 can begin with an initialization 1010 sequence, which can set an initial value for a guessed distance $D_i$ and null the values of an array of summation variables $S_i$. The process can then execute a step of calculating 1015 for each interrogation frequency $f_n$ a calculated phase delay value $\Delta\theta_{nc}$ at the particular $D_i$. The calculated values $\Delta\theta_{nc}$ can then be constrained 1020 according to the phase-range constraint implemented for the RFID system, e.g., about π radians, about 2π radians, or about π/2 radians. Differences can then be determined between the calculated phase delays $\Delta\theta_{nc}$ and the measured phase delays $\Delta\theta_n$ by subtracting 1025 the two corresponding values for each frequency $f_n$. The differences can also be constrained 1030 according to the same phase-range constraint. The constrained differences can then be squared and summed 1035 to produce a value for $S_i$, which represents the sum of squared errors between the calculated phase delays $\Delta\theta_{nc}$ for the particular guessed distance $D_i$ and measured phase delays $\Delta\theta_n$. The values $D_i$ and $S_i$ can be recorded 1040 in memory by the processor 210 for later analysis. The process 1005 can then test 1045 to determine whether a maximum distance guess $D_{max}$ has been used. If a maximum distance guess has not been used, the distance guess $D_i$ is incremented by an amount $D_{inc}$ and processing returns to step 1015. If a maximum distance guess has been used, the record of $D_i$ and $S_i$ can be reviewed 1060 to identify a value of $D_i$ which is associated with an absolute minimum value of the recorded $S_i$'s. The tag range, or distance between tag and reader, can then be determined 1070 by selecting the value of $D_i$ which is associated with a particular absolute minimum value $S_i$ as the distance which best estimates the actual tag-to-antenna distance. The distance $D_i$ can then be provided as output data to a user of the tag reader.

In some embodiments, the process 1005 can include a step of weighting the squared error or culling the data, steps described in the previous section. In a preferred embodiment, the weighting of squared errors occurs during execution of the step of calculating and summing 1035 the squared errors. In particular, each squared error can be weighted before being added to the summation value $S_i$. Data culling can occur at or between any step from step 1015 to and including step 1035.

Figure 13A:
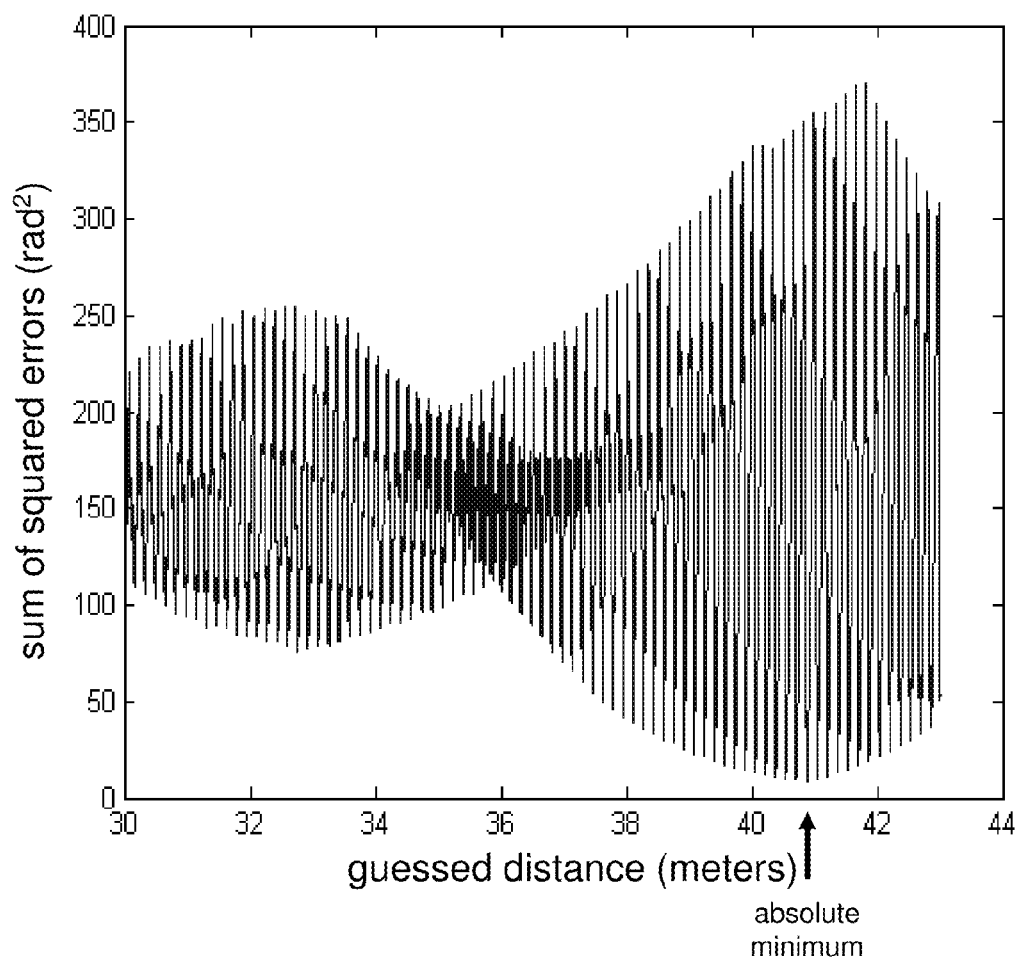
FIG. 13A is a plot of sums of squared errors as a function of guessed distance. The sums of squared errors are derived from differences between measured data, e.g., the data of curve 910 in FIG. 9B, and calculated data for a similar function form $\Delta\theta(f)$ with tag range as an adjustable parameter. The absolute minimum of the sums of squared errors provides an estimate of tag range.

Because of the periodicity of the measured phase delays $\Delta\theta_n$, as can be seen from FIG. 9B, the sum of square errors can also be periodic when plotted as a function of guessed tag range $D_i$. For example, a plot of the $S_i$ values as a function of $D_i$ can show periodic variations in $S_i$ with multiple minima values, and one absolute minimum value. An example of a plot of such data is shown in FIG. 13A. In certain embodiments, there can be a number of minima close to the absolute minimum. Because of the periodicity of $S_i$ it is advantageous to select a distance increment $D_{inc}$ which is small enough so that the absolute minimum can be found, e.g., a step by $D_{inc}$ in guessed distance does not step over the true absolute minimum. For this condition to be met, the inventors have recognized that the distance increment should be limited according to the following relation.

$$D_{inc} \leq 0.01 \frac{c}{f_{mid}} \quad \text{(EQ. 12)}$$

For this expression, c is the speed of light, and $f_{mid}$ is the frequency value of the carrier-wave at mid band for the set of interrogation frequencies. For a frequency value $f_{mid}$ of about 915 MHz, $D_{inc}$ can be less than about 3 millimeters. In some embodiments, is between about 0.5 mm and about 1 mm, between about 1 mm and about 2 mm, and yet between about 2 mm and about 3 mm in some embodiments.

The process 1005 described in this section has an advantage of relying on error minimization across all the measured and processed I-Q data. This can provide better immunity to noise, e.g., multipath noise, random noise, signal-processing errors, that can result in erroneous values of the measured phase delay angles $\Delta\theta_n$. As was mentioned above, data weighting and culling can also be employed to reduce deleterious effects due to noise. The inventors have discovered that the process 1005 for determining tag range provides better immunity to noise than the linear fit method, as is demonstrated in the Examples.

IV-E-3. Determining Tag Range: Counting Phase Wrap Cycles

A third process which may be used to determine a tag range comprises counting the number of cycles in the periodic phase delay function $\Delta\theta_n(f_n)$, e.g., counting the number of cycles in the measured data, curve 910, of FIG. 9B. The theoretical data of FIG. 9A shows that the number of cycles in $\Delta\theta(f)$ is inversely proportional to the tag range. Once an actual tag range is determined with the tag reader, e.g., a distance $D_c$ determined in a calibration run, all other tag ranges or distances D can be determined from the following relation $$D = \frac{N_m}{N_c} D_c \qquad \text{(EQ. 13)}$$

where $N_m$ is the number of cycles, or periods, determined from the values of $\Delta\theta_n$ in the current measurement, and $N_c$ are the number of cycles determined from the measured values of $\Delta\theta_n$ in the calibration run. EQ. 13 will provide an approximate value of tag range or tag distance provided the hardware of the tag reader, e.g., antenna cable lengths and RF elements which may introduce phase delays, is not significantly altered between calibration of the tag reader and a tag range measurement and the same broadcast frequency band is used. In some embodiments, the number of cycles $N_m$ can be determined using the processor 210 by counting the number of phase jumps, e.g., jumps from about 0 to about $\pi$ radians, in the recorded values of $\Delta\theta_n$. This determination of $N_m$ can yield a crude estimate of the tag range.

In one embodiment, the recorded values of $\Delta\theta_n$ can be processed to determine an average measured frequency step $\overline{F}_m$ associated with each phase jump. For this, the processor 210 can average the differences in frequencies associated with each phase jump. $\overline{F}_m$ can be the average of these differences. The number of cycles within the spanned frequency range can be determined by dividing the spanned frequency range $f_{max}-f_{min}$ by $\overline{F}_m$. This can provide a more accurate estimate of the tag range, since it can allow for fractional cycles in the measured function $\Delta\theta(f_n)$. Once the number of cycles has been determined, EQ. 13 can be evaluated by the processor 210 and the tag range D provided as output data to a user of the tag reader.

In some embodiments, the method of counting phase wrap cycles and the method of fitting a periodic function may be used together to provide an estimate of tag range. For example, the method of counting cycles may first be executed to obtain an approximate value D for tag range. Subsequently, the method of fitting a period function can be executed wherein the guessed tag range $D_i$ is limited to a small range about D, e.g., $D_i$ ranges in value from about D+1 meter to about D+1 meter, from about D−0.5 meter to about D+0.5 meter, from about D−0.2 meter to about D+0.2 meter, from about D−0.1 meter to about D+0.1 meter, from about D−0.05 meter to about D+0.05 meter, from about D−0.02 meter to about D+0.02 meter, from about D−0.01 meter to about D+0.01 meter, and yet from about D−0.005 meter to about D+0.005 meter.

An advantage to using a combination of methods is a reduction in processing time associated with the method of fitting a periodic function. For example, the use of the method comprising cycle counting can eliminate the need to calculate the sum of squared errors over the entire range of possible tag distances in fine distance increments. An additional advantage is that the accuracy of the method comprising a periodic functional fit can be utilized in determining a final estimate of tag range.

IV-E-4. Determining Tag Range: Data Transform

Referring again to FIG. 4B, a fourth process which may be used to determine a tag range comprises transforming 452 the phase delay data $\Delta\theta_n$. In some embodiments, the transforming comprises taking a Fourier transform or inverse Fourier transform (IFT) of the phase delay data $\Delta\theta_n$. The units, e.g., radians and frequency, associated with the data are not of particular importance for the purposes of the Fourier transform or inverse transform method provided data measurements are made consistently, e.g., the broadcast frequency band and frequency increment are substantially the same for all tag range measurements. In various embodiments, the transforming yields a value representative of the periodicity of the phase delay data $\Delta\theta_n(f_n)$, e.g., the periodicity of the phase delay data plotted in FIGS. 9A-9B.

Figure 11:
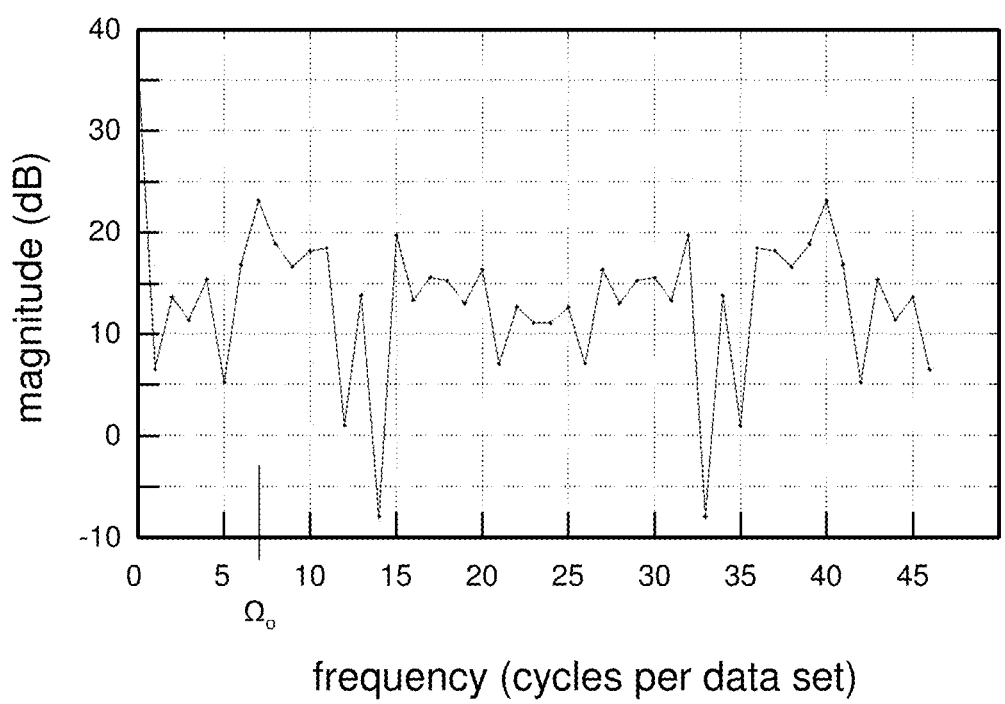
FIG. 11 is a depiction of a Fourier transform of $\Delta\theta(f)$ data. The transformed data can be evaluated to provide an estimate of tag range.

As an example, the phase delay data $\Delta\theta_n(f_n)$, which is produced 440 as a result of processing multiple sets of I-Q data, can be Fourier transformed to provide a data set representative of spectral energy of the measured functional form of $\Delta\theta_n(f_n)$. In some embodiments, the Fourier transform can be a discrete Fourier transform or fast Fourier transform. In various embodiments, the Fourier transform provides information about a fundamental periodicity $\Omega_o$ of the phase delay data $\Delta\theta_n(f_n)$, e.g., a spectral peak will occur in the Fourier transformed data at approximately $\Omega_o$. As an example, the data of FIG. 9A, curve 904 or 906, can be Fourier transformed to produce transformed data. An example of fast Fourier transformed (FFT) data is plotted in FIG. 11 on log vs. linear scaled axes. The Fourier transformed data corresponds to the data of curve 910 in FIG. 9B. The horizontal axis corresponds to frequency and has units of cycles per data set. The maximum peak value at f=0 corresponds to the DC offset in the phase delay data and can be ignored in processing the transformed data. There is left-half right-half symmetry of the transformed data, due to the FFT input data being all real; which is a property of the FFT process and can also be ignored. The peak value, ignoring the DC component, at f=7 corresponds to the predominant frequency of the data of curve 910, and represents that the data set has substantially seven cycles. Examination of trace 910 shows about six and a half cycles, confirming that the FFT technique yields a substantially accurate representation of the phase delay data. The peak in the FFT at f=7 captures the nearest bin of the FFT to the predominant repetition frequency in trace 910. The data drop-out in curve 910 at 922.25 MHz is averaged away in the FFT process. In various embodiments, a spectral peak is identified in the transformed data, and this spectral peak can correspond to the fundamental periodicity $\Omega_o$ of the phase delay data.

In various embodiments, knowledge of $\Omega_o$ is used to determine tag range. Once an actual tag range is determined with the tag reader, e.g., a distance $D_c$ determined in a calibration run, all other tag ranges or distances D can be determined from the following relation $$D = \frac{\Omega_{om}}{\Omega_c} D_c \qquad \text{(EQ. 14)}$$

where $\Omega_c$ is the fundamental periodicity determined from the transformation of measured values $\Delta\theta_n$ in a calibration run, e.g., with a known tag distance $D_c$ and $\Omega_{om}$ is the fundamental periodicity determined from evaluation of the transformation of $\Delta\theta_n(f_n)$ in the current measurement. EQ. 14 indicates that the periodicity of $\Delta\theta_n(f_n)$ is proportional to tag range, which can be verified by referring to FIG. 9A. The periodicity of curve 906 is three times that of curve 904. As an example, if curve 904 were determined from a calibration run, EQ. 14 would yield for curve 906 a value of distance three times that of curve 904, which agrees with the calculated results. EQ. 14 will provide an approximate value of tag range or tag distance provided the hardware of the tag reader, e.g., antenna cable lengths and RF elements which may introduce phase delays, is not significantly altered between calibration of the tag reader and a tag range measurement.

In some embodiments, there may be few data points comprising $\Delta\theta_n(f_n)$. As a result, the Fourier transform of $\Delta\theta_n(f_n)$ may not provide a well resolved spectral graph or data set from which $\Omega_o$ is to be determined. In such embodiments, the analysis can be improved by interpolating data points between the measured data points. For example, referring to FIG. 9B, additional data points can be interpolated between the measured values plotted in curve 910. In some embodiments, the interpolation can be restricted to adjacent measured data points which are separated by not more than $E \times 2\pi$ where $\epsilon$ is a selected value between about 0 and about 1. Such a restriction on interpolation can preclude interpolation on phase jumps and on erroneous data, e.g., preclude interpolation between the erroneous data point at about 922 MHz in FIG. 9B and its adjacent points. The restriction on interpolation can reduce the effect of erroneous data on the Fourier transformed data.

Fourier methods implicitly assume the function being transformed is periodic, and the domain of the input data has a width equal to an integer multiple of the functions periodicity. Windowing techniques can be used mitigate deleterious effects when the function to be transformed is not in compliance with this assumption. In some embodiments, the determined phase angle data, while tending to have a repetition of zero to c in the output range, may not be periodic across the broadcast frequency band, e.g., if the tag is located near the tag reader's antenna. In certain preferred embodiments, this potential problem is overcome by adding systematic phase delay to the tag reader's signal path. In some embodiments, $\Delta\theta_n(f_n)$ may not have an integer number of periods across the broadcast frequency range. Windowing methods may then be needed when transforming the frequency domain information of the phase delay angles to time domain with an IFT. However, such windowing techniques generally have small weightings at the domain edges and larger weightings at the domain center.

The constraint on periodicity of $\Delta\theta_n(f_n)$ applies to the output of the transform as well, manifesting itself in the output as a collection of "bin center amplitudes". The discrete nature of the output of the IFT forces the tag distance estimate that results to be $N \times D_{IFTminimum}$ where N is an integer. The quantized nature of the output answer may be an inferior estimate for the tag distance compared to the estimate determined from the method comprising fitting a periodic function to $\Delta\theta_n(f_n)$ or the method comprising counting cycles of $\Delta\theta_n(f_n)$.

A potential problem for the IFT method is the transform's requirement for a complete set of input data. For tag EPC reads at certain frequencies, a read may fail, resulting in holes in the data set $\Delta\theta_n(f_n)$ to be transformed. These holes may be filled in by interpolating data from adjacent EPC read frequencies. Interpolation can work because the collection of phase delay angle values must represent an "over sampled" condition for the IFT to work properly. In various embodiments, over sampling is insured by the constraint that the tag ranges fit into a single "alias" range and by the constraint that tag read range is much less than the 150 meter range associated with the 500 kHz channel centers, e.g., the minimum broadcast frequency interval. However, interpolation entails additional processing and can introduce error.

In spite of the down sides to IFT processing, it does provide benefit in the case of high multipath interference, which is described in Section VI-A. In the presence of large-amplitude reflective paths and/or multiple reflective paths, these paths are separate and always longer than the tag direct path. They can show up in the IFT output as multiple distinct peaks. In various embodiments, the desired tag response path is associated with the largest peak nearest zero periodicity, i.e. the peak that corresponds to the shortest propagation path, since all multipaths which produce interference for the inventive RFID system must include the tag in the path as described in Section VI-A.

IV-E-4. Determining Tag Proximity

In various embodiments, one or more of the methods described herein may be used to relate a first RFID tag to a second RFID tag. Data sets determined for a pair of RFID tags may be used to associate a location characteristic of a first RFID tag to that of a second RFID tag. For example and in one embodiment, correlation between the data sets of a first RFID tag and a second RFID tag can indicate or approximately indicate that the first and second tags are located at a same distance from a RFID tag reader. In some applications, a RFID tag reader may use this information as feedback for positioning purposes. For example, the reader may be repositioned to equalize and/or optimize received signal amplitudes in tag responses. In some embodiments, correlation may be performed between two or more RFID tags. In certain embodiments, a first RFID tag may be used as a reference and compared against one or more other tags.

A method of determining the nearness or closeness of a first tag to a second tag may include correlating a first data set of the first tag to a second data set of the second tag. A determination of the nearness or closeness of a first tag to a second tag may be referred to as tag co-location, or tag-to-tag proximity determination. In some embodiments, good correlation of data sets may indicate that two tags are substantially equidistant (say L units) from a RFID tag reader. However, the two tags may be located at any two points on a spherical surface of radius L with the RFID tag reader at the center. In certain situations, it can be estimated with good probability that the first and second RFID tags are in close proximity. For example and in one embodiment, one or more tags may be known to be located within a certain directional angle relative to the RFID tag reader. In another embodiment, the RFID tag reader may have a receiver or antenna that is substantially unidirectional or substantially tuned to receive RFID tag responses from a single direction.

In one embodiment, the RFID tag reader may produce and correlate multiple pairs of data sets from the same pair of tags from a plurality of reader locations to improve the accuracy of the proximity determination. In combination or alternatively, the RFID tag reader may have multiple antenna receivers that are spatially distributed to produce and correlate multiple pairs of data sets from the same pair of tags to improve the accuracy of the proximity determination. The accuracy of the proximity determination may be affected by noise and/or interference, for example, multipath interference from reflected response signals. In some embodiments, the accuracy of the proximity determination may improve with proximity of the RFID tag reader to the RFID tags. The accuracy of the proximity determination may also improve with increased signal strength of the response signals from the RFID tags.

As described herein, co-location of tags may not require a determination of the actual or estimated location (i.e., two-dimensional or three-dimensional location in space) of one or both of the first and second tags. The method may not require a determination of the absolute distance of one or both of the first and second tags from the RFID tag reader to estimate that these tags are co-located. In some embodiments, relative proximity between a first tag and a second tag may be determined or otherwise calculated from the datasets of the tags. For example, a correlation coefficient (e.g., sample correlation coefficient or rank correlation coefficient) or other metric (e.g., correlation integral) may indicate the relative proximity of two or more tags. A threshold value for the correlation coefficient or metric may be determined or otherwise assigned to indicate that two tags are within a specified and/or acceptable proximity range of each other. Such a threshold may be determined from a sample of measurements and/or calculated using mathematical models. Moreover, such a threshold may be determined to account for ambient and/or operational factors such as noise, interference, reader proximity to the tags and RFID device modes.

In one embodiment, the method includes: a) broadcasting, by the tag reader, interrogation signals to the tag at a plurality of discrete frequencies; b) receiving, by the tag reader, returned signals from the tag in response to the interrogation signals; c) determining, by a phase-estimator, phase delays associated with the returned signals; d) producing, by a processor, a data set from the determined phase delays; e) comparing, by the processor, the data set with a second data set of a second RFID tag; and determining, by the processor, proximity of the RFID tag to the second RFID tag based on the comparison.

Figure 15A:
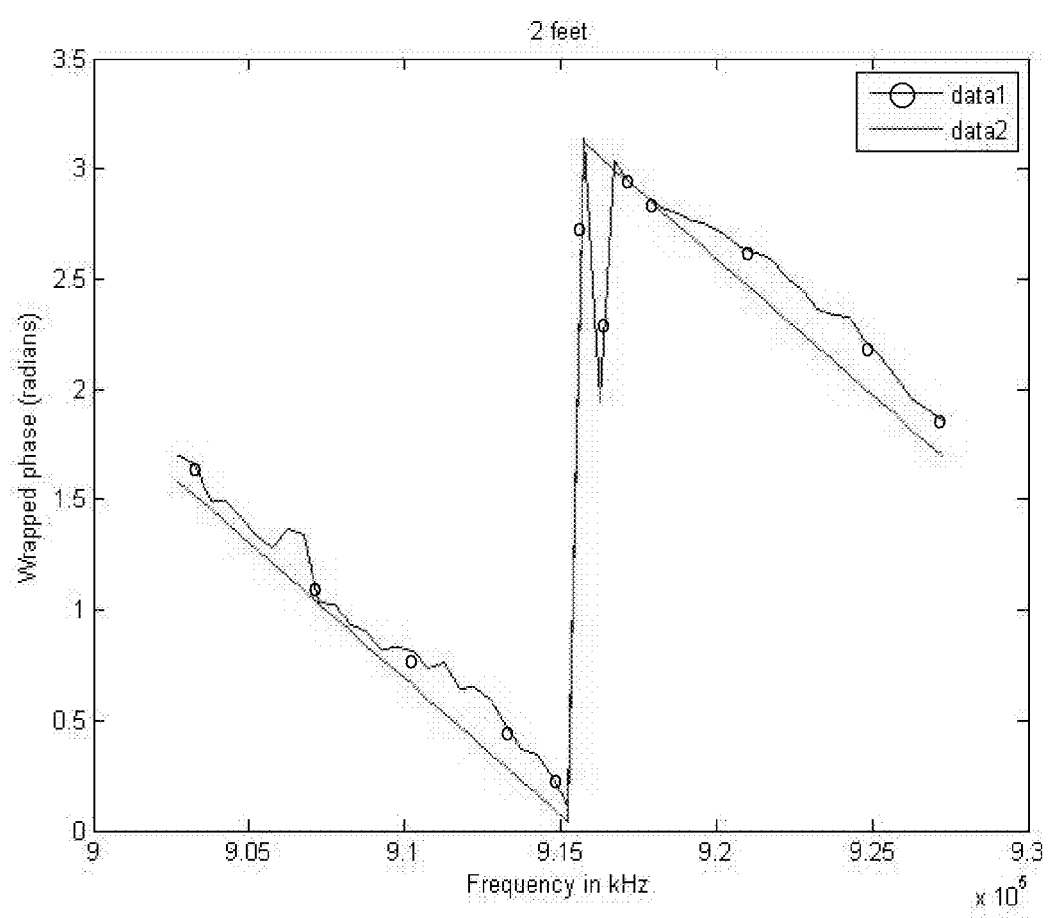
FIG. 15A shows an example of data sets which can be used for tag-to-tag proximity determination.
Figure 15B:
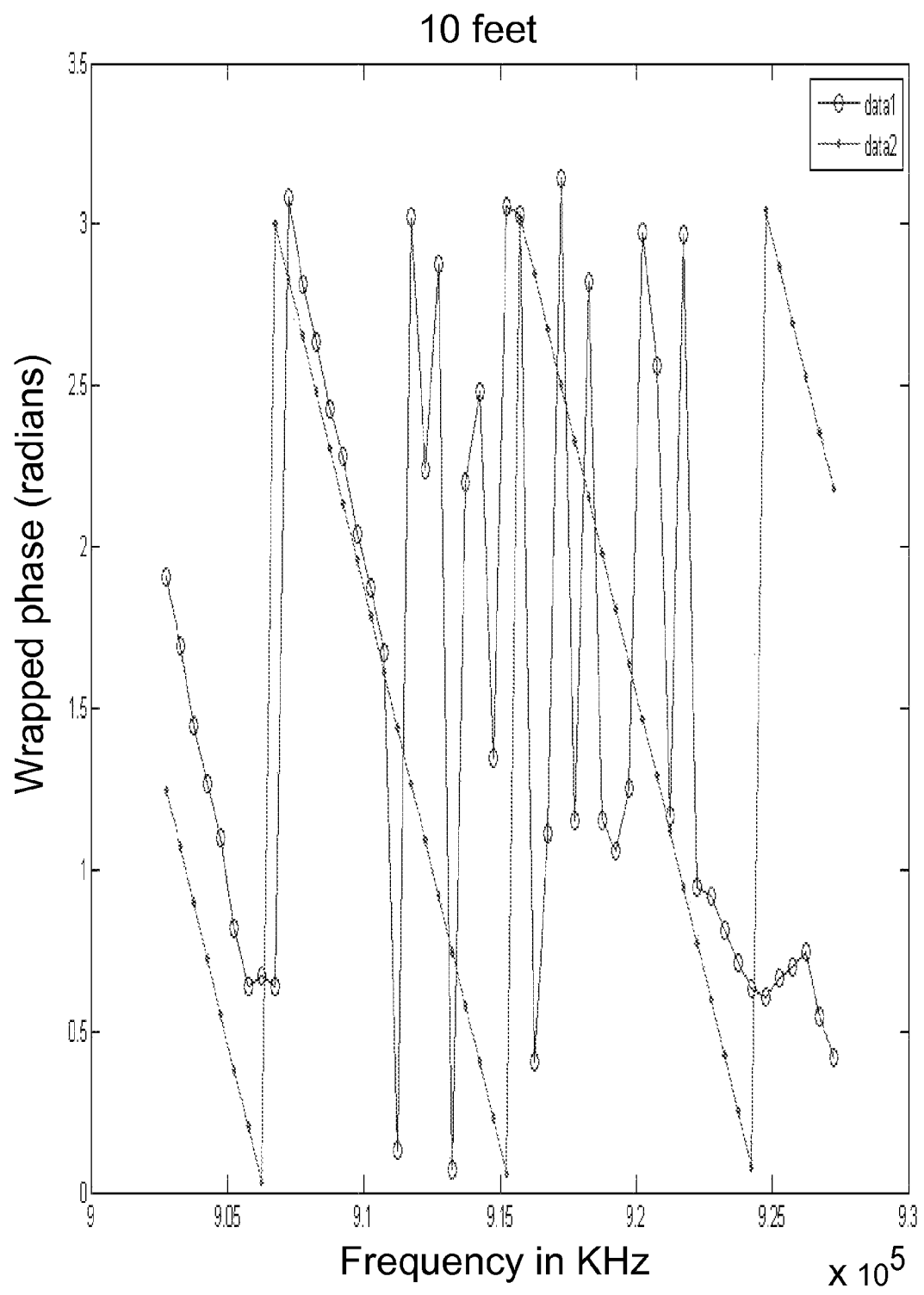
FIG. 15B shows another example of data sets which can be used for tag-to-tag proximity determination.

By way of illustration and not intended to be limiting in any way, FIGS. 15A and 15B show plots of data sets that may be used in connection with tag-to-tag proximity determination. In brief overview, each of FIGS. 15A and 15B includes a pair of data sets: data1 and data2. In this embodiment, the plots shows the data sets as wrapped phase (in radians) vs. frequency (in kiloHertz). One or more of the data sets may incorporate the effects of observations in multipath space by a RFID tag reader. Data1 may comprise measurements for a first RFID tag. Data2 may comprise an idealized representation or model of the first RFID tag in the absence of any noise and interference. In some embodiments, data2 may be characterized by substantially linear and/or periodic sections in the plot. In certain embodiments, data2 may comprise measurements for a second RFID tag. In one embodiment, data1 is determined in connection with a significantly scattered environment. In an environment substantially free from noise, interference and/or signal degradation, deviations in data1 from data2 may be minimized. When measurements are made for a first tag close to the RFID tag reader (say at a 2-feet separation), the plot for data1 correlates reasonably well with the data2 reference plot. At this distance, the effect of some scattering can be observed in data1, as evidenced by the observed deviations from the data2 reference. A second tag co-located with the first tag is expected to show similar characteristics against data2. In most embodiments, a co-located second tag may be assumed to share a substantially similar operational environment as the first tag. The data set of the second tag may similarly incorporate the effects of the operational environment. For example, some characteristics of the data sets may be similar because the co-located tags may have a substantially similar multipath interference signature. These tags may also be similarly affected by noise and/or other types of interference. Accordingly, in certain embodiments, the data set of the second tag may be expected to correlate well with the data set of the first tag.

When the frequency and phase characteristics of a tag is measured while the first tag is separated farther (say 10 feet) from the RFID tag reader, e.g. in a relatively scattered environment, larger deviations can be observed, as shown in FIG. 15B. A linear fit model, such as data2, may not adequately fit much of the dataset due to multipath interactions. However, two or more tags that are co-located may have similar dataset characteristics for the reasons discussed. In some embodiments, tags co-located within a distance of a quarter of the signal wavelength, i.e., lambda/4, may have data sets that are well correlated. Since the patterns may deviate significantly from the periodic and/or linear model, correlation may not be readily evident from visual inspection. However, the degree of correlation may be determined using a correlation metric. For example, a correlation integral may be calculated using EQ. 15a for a data set $x_1$ from a first tag and data set $x_2$ from a second tag. The correlation metric may be compared to a threshold value to determine if the tags are within proximity of each other.

$$C = \sum_{M=0}^{N} \sum_{k=0}^{N} x_1(k) x_2(M-k) \qquad \text{(EQ. 15a)}$$

Proximity determination of RFID tag may be useful in applications such as supply chain tracking, to determine that tagged objects observed by a reader are co-located within the same vicinity. For example, the methods and systems described herein may be applied to determine that tagged objects are located on the same pallet or in the same shipment container. In other fields such as in a hospital setting, the methods and systems described herein may be applied, for example, to determine that a patient and the patient's medical equipment are co-located with each other for compliance with safety requirements. A reference tag or locator tag can be attached to a fixed location or attached to a reference object to help identify the location or movement of other tagged objects.

In some embodiments, the static location of one or more tags may be known. The multipath map and/or other characteristics of these tags may be collected. Using the systems and methods described herein, the collected data may be compared against a data set determined from a tag of unknown location. The comparison can yield the relative proximity of the unknown tag to at least some of the known tags based on the values of correlation metrics calculated with respect to each known tag. Accordingly, the unknown tag may be identified as co-located with one of the known tags, and/or its location determined relative to one or more known tags based on the values of the correlation metrics. In some embodiments, the location of the unknown tag may be determined or estimated even in an environment of significant multipath interference. By way of illustration, position tags in an indoor environment may be statically located in each room to help locate a moving object using the methods and systems disclosed. Position tags may be spatially located at different granularities depending on the required accuracy for locating an unknown tag. In some cases, additional position tags may be added at a relatively small cost to improve accuracy and/or capability in tag co-location or location.

IV-F. Non-Simultaneous I-Q Measurement

For the apparatus depicted in FIG. 3 and for the methods and processes described in the previous sections, both I and Q signals are sampled substantially simultaneously. Additionally, I-Q data is provided substantially simultaneously to the phase estimator 220 for data processing and phase delay angle determination. In some existing or legacy RFID tag readers, RF components may not be provided and/or configured to substantially simultaneously and independently sample I and Q signals. As an example, a model M4E RFID tag reader available from ThingMagic, Cambridge, Mass. does not provide substantially simultaneous I-Q data sampling.

In certain embodiments, RFID tag readers having non-simultaneous I-Q measurement capability are adapted for tag range determination using sequential I-Q data sampling. In such embodiments, the signal returned from an RFID tag has a known bit pattern, e.g., an EPC value which remains constant over measurement times, and selection of I or Q sampling is made rapidly, e.g., on a time scale which is small compared to the correlation time or any time associated with drift in the phase of the signal returned from the tag and small compared to any drift occurring within the sampling time. In various embodiments, an I or Q measurement interval is chosen such that any frequency or phase drift which may occur during switching from one I or Q measurement to the other Q or I measurement is small compared with any drift which may occur in an I or Q measurement interval. Since a singulated tag will return the same bit sequence to an RFID tag reader when interrogated for its EPC code at different times, e.g., a measurement interval on the I channel and a later measurement interval on the Q channel, the relative values of I and Q, including their relative sign, can be obtained sequentially. In certain embodiments, the measurement intervals for sequential I and Q data occurs within an EPC read. In such embodiments, the I and Q data samples can be provided to the phase estimator 220 sequentially, and processed after receipt of I-Q data pairs to determine phase delay angles. It will then be appreciated that measurements at multiple frequencies can be carried out for RFID tag readers with non-simultaneous I-Q data sampling, and tag range or distance can be determined using any of the processed described in preceding sections IV-C through IV-E.

V. Methods of Operation

The determination of tag range or tag distance D by an RFID tag reader is useful for a variety of methods of tag reader operation. Several of these methods of operation will now be described.

V-A. Determination of Tag Location

Once the distance to an RFID tag is determined by any of the methods described above in Sections IV-E, a location of the tag can be determined. The location of a tag can be determined using any one of several tag-locating methods. In various embodiments, the tag-locating methods comprise carrying out multiple distance measurements and analyzing distances determined from the measurements. Several embodiments of tag-locating methods are described in this section.

In various embodiments, a single tag range measurement yields a distance $D_1$ between an RFID tag 120a and an RFID tag reader's antenna 112. The location of the tag, for a single distance measurement, can only be known to lie approximately on a spherical shell of radius $D_1$ surrounding the antenna. If the antenna is displaced by a distance $d_1$ and a second distance measurement made yielding $D_2$, then the location of the tag can be determined to lie approximately on a circle comprising the intersection of two spherical shells of radii $D_1$ and $D_2$ centered at the two antenna locations displaced by distance $d_1$. A third displacement of the antenna, preferably in a direction orthogonal to the first displacement, and measurement can resolve the tag's location to two possible locations. A fourth displacement of the antenna, preferably in a direction orthogonal to the first two displacements, can resolve the tag's location to one approximate location.

In some embodiments, a tag reader 110 and its antenna 112 can be displaced one, two, or three times to determine an approximate location of an RFID tag. In some embodiments, a tag reader 110 may be stationary and its antenna 112 can be displaced one, two, or three times to determine an approximate location of an RFID tag. In some embodiments, multiple separated antennas may be in communication with a single tag reader, and the tag reader 110 may make distance measurements from one, two, three or four displaced antennas to determine an approximate location of an RFID tag. In various embodiments, the relative positions of the displaced tag reader's antenna or displaced antennas or multiple separated antennas are provided for analysis and determination of tag location.

In some embodiments, multiple tag readers 110, each having their own antenna, may be in communication with each other. Each of multiple tag readers can determine a distance to a particular tag, and provide the separate distance measurements for analysis by one tag reader or a central processor to determine a location of the tag. In various embodiments, the relative positions of the antennas of multiple tag readers would also be provided for analysis and determination of tag location.

V-A-1. Determination of Tag Location: Multiple Displacements of Antenna

Figure 12A:
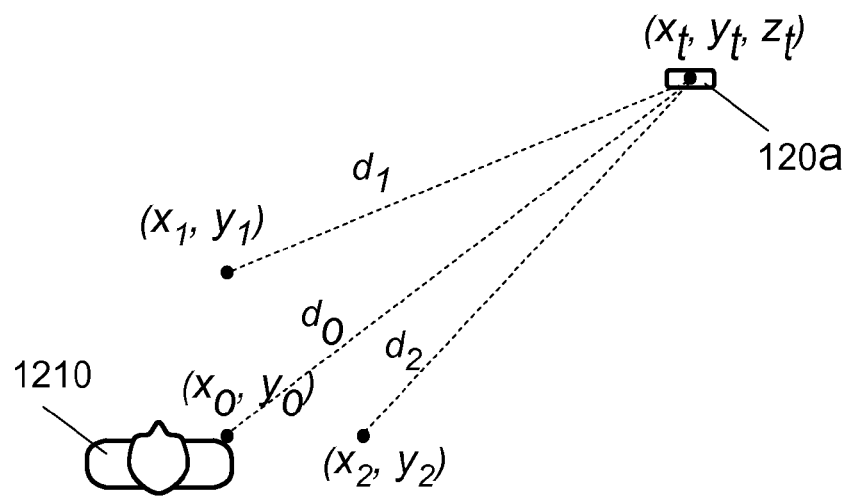
FIG. 12A is an illustration provided to describe a method for determining a location of a singulated RFID tag.

In certain embodiments, a method of determining a tag location can be carried out as depicted in FIG. 12A. For this embodiment, a user can remain stationary in a fixed orientation, and simply move a tag reader 110 and its antenna 112 to two, three or four distinct locations. Movement to three separate locations can enable a substantially precise determination of an RFID tag's location in two dimensions, e.g., $(x_t, y_t)$, and movement to four distinct locations can enable the substantially precise determination of an RFID tag's location of in three dimensions, e.g., $(x_t, y_t, z_t)$.

As an example of this operational method, a user 1210 remains in a substantially constant orientation while making three range-determination measurements of a singulated RFID tag 120a located at an unknown position $(x_t, y_t, z_t)$. The user 1210 can first singulate a tag 120a, and hold the tag reader 110 substantially against the user's shoulder above the arm holding the reader. This location can be identified as $(x_0, y_0)$. The user can execute a range-determination algorithm on the tag reader to obtain a first distance value $d_0$. The user can then extend the arm substantially fully and directly forward positioning the tag reader 110 at $(x_1, y_1)$, and make a second tag-range measurement yielding $d_1$. The user can then extend the arm substantially fully and directly to the side and make a third measurement with the tag reader at $(x_2, y_2)$ to yield $d_2$. In certain embodiments, the user can then instruct the reader to "find" the singulated tag 120a. In some embodiments, the tag reader can automatically calculate the approximate location of the tag after receiving a final distance measurement.

For the method described in reference to FIG. 12A, in some embodiments, a substantially precise determination of the singulated tag's location is obtained from the values $d_o$, $d_1$, and $d_2$, and the following assumptions:

$$y_1 \approx x_2;$$

$$x_1 \approx x_0;$$

$y_2 \approx y_0;$ $(x_0, y_o) = (0,0).$ (EQS. 15)

Defining $y_1 = L$, e.g., the approximate length of the user's arm, and using the above constraints, the tag location resolved to x and y coordinates $(x_t, y_t)$ can be determined substantially precisely from the following set of equations.

$d_0^2 = x_t^2 + y_t^2$ $d_1^2 = x_t^2 + (y_t - L)^2$ $d_2^2 = (x_t - L) + y_t^2$ (EQS. 16)

Figure 12B:
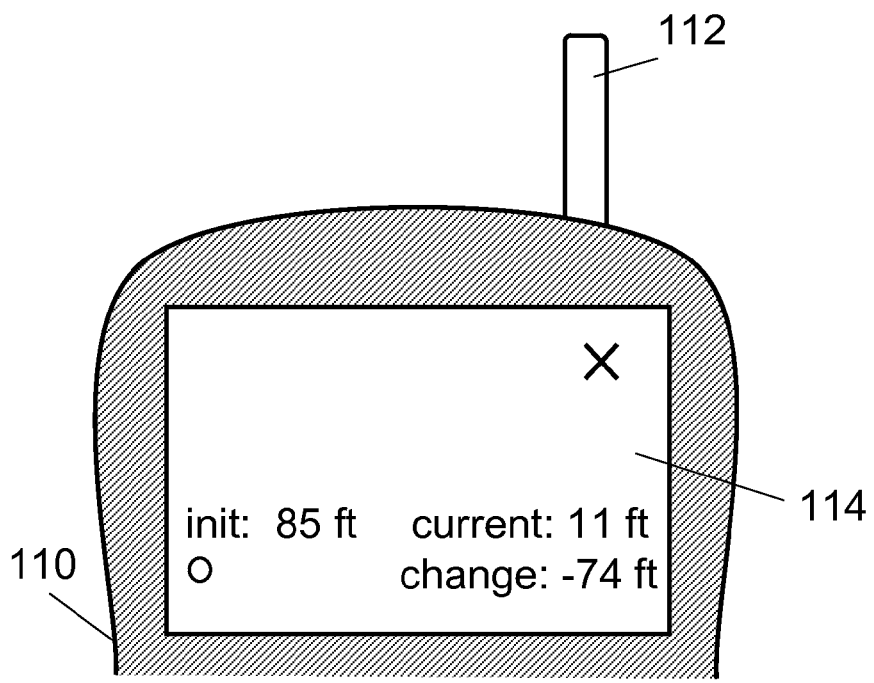
FIG. 12B depicts how a tag's location may be presented visually to a user of an RFID tag ranging system. The information may be provided on a tag reader's display or on a computer's display in some embodiments.

The set of equations EQS. 16 can be solved by processor 210 and the resulting tag location and distance from user can be displayed on the tag reader's display 114. The display of the information can appear as indicated in FIG. 12B.

It will be appreciated that the solution to EQS. 16 can also yield the value of L or $y_1$ for each tag locating routine. This value is substantially equal to the length of the user's arm. This value can be tracked for a particular user, and an average value $L_u$ determined for that user. Once a reliable average value is determined, that value can be used in the following reduced set of equations, which follow from EQS. 16.

$$x_t = \frac{1}{2L_u}(d_0^2 - d_2^2 + L_u^2)$$ (EQS. 17)

$$y_t = \frac{1}{2L_u}(d_0^2 - d_1^2 + L_u^2)$$

The processing time for solving EQS. 17 can be significantly less than that for solving EQS. 16.

Referring again to FIG. 12A, the depicted and described method of determining an RFID tag's location can be modified to determine the location of a tag in three dimensions, e.g., $(x_t, y_t, z_t)$. In this operational method, the tag reader 110 is moved to a forth position, e.g., the arm fully extended downwards at the user's side, or upwards above the user's shoulder, and the range-determination algorithm executed at the forth position to yield a forth distance $d_3$. It will be appreciated by one of ordinary skill in the art that the tag position can be determined substantially accurately from sets of equations similar to EQS. 15-17 extended to three dimensions.

V-A-2. Determination of Tag Location: Fixed Antennas

In some embodiments, a tag reader may have plural fixed and separated antennas, e.g., two antennas, attached to, or in communication with, the reader which can each receive signals backscattered from an RFID tag. It will be appreciated by one skilled in the art that for an RFID tag reader with two or more such antennas, the reader and/or its antennas would undergo fewer movements than is the case for a single antenna reader when determining tag location in a manner like that depicted in FIG. 12A. As an example, a tag reader having attached two fixed and separated antennas could be moved once and rotated 90 degrees obtain data sufficient for determining a tag's location in two or three dimensions.

V-A-3. Determination of Tag Location: Guiding by Tag Range

Another operational method of determining a tag's location can be implemented with the tag reader 110. For this operational method, the tag reader 110 can execute a range-determining algorithm to determine a first or initial distance $d_0$ between the tag 120a and tag reader 110. This first distance can be displayed on the tag reader's screen 114 and may be maintained on the display until the tagged object is located. An operator can then walk with the tag reader, while the range-determining algorithm measures automatically at regular intervals, e.g., about every ½ second, about every 1 second, or about every 2 seconds, the current distance between the tag and tag reader. Continuously updated information representative of the distance measurements can be displayed on the screen 114 along with the initial distance. In some embodiments, the updated information can comprise the current distance to the tag. In some embodiments, the updated information can comprise the difference between the initial distance and current distance, e.g., a positive difference would indicate the user is moving farther from the tag and a negative distance would indicate the user is moving closer to the tag. In some embodiments, an audio cue may be provided along with the visual data. For example, a audible signal may increase in frequency as the user moves closer to the tag and decrease as the user moves farther from the tag. The frequency may be inversely proportional to the user's distance from the tag. The updated information can provide visual and/or audio cues to the user to assist in guiding a user toward a singulated RFID tag. The cues can continue until the reader 110 is sufficiently close to the tag 120a to allow the operator to identify the RFID tag or RFID-tagged object. Although this operational method for locating an RFID tag may work well in many instances, it may be inconvenient when an user's motion is restricted, e.g., limited to motion along long narrow isles. In such instances, this operational method may be used in combination with the operational method described above in which the user makes several distance measurements from a fixed location.

V-B. Determination of Tag Velocity

In certain embodiments with moving RFID tags, knowledge about a tag's distance at two or more points in time can be processed to determine a velocity associated with the tag. In some embodiments, a measurement of the rate of change of a phase delay $\Delta\theta_n$ at a single frequency for a particular tag can be processed to determine a velocity associated with the tag. In certain embodiments, knowledge about a tag's location at two points in time can be processed to determine a directional velocity of a particular RFID tag.

An operational method for determining a velocity associated with a moving RFID tag can comprise executing two or more tag-range measurements at distinct points in time, $t_1, t_2, \ldots, t_i$. Each tag range measurement can return a distance value $D_1, D_2, \ldots, D_i$ representative of a distance between a tag reader's antenna 112 and moving RFID tag 120c at the associated point in time that the measurement was made. An approximate velocity associated with the moving tag can be determined by processor 210 in accordance with the following equation.

$$v_i = \frac{D_{i+1} - D_i}{t_{i+1} - t_i}$$ (EQ. 18)

Since each individual tag-range measurement provides a radial distance between the antenna 112 and tag 120c the velocity associated with the moving tag determined by EQ. 18 represents a radial velocity component, i.e., the component of velocity directed along a line between the RFID tag and tag reader's antenna.

In some embodiments, an operational method for determining a velocity associated with a moving RFID tag can comprise determining a rate of change of a measured phase delay $\Delta\theta_n$ at a single frequency associated with a signal returned from a moving tag 120c. Referring again to FIG. 5A, it will be appreciated that movement of the tag 120a at a substantially constant velocity will cause the measured phase delay at a single frequency, e.g., $\Delta\theta_{1a}$, to vary substantially constantly with time. The rate of change of the measured phase delay can then be representative of a velocity associated with the moving tag. As with the prior method, the velocity associated with the moving tag for this method will represent a radial velocity component.

As an example, if a stationary RFID tag is singulated and interrogated at a single frequency $f_n$, the phase delay angle $\Delta\theta_n$ determined from the I-Q data will remain substantially constant as a function of time. If the radial distance between the RFID tag reader's antenna and RFID tag is reduced, the phase delay angle will rotate toward fewer out and back phase cycles, by convention counterclockwise. If the tag moves radially away from the antenna, the phase delay angle will rotate the opposite way. Therefore a reader that can determine phase delay angle can determine a radial velocity component associated with a tag movement and can also determine whether a tag is getting closer or farther from the tag reader's antenna while measuring at a single frequency $f_n$. This is in contrast to the multiple frequencies needed to get an actual range measurement. In various embodiments, characteristics of relative radial motion, e.g., signed magnitude of radial velocity, can be gleaned from a single frequency.

In some operational methods, a single frequency phase-angle measurement is used to guide a user toward a singulated tag until it can be distinguished from other tags by proximity to the interrogating antenna. The tag can be one having a selected EPC code. As an example, a user holding a mobile RFID reader can walk with the reader while singulating the tag at a single frequency $f_n$. A radial velocity can be determined based upon the rate of change of a measured phase delay angle $\Delta\theta_n$. Visual and/or audio cues can be provided to the user by the reader to indicate whether the user is moving toward or away from the singulated tag.

In some embodiments, a single frequency phase-angle measurement is used to resolve the absolute position of RFID tags on a conveyer belt. As an example, consider the case of an RFID tag reader's antenna adjacent to a moving conveyer belt. A swept-frequency tag range measurement can be employed to determine a distance to a singulated tag, but there are two positions on the conveyer belt having that distance. Further measurement at a single frequency $f_n$, can then resolve whether the tag is moving toward or away from the antenna by the rotation of that frequency's phase delay angle. The ambiguous conveyer belt position of the tag can then be resolved.

In some embodiments, a directional velocity of a particular moving RFID tag can be determined from knowledge about a tag's location at two points in time. A method to determine a directional velocity of a tag can comprise executing two or more tag-location measurements at distinct points in time. Each tag-location measurement can return a value of a tag's approximate location at a particular point in time, e.g., $(x_1(t_1), y_1(t_1), z_1(t_1))$, $(x_2(t_2), y_2(t_2), z_2(t_2))$. An approximate value of the tag's directional velocity can be determined from the measured change in a tag's location divided by the elapsed time between the measurements. For an embodiment of this method in which the tag reader is displaced plural times during one tag-location measurement, it is preferable that the time associated with the tag-location measurement is small compared to the distance traveled by the tag during the measurement time divided by the tag's directional velocity. In some embodiments, the determination of a tag's direction velocity is preferably carried out with multiple tag readers or a single tag reader in communication with multiple antennas.

V-C. Determination of Tag Reader Location

In some applications, it can be beneficial to determine a location of an RFID tag reader. For example, in operational methods for which multiple RFID tag readers are used to determine the location of an RFID tag, the approximate location of each tag reader can be determined prior to determining the location of one or more RFID tags. The approximate locations of each tag reader can be used to trilaterate the position of one or more RFID tags. In some applications, it can be useful to determine the approximate location of a misplaced or lost RFID tag reader, e.g., a mobile tag reader lost in large warehouse.

The location of an RFID tag reader can be determined approximately by at least two methods. A first method comprises determining the location of an RFID tag reader using multiple RFID tags at known locations. A second method comprises using a second RFID tag reader to determine approximately the location of a first RFID tag reader.

In some embodiments, two or more position-calibration RFID tags can be disposed at separate locations in a vicinity in which an RFID tag reader operates. In various embodiments, the calibration tags are disposed at known locations, e.g., the (x,y,z) locations of the calibration tags are known or are determined upon placement of the position-calibration tags. An RFID reader operating in the vicinity of the calibration tags can singulate each calibration tag and determine a distance between the singulated tag and the RFID reader's antenna. An analysis of the measured distances to each of the position-calibration tags and their known locations can yield the location of the RFID tag reader. A method of determining the location of an RFID tag reader using multiple RFID tags can comprise (a) singulating, by an RFID tag reader, an RFID tag at a known location, (b) broadcasting, by the tag reader, interrogation signals to the tag at a plurality of discrete frequencies, (c) receiving, by the tag reader, returned signals from the tag in response to the interrogation signals, (d) determining, by a phase-estimator, phase delays associated with the returned signals, (e) producing, by a processor, a data set from the determined phase delays, (f) selecting, by the processor, a function having a periodic characteristic which best fits the produced data set, (g) determining, by the processor, a distance between the RFID tag at the known location and the RFID tag reader based upon the selected function, (h) repeating the steps (a)-(g) for two or more tags, (i) analyzing, by the processor, the determined distances between the RFID tags at known locations and the RFID tag reader, and (j) determining approximately a location of the RFID tag reader based upon the known locations of the RFID tags.

In certain embodiments, a second RFID tag reader can be used to locate a first RFID tag reader. Such an embodiment can be useful in locating a lost or misplaced RFID tag reader. In such embodiments, the first RFID tag reader is adapted to have a response mode similar to an RFID tag. For example, an RFID tag reader 110 can comprise an RFID tag-emulation mode of operation. In the tag-emulation mode of operation, an RFID tag reader can be responsive to interrogation signals substantially the same as an RFID tag. In some embodiments, an RFID tag can be affixed to an RFID tag reader. A method for determining approximately the location of a first RFID tag reader can comprise (a) placing the RFID tag reader in a tag-emulation mode, (b) singulating, by a second RFID tag reader, the first RFID tag reader, (c) broadcasting, by the second tag reader, interrogation signals to the first tag reader at a plurality of discrete frequencies, (d) receiving, by the second tag reader, returned signals from the first tag reader in response to the interrogation signals, (e) determining, by a phase-estimator of the second tag reader, phase delays associated with the returned signals, (f) producing, by a processor of the second tag reader, a data set from the determined phase delays, (g) selecting, by the processor, a function having a periodic characteristic which best fits the produced data set, and (h) determining, by the processor, a distance between the first RFID tag reader and the second RFID tag reader. In some embodiments, step (a) may be omitted if an RFID tag is affixed to the first RFID tag reader. The steps (a)-(h) can be repeated with the second RFID tag reader and/or its antenna moved to plural positions. The method can further include calculating, by the processor, from the determined distances between the first and second RFID tag readers at each of plural positions an approximate location of the first RFID tag reader.

Although the above two methods comprise a particular embodiment for determining a distance between an RFID tag reader and a tag, or a second RFID tag reader and a first RFID tag reader, it will be appreciated that any of the methods described in Sections IV and V-A through V-B can be used for distance and/or location determination.

V-D. RFID Tag Reader Calibration

As will be described in Examples 1 and 2 and in the following section, an RFID tag reader can return a measured value of tag range which does not agree with the actual physical distance between the tag reader's antenna and a singulated RFID tag. In various embodiments, a large component of the difference or discrepancy between the measured tag range and actual tag range is due to systematic errors, e.g., phase delay errors associated with fixed antenna cable lengths or RF electronic components in the tag reader. In various embodiments, the systematic errors can be calibrated and removed from all subsequent measurement data.

One method to calibrate and remove the systematic errors comprises carrying out a zero-distance tag range measurement. For this measurement, a tag is placed at the location of the tag reader's antenna and a measurement made. The measurement can return a measured distance value not equal to zero. This measured value can then be stored in memory 230 as a zero-distance calibration value $D_{c0}$. The value $D_{c0}$ can then be subtracted from all subsequent tag range measurements to yield an estimated value of tag range.

A second method for calibrating and removing systematic errors from tag range measurements comprises measuring cable lengths and phases delays associated with the tag reader's RF electronics and computing a zero-distance calibration value. In such a method, it can be necessary to multiply measured lengths and phase delays by a factor of 2 if the signal incurs the delay twice, e.g., the particular component lies in the transmit and receive signal paths. Once a zero-distance calibration value is computed, it can be stored in memory 230 and subtracted from all subsequent tag range measurements to yield an estimated value of tag range.

VI. Measurement Error and Noise Considerations

In various embodiments, signals received from a responding RFID tag will contain noise, and the noise can contribute to errors in the determined phase delay angles $\Delta\theta_n$. Any determined phase delay angle can be comprised of certain error terms and may be expressed as $$\Delta\theta_n = \Delta\theta'_n \pm \theta_N \pm \theta_S \qquad (EQ. 19)$$

where $\Delta\theta'_n$ is the true phase delay, $\theta_N$ is a phase delay error associated with signal noise, and $\theta_S$ is a phase delay error associated with systematic phase-error sources, e.g., antenna cable lengths and certain RF components in the RFID reader. Each of the phase delay error terms can have multiple contributing sources. Some of the phase delay errors and their sources are described in this section.

Signal averaging can be carried out to reduce certain phase delay errors and improve measurement accuracy. The signal averaging can be done in a number of ways. In some embodiments, I-Q data can be collected at as many frequencies as possible. This will have an additional effect of providing a maximum spread of available carrier-wave frequencies, and it will substantially minimize the biasing of the resulting distance calculation by any one noise-contaminated data set. In some embodiments, measurements may be repeated at each of plural frequencies used for data collection. In some embodiments, responses to interrogation signals can be averaged across a long tag response sequence, e.g., across a lengthy EPC code transmission from the interrogated RFID tag. However in some embodiments, restrictions on total data-acquisition and measurement processing time may limit the number of repeated measurements at each of plural frequencies.

There can be several advantages to averaging across an EPC code transmission or similar data transmission from an RFID tag when determining phase delays. One advantage is that multiple types of information can be extracted from a single transmission, e.g., EPC value and one or more phase delays and perhaps an estimated distance to the responding tag. Another advantage is that the RFID tag does not need hardware modifications to be useful for tag range measurements. Another advantage is that special interrogation signals need not be developed for tag range measurements. A principal advantage is that signal averaging can be carried out over a portion of or all of the transmission which can reduce certain phase delay errors.

VI-A. Multipath Interference

In the descriptions of the apparatus and methods, it was assumed that a singulated RFID tag 120a provides a single backscattered signal. In actual circumstances, reflections can occur so that an RFID tag reader 110 can receive a backscattered signal directly from a singulated RFID tag and also reflected signals originating from both the reader and tag. This can cause a condition of multipath interference.

With signals received by an RFID tag reader from multiple paths, at any single frequency a measured phase delay $\Delta\theta_n$ can be off by the relative magnitude of the signal from the interfering path. For a reflection which is down by about 20 dB in power (a factor of about 0.1 in voltage) with respect to the main signal path, the induced error in the phase delay angle at the receiver may be about $\pm\arctan(0.1/1)$ which is about 0.1 radian or 5.7 degrees. A reflection which is down about 10 dB in power can contribute an error in the measured phase delay angle of about $\pm\arctan(0.316/1)$ which is about 0.31 radian or 17.5 degrees. In some embodiments, the largest errors can occur when the signal from a reflection path is about $\pm90$ degrees in phase with respect to the signal backscattered from the tag along the direct path.

In general, a signal reflected along any given path can have a phase delay that varies randomly from 0 to $2\pi$ with respect to the directly backscattered tag response. Although the reflected signal will be fixed for non moving tag, reflector, and LO frequency, it will tend to contribute a phase-delay error with zero mean. Measurement across the frequency range of about 902 to about 928 MHz provides some degree of averaging to reduce the phase delay error associated with multipath interference. This averaging can be more effective when the multipath distance is many wavelengths different than the direct tag distance, so that the multipath signal will traverse many phase delay cycles different than the phase delay cycles of the direct path. When the multipath distance is close to the distance of the tag, interference from the multipath will tend to pull the estimated distance to an effective distance with a value between the multipath distance and the true tag distance.

In various embodiments, the multipath interference is not due to a carrier only signal path, but rather it includes tag modulation of the backscattered signal. In certain embodiments, the RFID tag reader's RF electronics, as depicted in FIG. 3, rejects carrier only multipath interference, because after mixing of the returned signal with a signal from the local oscillator, the multipath, carrier-wave component lands at zero Hertz. The zero Hertz components can be rejected in subsequent signal processing by the IIR phase-tracking loop for which the IIR history quantity is subtracted from the tag response in accordance with EQ. 5. Since multipath interference is substantially limited to paths that pass through the tag, e.g., paths for which the tag will modulate the backscattered signal, this advantageously reduces the number of possible reflection paths that can contribute to tag-range measurement error. Phase delay estimation based upon returned sideband signals can reduce deleterious effects caused by multipath interference.

VI-B. Dispersion

Dispersion can be an additional source of phase delay angle error. In certain embodiments, the receive path contains an analog filter which may exhibit dispersion, an effect for which different signal frequencies can travel at different speeds. The filter can comprise part of the delay to and/or from the one or more antennas. In some embodiments, the delay due to the filter may be considered or lumped together with cable delay. In some embodiments, the bandwidth of the analog filter is selected to be wider than the 902 to 928 MHz operating band. As an example, an EPCOS filter, model B39921B3588U410, having a pass band of about 902 to 928 MHz and a 2.0 dB ripple bandwidth greater then about 26 MHz can be used in certain embodiments. Additionally, the filter can be designed such that it contains a few number of poles or less complexity. As an example, a two pole filter provided by Murata, model DFCB2915MLDJAA is a 915 MHz filter that typically can have its dispersion calibrated with cable effects. In certain embodiments, the dispersion of an analog filter having a few number of poles and wide bandwidth is reasonably small and can be neglected. In certain embodiments, since the filter can be a fixed piece of the hardware, any dispersion that it contributes to the measurement process can be compensated for using calibration procedures, e.g., a calibration measurement can be made which determines a dispersion associated with the analog filter and the determined dispersion is subsequently removed from measured data.

In various embodiments, the signal path contains one or more transmit and receive antennas which can also exhibit a dispersive quality. Additionally, their dispersion can be dependent upon the orientation of the antenna with respect to the direction from the antenna to a singulated RFID tag. In various embodiments, antennas used for RFID tag range measurements have significant excess frequency bandwidth and excess directional capability, both properties that can provide low antenna dispersion. In the calculations and methods presented above, antenna dispersion is assumed to be negligible. However, phase delay effects associated with the antenna can be lumped together with a delay also associated with cabling to the antenna.

In certain embodiments, one or more sub portions of the antenna's operating frequency band can have lower dispersion than other portions of the antenna's operating band. Measurements of tag range can be carried out on lower dispersion sub-bands of the antenna to reduce deleterious dispersion effects. In some embodiments, a first measurement may be carried out utilizing the full frequency band of the antenna to obtain a first estimate of tag range, and a second measurement may be carried out utilizing one or more low dispersion sub-bands of the antenna to obtain a more accurate determination of tag range.

VI-C. Hardware Error Sources

Referring now to FIG. 3, additional sources of measurement error can be a quadrature error of the QH hybrid 330, phase error from the power dividers 340, path length mismatches from the QH hybrid 330 to mixers 335 and path length mismatches from the power divider 340 to mixers. In certain embodiments, these components are fabricated in a hybrid or multichip mixer module and specified to contribute a maximum phase delay error of about 4 degrees, with a typical error of about 2.5 degrees. This amount of error is expected to be smaller than the multipath error. In various embodiments, the hardware error cycles from positive to negative to positive for any measured I-Q output data that traverses all possible output phases. The cycling of the hardware error can effectively average out of data when all I-Q values are collected and processed. In certain embodiments, antenna cable lengths are chosen to be long enough so that the hardware errors associated with mixer responses will cycle around their allowed positive and negative excursions and tend to average out when processing all I-Q output data. In certain embodiments, the antenna cable lengths are between about 1 wavelength and 2 wavelengths corresponding to the lowest broadcast frequency used, between about 2 wavelengths and 3 wavelengths, between about 3 wavelengths and 4 wavelengths, and yet in some embodiments between about 4 wavelengths and 6 wavelengths.

For tags that are very close to the tag reader and have very small phase shifts, and tag readers with very short antenna cables, the tag response can be confined to a single I-Q quadrant of the mixer module across the full 902 to 928 MHz frequency band. Phase delay error from such a multichip mixer module could then translate to a distance error as the output I-Q phase only goes part way around a cycle.

Any mismatch between the two low pass filters LPF 350 in the signal paths from the multipliers 335 can comprise an additional source of I-Q error. Amplitude imbalance will tend to favor an in-phase I component over a quadrature Q component or vice versa. In a similar manner, phase imbalance between the two low pass filter paths for Gen2 tags providing square wave backscattered signals will tend to cause the ideal linear I-Q output to take on a slight figure eight shape. In various embodiments, tag responses which are substantially all in I or all in Q will yield a substantially correct phase delay.

VI-D. Error Due to Signal Noise

Signal noise can comprise an additional source of I-Q error and ultimately phase delay error. Generally, a lower signal-to-noise ratio (SNR) will lead to higher I-Q errors and a larger value of $\theta_N$. In various embodiments, the inventive RFID system is adapted to operate with an approximate $10^{-2}$ message error rate across about 96 bits which translates to about $10^{-4}$ bit error rate. For Class1 Gen2 tag responses, the received signal is orthogonal base band, and the theoretical worst case SNR that would allow $10^{-4}$ error rate is about 11.6 dB. So, for a single I-Q measurement across a single bit the resulting phase delay angle error associated with signal noise could be as large as $$\pm\theta_N \approx \pm\arctan\left(\frac{\sqrt{N_0}}{\sqrt{E_b}}\right) = \pm\arctan(10^{-\frac{11.6}{20}}) = \pm 0.26\,\text{rad} \quad (\text{EQ. 20})$$

where sqrt($N_0$) is the amplitude of the noise component of the returned signal expressed in volts and sqrt($E_b$) is the returned signal amplitude expressed in volts. The estimated error of about 15 degrees given by EQ. 20 can be comparable to multipath errors and larger than errors from other sources identified in this section.

In various embodiments, averaging is carried out across a number of bits $N_b$ to reduce phase delay errors due to signal noise. For a particular SNR, the number of bits required for signal averaging can be estimated in accordance with the following analysis. Signal voltage will add by the number of bits averaged. Noise voltage will increase as the square root of the number of bits averaged. Signal averaging can then scale the ratio $$\frac{\sqrt{N_0}}{\sqrt{E_b}} \text{ by } \frac{1}{\sqrt{N_b}}.$$

From EQ. 20 and including a general representation of SNR, the following equation is obtained.

$$\pm\theta_N \approx \pm\arctan\left(\frac{1}{\sqrt{N_b}}10^{-\frac{SNR}{20}}\right) \quad (\text{EQ. 21})$$

EQ. 21 can be used to determine a number of bits for signal averaging for a particular SNR to obtain an acceptable level of phase delay error associated with signal noise, $\pm\theta_N$. For example, for an embodiment where one degree (0.017 radian) of phase delay error associated with signal noise is deemed acceptable and the SNR is about 11.6 dB, then signal averaging should be carried out for approximately 227 bits. EQ. 21 can also be used to estimate the phase delay error associated with signal noise for embodiments where the SNR is known and $N_b$ is selected. For example, in an embodiment where the SNR is about 11.6 dB and signal averaging is carried out over 96 bits, then $\theta_N$ will be approximately ±1.5 degrees (0.027 radians).

In various embodiments, the phase delay error associated with signal noise has zero mean. Averaging across a 96 bit EPC code can reduce $\theta_N$ so that $\Delta\theta_n$ can be determined to within a selected accuracy level. Additionally, or in the alternative, averaging across a 96 bit EPC code can reduce $\theta_N$ to a value smaller than the largest expected error source, e.g., tag phase ambiguity. It will be appreciated that averaging over A-to-D samples can be substantially equivalent to averaging over bits wherein the number of samples is determined by the number of bits times the number of samples per bit.

VI-E. Error Due to Tag Response Phase Ambiguity

The Class 1 Generation 2 specification allows the tags being interrogated to employ phase shift keying (PSK) when providing responses to interrogation signals. The specification does not provide guidelines to control the polarity or magnitude of the particular phases used for phase shift keying. In various embodiments, the tags can have any phase at zero distance with phase shift keying under the Class 1 Generation 2 specification guidelines. This can result in an ambiguity of the phase of the response for a tag at zero distance.

For the methods described above, it is assumed that a tag at zero distance would provide a measured phase delay of zero radians provided systematic phase delays, e.g., phase delays associated with antenna cable lengths and certain RF components, have been calibrated and removed from the measurement result. The ambiguity in tag phase according to the Class 1 Gen 2 specification implies that a tag interrogated at zero distance can return a signal having a phase delay measuring anything from about $-\pi$ to about $+\pi$. This can translate into a ±half wavelength uncertainty in the distance or tag range determined from the I-Q data. For a broadcast frequency band between about 902 MHz and about 928 MHz, the corresponding uncertainty in measured distance can be about 17 centimeters or about 6.5 inches. This uncertainty is systematic for any particular tag and in addition to the other error sources described.

VI-F. Systematic Phase Delay Errors

Antenna cable length and other fixed delays that are part of the signal path can contribute systematic phase delay errors. These systematic errors can be calibrated and accounted for in various inventive methods presented above. In some embodiments, the systematic phase delays can be removed from the measurement results. In certain embodiments, a calibration of cable length combined with other fixed delays can comprise using any one of the inventive methods to measure tag distance for a particular tag located at a known distance from a reader's antenna. Systematic delays associated with cable length and other reader components can then be determined from the calibration measurement, e.g., the systematic delays can be attributed to any discrepancy between the measured distance and actual distance.

There are additional methods by which some or all systematic phase delays can be determined. In some embodiments, physical cable length can be measured and the RF propagation velocity on the cable used to determine a phase delay associated with the cable. In some embodiments, a network analyzer can be used to measure phase delays associated with cables and other fixed delays in the signal path. In certain embodiments, systematic dispersive effects in cables can be calibrated and removed from measurement results, however dispersion in quality RF cables tends to be small and not a significant source of error for the inventive tag range measurement methods.

VII. Applications

The RFID system 100, as depicted in FIGS. 1A-1B and methods described in Sections IV-V are useful for a variety of applications. In one application, the system and methods provide assistance in determining a substantially precise location of a tagged object, which is within the broadcast-and-receive range of the tag reader 110. In such an application, a tag 120*a* with a unique identification number may be affixed to an object, e.g., on an article or object located within a group of packaged goods, on an article located on a conveyor belt, on an article or box of goods located within a storage facility, attached to a mobile vehicle, disposed on or within an animal or human subject, disposed on a parcel or package sent by a sender to a particular destination. A hand-held reader 110 brought within the broadcast-and-receive range of the tag can determine substantially the presence, identity, location, radial velocity, and directional velocity of the tag according to the methods described in Sections IV-V.

Another application for the RFID system 100 enables determination of a tag's position in a conveyor process to assist in culling or sorting tagged objects by identifier codes. For example, manufactured items can be assigned unique RFID identifier codes, such as EPC values. The identifier codes may include information particular to each item, e.g., color, size, optional features, etc. The objects may be loaded in no organized manner onto a conveyer belt system, which may have one or more tag readers mounted adjacent to the belt. The tag readers may be in communication with automated robotic arms and conveyer drive controls in some embodiments. Since the belt restricts motion of the tagged objects to one dimension in a known direction, the tag reader can determine the location of a tagged object on the belt unambiguously. An operational method for this application would include singulating a tag, and executing a range-determination algorithm at a first time $t_1$ to yield a first distance $d_1$ between the tag reader 110 and the singulated tag 120d. A second measurement can be made at a second time $t_2$ to yield a second distance $d_2$. Data from the two measurements can be processed to determine the rate of motion or velocity of the tagged object and its motion with respect to the tag reader 110, e.g., moving toward the reader at a velocity v. The velocity can be determined from the following equation.

$$v = \frac{d_1 - d_2}{t_1 - t_2} \quad \text{(EQ. 22)}$$

A negative value of v indicates that the tagged object is moving toward the reader, and a positive value of v indicates the tagged object is moving away from the reader. Provided the conveyer moves at a substantially constant speed, the location of the tagged object can be predicted for all subsequent times, and a tag reader can pass this information on to any automated apparatus with which it communicates. For example, this may be used to instruct an automated robotic arm to pick an item from the conveyed items.

Another application for the inventive apparatus and methods comprises determining whether an RFID tag, or tag attached to an object, is located in a pre-assigned position. After a tag's location is determined, this method can comprise comparing, by the processor 210, the determined location of the RFID tag to a pre-assigned position for the tag, and displaying, by the tag reader, information representative of the extent to which the measured location agrees with the pre-assigned location for the tag. This method can be useful in applications such as pre-assigned seating, pre-assigned parking, pre-assigned standing, e.g., standing at the start of large footraces, or ordered storage or packaging of goods.

Another application for the inventive RFID system can be providing assistance and verification of pallet packing. In high-volume distribution operations, shipping pallets can be packed with a variety of items. In some instances, it may be desirable to locate particular items a pre-selected positions within a completed pallet. This may facilitate the unpacking of the pallet at its destination. Additionally, the placement or large heavy items at the base of a pallet may prevent damage to more fragile objects placed near the top of the pallet, and reduce the chance of a pallet tipping over during transportation. The location of a particular item, or items, within a pallet can be determined by the three-dimensional operational method for determining a tag's location as described in Section V-A.

During pallet packing, the monitoring of an item's position, and orientation, can provide feedback to assist in placing the item at a desired location, in a desired orientation, on a pallet. For example, if an item is known to be heavy, or identified as such via its RFID tag, then the item will desirably be located near the base of a pallet. For items that should be packed in a preferred orientation, e.g., one end up, two RFID tags could be attached to the item, or its package, to enable RFID determination of the item's orientation when placed on the pallet. For items that should be packed in an "up" orientation along with a particular rotational orientation, e.g., a damage-resistant side facing outward on the pallet, three RFID tags attached to an item would resolve both up-down and rotational orientations. In certain embodiments, two RFID tags are placed on an object to resolve its orientation in two dimensions, and three tags are place on an object to resolve its orientation in three dimensions. The use of multiple RFID tags on objects may become more common and widely used for packaged or boxed items, for which the tags are located on the package or box. In some embodiments, the RFID tags can be placed substantially at "grab" points on an item or package, and be used in automated packing to guide a robotic arm to grasp the item or package at the grab points. The inventive RFID system can be used to determine object orientation and object position, and to provide feedback-assisted pallet packing.

In certain embodiments, a tag reader 110 may be interfaced with four antennas located substantially along orthogonal X, Y, and Z directions, as may be more convenient in shipping and receiving facilities. The four antennas could be located at positions $(x_1, y_1, z_1)$, $(x_2, y_2, z_2)$, $(x_3, y_3, z_3)$, and $(x_4, y_4, z_4)$, and would eliminate the need for moving the reader to separate measurement points. The positions, in three dimensions, for all the tags on a pallet can then be determined and compared to the desired positions, e.g., positions based upon a selected packing algorithm. Accordingly, pallet packing can be verified with the inventive RFID system.

The RFID system can be useful for unpacking of pallets, particularly when searching for a desired item within a large pallet. It will be appreciated that any of the tag-locating methods described in Section V-A can guide the unpacker as to how deep in a pallet it will be necessary to dig in order to find a first desired object. After obtaining a first item, the resulting jumble of unpacked items can be scanned again to assist in locating a second object. This may be repeated as needed for locating further objects.

Another application for the RFID system 100 relates to accuracy of inventoried items. In certain instances, an accurate inventory of items depends upon their range or distance from the reader. As an example, a scenario of taking inventory of received items on multiple pallets is considered. A tag reader having no range-determination algorithm brought near one pallet may excited tags on multiple adjacent pallets, and give an inaccurate inventory of items on the single pallet. A correct inventory can be determined with the inventive RFID reader 110 and methods by only counting those items within a selected distance, e.g., a distance approximately equivalent to the diagonal size of a scanned pallet when the reader is held in close proximity to the pallet.

EXAMPLES

Example 1

An RFID tag reader (denoted as a model Mercury 4 reader) was made in accordance with the diagram of FIG. 3, and the reader was used to acquire multiple samples of backscattered data from a Class 1 Gen2 RFID tag. The acquired data was raw I-Q data samples as a function of both tag distance and reader frequency, e.g., the data output from the A/D converters 360 in FIG. 3. Data was acquired in two trials at two distances and also in one trial at a third distance. Computer code comprising several software functions were written in Matlab to read the I-Q data and calculate phase delay angles from the I-Q data, and to determine a distance between the tag reader and RFID tag in accordance with the method of fitting a period function to the phase delay data described in Sections IV and in particular IV-E-2.

This disclosure contains one embodiment of the Matlab code and functions used to demonstrate inventive methods described in Section IV. For this example, raw I-Q data, obtained with the Mercury 4 reader, is stored in a directory by a know method, one EPC read per file. The frequency $f_n$ of the EPC read and tag distance (measured with a tape measure) is noted in the file name. Matlab function decoder_file_scan3 reads the I-Q data from the stored files for as many frequencies as are available for a given trial at a given tag distance, so that the data can be processed according to the inventive method.

Decoder_file_scan3 then calls decoder_8_LVPTL1 with I-Q data for a particular read frequency $f_n$. Decoder_8_LVPTL1 hands this data in turn to function IQ_rotator_PTL2. IQ_rotator_PTL2 makes an initial guess $\theta_r$ at the phase delay angle $\Delta\theta_n$, and then processes the data in accordance with the method depicted in FIG. 7. In particular, the initial guess $\theta_r$ is continually revised to obtain an estimate of the actual phase delay angle $\Delta\theta_n$. With each iteration the value of the guessed angle $\theta_r$ is passed back to decoder_8_LVPTL1 and in turn to decoder_file_scan3. For this embodiment, the returned guesses of phase delay angles provide a list of angles that IQ_rotator_PTL2 developed in the course of refining $\theta_r$. Function decoder_file_scan3 processes a latter portion of the list, for which the guessed angle has had time to settle substantially close to the actual phase delay angle $\Delta\theta_n$. Function decoder_file_scan3 averages the later portion of the guessed-angle list to determine an estimate of the actual angle $\Delta\theta_n$ and associates it with the carrier-wave frequency $f_n$ broadcasted by the reader for the measurement. After similarly processing all I-Q data for the various broadcasted frequencies, decoder_file_scan3 provides a list of frequencies $f_1, f_2, f_3, \ldots, f_{max}$ and a corresponding list of angles $\Delta\theta_1, \Delta\theta_2, \Delta\theta_3, \ldots, \Delta\theta_{nmax}$ for further processing.

The list of frequencies and the list of angles returned by decoder_file_scan3 can then be used to estimate a tag range or distance based upon the inventive method described in Section IV-E-2. The function range_fit1 can be called with the two lists of frequencies and phase delay angles as arguments to initiate processing in accordance with the inventive method. Function range_fit1 calculates a phase delay angles that would be expected theoretically from a tag located a particular guessed distance from an RFID tag reader's antenna. The calculated angles are restricted to a range between about 0 and about $\pi$ radians. The function then determines a sum of square errors for the particular guessed distance. The function repeats the steps of calculating phase delay angles, restricting values of the calculated angles, and determining a sum of square errors for different values of guessed distances which traverse the expected range of tag distances. For the embodiment of this example, function range_fit1 uses an increment of 1 mm for incrementing guessed distances during the traversal of the expected range of tag distances. The values of guessed distances and associated sums of errors are stored into a list, which can be plotted.

As noted, the function range_fit1 applies modulo division to bring calculated phase delay angles into a range of between about 0 and about $\pi$ radians. This is done to avoid erroneously large errors which can result from comparing unwrapped calculated phase delay angles with wrapped phase delay angles determined from processing of the I-Q data. Restriction of the calculated phase delay angles to a range between about 0 and about $\pi$ radians is used rather than a range between about 0 and about $2\pi$ radians, because the range of phase delay values returned by IQ_rotator_PTL2 is between about 0 and about $\pi$ radians.

Figure 13B:
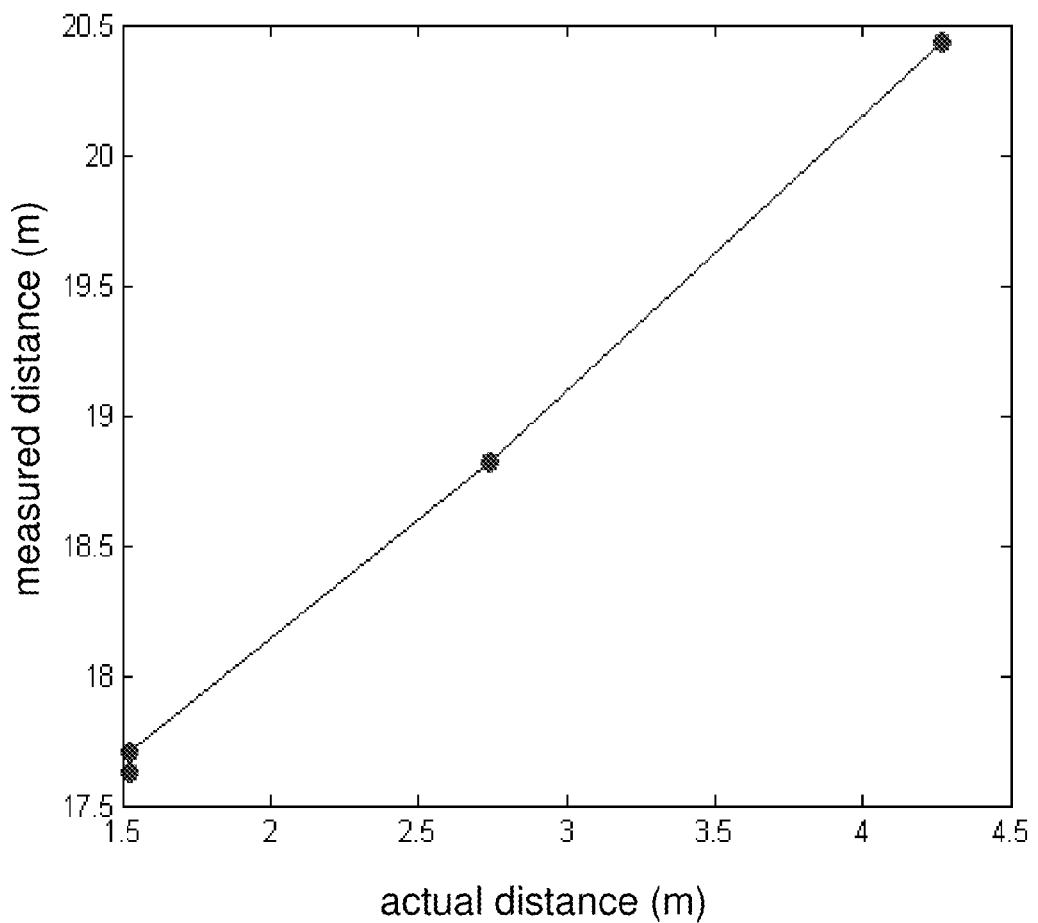
FIG. 13B shows measured tag ranges, or measured distances, plotted against actual tag distances. Tag range measurements were carried out with an RFID tag reader for three tag distances, and the resulting data was processed according to a "sum of squared errors" method.

A plot of the sums of errors as a function of guessed distances is shown in FIG. 13A. This plot was generated from the data used to obtain the plots in FIG. 9B. The list of sums of square errors is examined for its absolute minimum, and the guessed distance associated with that minimum is returned as a best estimate of tag range. FIG. 13B provides a comparison of calculated tag distances from I-Q data derived from five trials at three tag ranges with the actual measured values of tag distances for the trials. Two trials were carried out for a tag distance of 5 feet, one trial was done for a tag distance of 9 feet, and two trials for a tag distance of 14 feet. The discrepancy between calculated and measured distances is attributable to systematic phase delays in the signal path associated with antenna cables and certain RF components in the tag reader. A calibration process can account for the discrepancy, so that systematic phase delays can be removed from the data. Theoretically, the data of FIG. 13B should lie on a substantially straight line. These results indicate that the inventive methods can provide a substantially accurate estimate of tag range.

Example 2

Figure 14A:
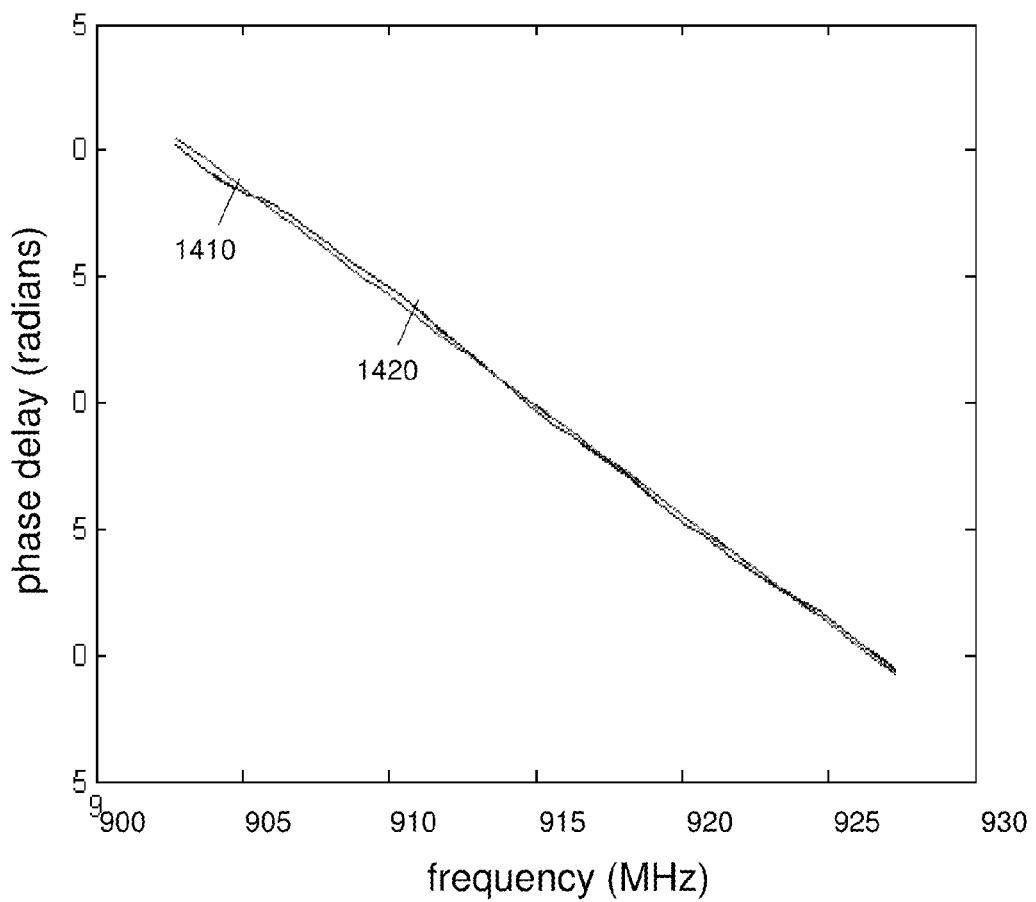
FIG. 14A shows a plot, curve 1410, of unwrapped phase delay angles as a function of carrier-wave frequency which were determined from I-Q data generated during a tag range measurement with an RFID tag reader. A best-fit line, curve 1420, is also plotted which can provide an estimate of tag range distance.
Figure 14B:
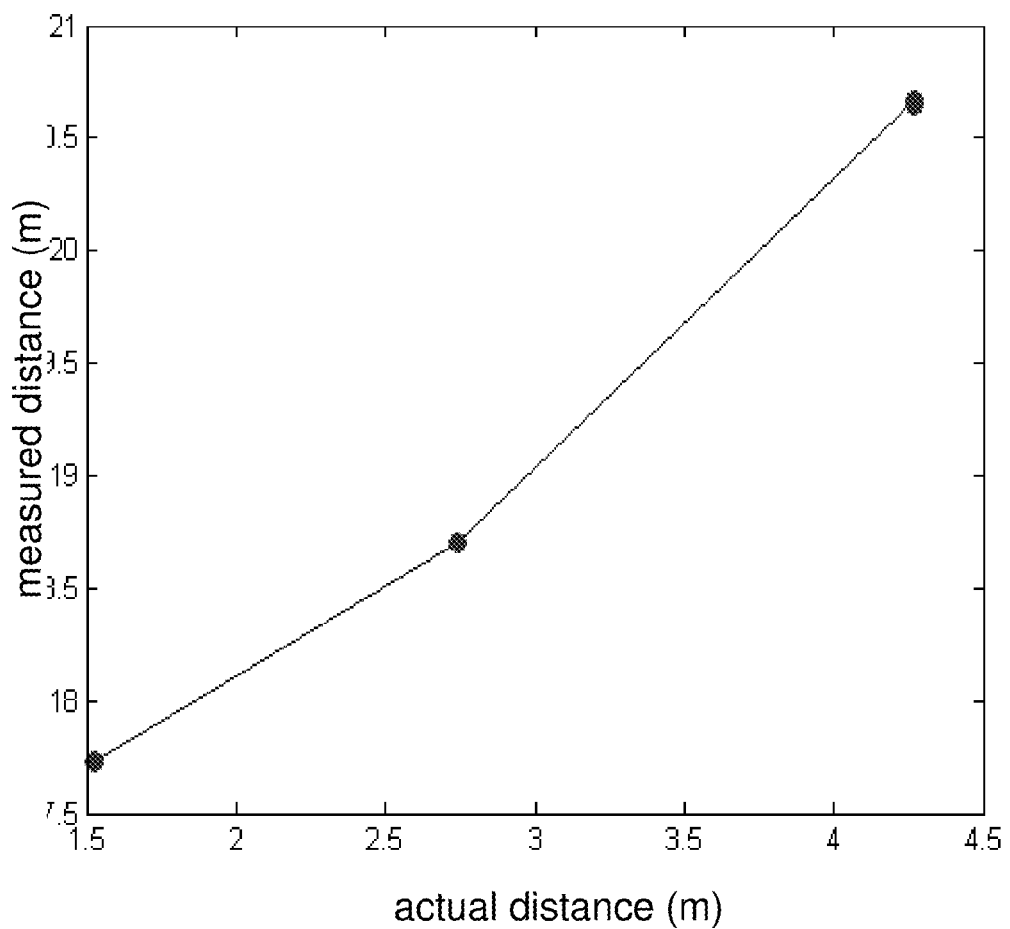
FIG. 14B shows measured tag ranges, or measured distances, plotted against actual tag distances. Tag range measurements were carried out with an RFID tag reader for three tag distances, and the resulting data was processed according to a "linear fit" method.

For purposes of comparison and potential development of an additional method to determine tag range, software was developed to determine tag range in a manner similar to that described in U.S. Pat. No. 7,199,738. For this method of determining tag range, a MatLab function range_fit_M3_1 was developed as provided in the Appendix and in accordance with the linear fit method described in Section IV-E-1. Arguments provided to this function are the list of frequencies and the list of determined phase delay angles returned by decoder_file_scan3 as described in Example 1. The function range_fit_M3_1 unwraps the phase delay angles returned by the decoder_file_scan3 function, and performs a least squares fit of a line to the data. The slope of the line is extracted and used to determine a value for the estimate of tag range. FIG. 14A is a plot of unwrapped phase delays 1410 determined from I-Q data for a tag located about 14 feet from a tag reader's antenna. The graph of FIG. 14A also includes a plot of calculated phase delay angles for a best-fit line 1420 to the data. For this example, the same data of Example 1 was used, i.e., the same I-Q samples from measurements performed for the five trials at three distances, and the results are plotted in FIG. 14B. As in Example 1, the discrepancy between calculated and measured distances is attributable to systematic phase delays in the signal path associated with antenna cables and certain RF components in the tag reader. The data of FIG. 14B shows less linearity that the data of FIG. 13B, which indicates that the inventive method of fitting a periodic function to the data used in Example 1 has better immunity to signal noise than the method used for this example.

The following computer code is one embodiment of code written for MatLab software and used to process the data of Examples 1 and 2. It is understood that some or all steps described herein may be embodied in code written in any type or form of programming language and may be used with any type or form of software.

Tag Range Determination Code

The following code is one embodiment of code developed for determining tag range.

```
function [freq_list, ang_list, o1, o2] = decoder_file_scan3(range, trial, flag)
% data_dir = 'C:\Gen2\Tag_data\091305\SPv2m4-100179-backrange\';
data_dir = 'C:\Gen2\Tag_data\110105\m4-101450-6779728414\';
% list = dir([data_dir, 'rx_17*10.dat']);
feet_range = range;
% trial = 12; passed in as argument2
EPC_code = '0x1d0f';
%file_name = ['rx_', sprintf('%02d', feet_range), '_', sprintf('%6d', freqi),'_', sprintf('%02d',trial),'_', EPC_code, '.dat'];
file_name_less_freq = ['rx_', sprintf('%02d', feet_range), '_', '*','_', sprintf('%02d',trial),'_', EPC_code, '.dat'];
list = dir([data_dir, file_name_less_freq]);
freq_list = [ ];
ang_list = [ ];
for i= 1:length(list);
    % file_name = ['rx_', sprintf('%02d', feet_range), '_', sprintf('%6d', freqk),'_', sprintf('%02d',trial),'_',
EPC_code, '.dat'];
    file_name = list(i).name;
    [token1, sub_string]=strtok(file_name,'_');
    [token2, sub_string]=strtok(sub_string,'_');
    [token3, sub_string]=strtok(sub_string,'_');
    freqi = str2num(token3); % frequency is third field in file name
    freq_list = [freq_list, freqi];
        disp([file_name, ' ', token3]);
        data = loaddat([data_dir, file_name]);
        datad = data -(data > 5000 )*2^15; % the MSB is a clip bit, mask it off
        datac = complex(datad(1:2:end-1), datad(2:2:end));
        if length(datac) == 0 % list(i).bytes==0
            angle = 0; % skip
        else
            figure(1);
            plot(datac);
            axis([0 4096 0 4096]);
            pause(0.3);
            [bits struct] = decoder_8_LVPTL1(datac);
            list(i).bits = bits;
            figure(2);
            decoder_plot1(struct);
            angle = mean(struct.angle(1000:end-500));
        end
        ang_list = [ang_list, angle];
end
o1 = list;
o2= 1;
function [bits, struct] = decoder_8_LVPTL1(data)
% 8-12-05 Add delay on samp_r path to bit_time_chooser JCC
% 10-28-05 Change IQ rotator to phase tracking loop. Add angle to
% structure. JCC
% 10-31-05 Change samp_f2 to samp_pll from soft clip to hard clip. JCC
% 10-31-05 Change bit_time_chooser to longer correlation fitler JCC
if isreal(data)
        % data is i, q i , q, ... format from reader
        data = data -(data > 5000 )*2^15; % the MSB is a clip bit, mask it off
        data = complex(data(1:2:end-1), data(2:2:end));
end
bits = [ ];
struct = [ ];
BOXCAR = 128;
FIR_coef1 = [-0.0039995,-0.0070327,-0.010035,-0.012308,-0.0132,-0.01232,-0.0097177,-0.0059821,-
0.0022063,0.000206,-0.0001309,-0.0041842,-0.012125,-0.023083,-0.035119,-0.045472,-0.051047,-
0.049077,-0.037801,-
0.01701,0.011688,0.044981,0.078345,0.10683,0.12599,0.13274,0.12599,0.10683,0.078345,0.044981,0.01
1688,-0.01701,-0.037801,-0.049077,-0.051047,-0.045472,-0.035119,-0.023083,-0.012125,-0.0041842,-
0.0001309,0.000206,-0.0022063,-0.0059821,-0.0097177,-0.01232,-0.0132,-0.012308,-0.010035,-
0.0070327,-0.0039995;];
FIR_coef2 = [-0.00023785,0.0027302,0.0062795,0.010538,0.013126,0.012523,0.0079085,0.00037451,-
0.0074626,-0.012568,-0.013195,-0.010032,-0.0059727,-0.0043609,-0.0065716,-0.010466,-0.011002,-
0.0031465,0.014272,0.036097,0.051745,0.049795,0.024397,-0.019864,-0.067764,-0.098891,-0.096771,-
0.057388,0.0073572,0.073526,0.11502,0.11502,0.073526,0.0073572,-0.057388,-0.096771,-0.098891,-
0.067764,-0.019864,0.024397,0.049795,0.051745,0.036097,0.014272,-0.0031465,-0.011002,-0.010466,-
0.0065716,-0.0043609,-0.0059727,-0.010032,-0.013195,-0.012568,-
0.0074626,0.00037451,0.0079085,0.012523,0.013126,0.010538,0.0062795,0.0027302,-0.00023785;];
PHASE_DET_GAIN = 0.5; % volts / radian
VCO_GAIN = 2*pi*100E3; % rad/sec/volt
pll_bw = 50E3;    % Hz
PLL_DAMPING = 0.8;    % ratio
CAP = 100E-9;    % Farad
[r1, r2] = bw_eta_r_calc_LV1(pll_bw, PLL_DAMPING, PHASE_DET_GAIN, VCO_GAIN, CAP);
DELAY = round(0.5* (length(FIR_coef1) +length(FIR_coef2))); % round so as to fit delay funciton integer
delay.
% reset any functions with history
```

```
IQ_rotator_PTL2(data(1), 1, 1); %was IQ_rotator_LV1(1, BOXCAR, 1);
FIR1_apply_LV1( 0, FIR_coef1, 1 );
FIR2_apply_LV1( 0, FIR_coef2, 1 );
sin_drive_PLL_LV1(0, PHASE_DET_GAIN, VCO_GAIN, r1, r2, CAP, 1);
bit_time_chooser4_LV1( 0, 6.4, 0, 1);
pll_bw_state_LV1(0, 1);
delay(0, DELAY, 1);
% debug storage
samp_r_list = [ ];
angle_list = [ ];
samp_pll_list = [ ];
vco_phase_list = [ ];
vco_control_list = [ ];
bit_out_list = [ ];
bit_time_list = [ ];
clock_edge_list = [ ];
state_list = [ ];
substate_list = [ ];
pll_bw_list = [ ];
for i=1:length(data)
        %disp('i = '); disp(i); % debug
        % decoder actually starts here:
        [c_out, samp_r, angle] = IQ_rotator_PTL2(data(i), 64, 0); % was [c_out, samp_r] = IQ_rotator_LV1(
data(i), BOXCAR, 0 );
        samp_f1 = FIR1_apply_LV1( samp_r, FIR_coef1, 0 );
        samp_sq = samp_f1 .^ 2 ;
        samp_f2 = FIR2_apply_LV1(samp_sq, FIR_coef2, 0 );
        samp_pll = sign(samp_f2); % soft clip for amp_f2 amplitude < 10: samp_pll = atan(samp_f2)/(pi/2);
        [vco_phase, vco_control] = sin_drive_PLL_LV1(samp_pll, PHASE_DET_GAIN, VCO_GAIN, r1, r2, CAP,
0);
        samp_dly = delay(samp_r, DELAY, 0); % 8-12-05 JCC
        [bit_out, bit_time, clock_1_edge, state, substate] = bit_time_chooser4_LV1( samp_dly, vco_control,
vco_phase, 0);
        if clock_1_edge && bit_time && (state == 5)
            bits = [bits, bit_out];
        end
        pll_bw = pll_bw_state_LV1(clock_1_edge, 0);
        [r1, r2] = bw_eta_r_calc_LV1(pll_bw, PLL_DAMPING, PHASE_DET_GAIN, VCO_GAIN, CAP);
        % debug
        angle_list = [ angle_list, angle];
        samp_r_list = [samp_r_list, samp_r];
        samp_pll_list = [samp_pll_list, samp_pll];
        vco_phase_list = [vco_phase_list, vco_phase];
        vco_control_list = [vco_control_list vco_control];
        bit_out_list = [bit_out_list, bit_out];
        bit_time_list = [bit_time_list, bit_time];
        clock_edge_list = [clock_edge_list, clock_1_edge];
        state_list = [ state_list, state];
        substate_list = [ substate_list, substate];
        pll_bw_list = [ pll_bw_list, pll_bw];
end
struct.angle = angle_list;
struct.samp_r = samp_r_list;
struct.samp_pll = samp_pll_list;
struct.vco_phase = vco_phase_list;
struct.vco_control = vco_control_list;
struct.bit = bit_out_list;
struct.bit_time = bit_time_list;
struct.clock = clock_edge_list;
struct.state = state_list;
struct.substate = substate_list;
struct.pll_bw = pll_bw_list;
end % decoder_6_LV1
function sample_out = delay(sample_in, delay_count, reset)
persistent history;
if reset
        history=zeros(1,delay_count);
end
sample_out = history(end);
history = [sample_in, history(1:end−1)];
end % function delay
function [c_samp_out, real_out, ang_out] = IQ_rotator_PTL2(c_samp_in, iir_area, reset)
% change rotator from
% getting angle from linear regression
% to angle tracking loop
% JCC 8-13-05
% change box car average to one pole IIR average
% JCC 10-28-05
persistent mean_history; % this is the IIR mean value of samples to zero center on. It is complex.
persistent theta ; % the rotation angle that starts as a guess and then tracks to desired value
```

```
GAIN = -0.0001;
if or(reset==1, isempty(theta))
        mean_history= c_samp_in;
        samp1_real = real(c_samp_in) - 2048;
        samp1_imag = imag(c_samp_in) - 2048;
        % pick a starting angle based on the first sample
        if   abs(samp1_real)>(4*abs(samp1_imag))
             theta = 0;
        elseif abs(samp1_imag)>(4*abs(samp1_real))
             theta = pi/2;
        elseif sign(samp1_real) == sign(samp1_imag)
             theta = pi/4;
        elseif sign(samp1_real) == -sign(samp1_imag)
             theta = -pi/4;
        else
             theta = pi/3;
        end
end
mean_history = ((mean_history * iir_area ) + c_samp_in)/ (iir_area+1) ;
rotation = complex(cos(theta), sin(theta));
c_samp_out = rotation * (c_samp_in - mean_history);
real_out = real(c_samp_out);
i_error = imag(c_samp_out)*sign(real_out);
% Approximates atan(imag(c_samp_out), real(c_samp_out)) * Weight,
% where Weight is proportional to ABS(real(c_samp_out)),
% JCC 8-23-05
angle_adjust = GAIN * i_error;
if abs(angle_adjust) > 0.174 % if error is greater than 10 degrees, clip to 10 degrees = 0.174 radian
        angle_adjust = sign(angle_adjust)*0.174;
end
theta = theta + angle_adjust;
ang_out= theta;
```

Periodic Functional Fit

The following portion of code is one embodiment of code developed for processing I-Q data according to the method comprising fitting a periodic function to the data.

```
function [range, sqr_error] = range_fit1(freq_list, ang_list)
% plot angel vs frequency,
% make ideal range vs frequency = angle of exp(j*2*pi*f*range/300e6)
% sweep range and plot sum_sqr_angle_error vs range
% find minimum error
% return
% JCC 11-27-05
% [fl, al_r05_t08, o1, o2]=decoder_file_scan2
% plot(fl, mod(al_r05_t08,pi))
% plot(fl, angle(exp(j*2*pi*fl*1e3*(-41.460)/300e6)), 'm');
figure(1);
ang_list_ravel = mod(ang_list, pi);
plot(freq_list, ang_list_ravel, 'b');
hold on;
figure(2);
fplot(@(range_guess) make_sqr_error(range_guess, freq_list, ang_list_ravel), [30 43]);
figure(3);
fplot(@(range_guess) make_sqr_error(range_guess, freq_list, ang_list_ravel), [37 39]);
range_list = [30:0.001:43]; % increment at 1 cm.
for i= 1:length(range_list)
      range_guess = range_list(i);
      sqr_error_list(i) = make_sqr_error(range_guess, freq_list, ang_list_ravel);
end % for i
figure(4);
plot ( range_list, sqr_error_list);
min_sqr_error = min(sqr_error_list);
index_list = find( sqr_error_list == min_sqr_error)
if length(index_list)>1
     disp('index_list > 1!!');
end % if length(index_list)
range = range_list(index_list);
sqr_error = sqr_error_list(index_list);
disp('range_list'); disp( range);
ideal_ang_ravel = make_ideal_angle(range, freq_list);
figure(1);
plot (freq_list, ideal_ang_ravel, 'r');
end % range_fit1
```

```
function ideal_ang_ravel = make_ideal_angle(range_guess, freq_list)
ideal_ang = -2*pi*freq_list*1e3*(range_guess)/300e6 ; % or equals
angle(exp(j*2*pi*freq_list*1e3*(ideal_range)/300e6));
ideal_ang_ravel = mod( ideal_ang, pi);
end % make_ideal_angle
---------
function sum_sqr_error = make_sqr_error(range_guess, freq_list, ang_list_ravel)
ideal_ang_ravel = make_ideal_angle(range_guess, freq_list);
error1= mod( ang_list_ravel - ideal_ang_ravel , pi);
sqr_error = error1 .^ 2;
sum_sqr_error = sum( sqr_error);
end % sum_sqr_error
```

Linear Fit Method

The following portion of code is one embodiment of code developed for processing I-Q data according to the linear fit method.

```
function [range, range2, sqr_error] = range_fit_M3_1(freq_list, ang_list)
% plot angel vs frequency,
% make ideal range vs frequency = angle of exp(j*2*pi*f*range/300e6)
% sweep range and plot sum_sqr_angle_error vs range
% find minimum error
% return
% JCC 11-27-05
% [fl, al_r05_t08, o1, o2]=decoder_file_scan2
% plot(fl, mod(al_r05_t08,pi))
% plot(fl, angle(exp(j*2*pi*fl*1e3*(-41.460)/300e6)), 'm');
% change to patent, 1 Dec 05 draft method 3. JCC 12-1-05
figure(1);
ang_list_ravel = mod(ang_list, pi);
plot(freq_list, ang_list_ravel, 'b');
hold on;
figure(2);
jump = ang_list_ravel(1:end-1) - ang_list_ravel(2:end);
pi_pip = jump<-1 ;
for index = 1 :length(pi_pip)
    pi_add(index) = pi*sum(pi_pip(1:index));
end
ang_list_unravel = [ang_list_ravel(1), ang_list_ravel(2:end) - pi_add];
plot(freq_list, ang_list_unravel, 'b');
hold on;
[coefs, S1]=polyfit(2*pi*freq_list, ang_list_unravel, 1); % frequencies were in KHz!
% units of coef(1) is rad/(Kilorad/sec)
plot(freq_list, (coefs(1)*2*pi*freq_list + coefs(2)), 'r' );
range_time = -coefs(1)/1e3; % frequencies were in KHz!
range = range_time * 300e6;
figure(1);
plot (freq_list, mod((coefs(1)*2*pi*freq_list + coefs(2)), pi), 'g' );
end % range_fit_M3_1
```

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used herein are for organizational purposes only and are not to be construed as limiting the subject matter described in any way.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method of determining a position of a radio-frequency identification (RFID) tag, the method comprising:
    broadcasting, by the tag reader, interrogation signals to the tag at a plurality of discrete frequencies;
    receiving, by the tag reader, returned signals from the tag in response to the interrogation signals;
    determining, by a phase estimator, a phase delay associated with each of the returned signals;
    monitoring, by the phase estimator, an uncertainty associated with each determined phase delay of each received signal;
    assigning, by a processor, a weighting coefficient to each determined phase delay, the weighting coefficient based upon the uncertainty associated with each determined phase delay;
    producing, by the processor, a data set comprising determined phase delays, frequencies associated with the phase delays, and weighting coefficients associated with the phase delays; and
    determining, by the processor, a distance between the RFID tag and the RFID tag reader using at least a portion of the data from the produced data set.

2. The method of claim 1, wherein producing a data set further comprises interpolating phase delay data points between the determined phase delays.

3. The method of claim 1, wherein the evaluation of the Fourier transform comprises determining the location of one or more peaks of the Fourier transform.

4. The method of claim 1 , wherein the determining of phase delays uses an infinite impulse response (IIR) phase-tracking loop, the phase-tracking loop receiving as input in-phase and in-quadrature components of a returned signal and providing as output an estimated phase delay.

5. The method of claim 4 wherein the determining of phase delays further comprises clipping, by the phase estimator, the output of the IIR phase-tracking loop.

6. The method of claim 4 wherein the determining of phase delays further comprises approximating, by the phase estimator, a residual angle of a rotated sample as the ratio of an in-quadrature component to an in-phase component of the rotated sample, and wherein the sample is representative of a phase delay of a returned signal.

7. The method of claim 1, wherein the determining of phase delays uses a first IIR phase-tracking loop providing an estimated phase delay having a first uncertainty and a second IIR phase-tracking loop providing an estimated phase delay having a second uncertainty, the second uncertainty substantially being larger than the first uncertainty.

8. The method of claim 7 wherein the determining of phase delays further comprises clipping, by the phase estimator, the output of at least one of the IIR phase-tracking loops.

9. The method of claim 1 further comprising:
comparing an electronic product code (EPC) value read for the RFID tag at each frequency; and
excluding from the produced data set determined phase delays at each frequency for which the EPC value read is not in agreement with the commonly read EPC value.

10. The method of claim 1 further comprising:
moving, by a user, the tag reader's antenna to plural locations;
repeating the steps of the method of claim 1 at each location; and
calculating, by the processor, a location of the RFID tag from the distances determined at each of plural locations.

11. The method of claim 1, wherein
the step of broadcasting comprises broadcasting the interrogation signals from one of plural antennas in communication with the RFID tag reader; and
the step of receiving comprises receiving the interrogation signals from one of plural antennas in communication with the RFID tag reader.

12. The method of claim 11 further comprising:
repeating, by the tag reader, the steps of the method of claim 11 for each of plural antennas; and
calculating, by the processor, a position of the RFID tag from the distances determined using each of plural antennas.

13. A system of determining a position of a radio-frequency identification (RFID) tag, the system comprising:
a RFID tag reader, broadcasting interrogation signals to a RFID tag at a plurality of discrete frequencies, and receiving returned signals from the RFID tag in response to the interrogation signals; and
a phase estimator, determining a phase delay associated with each of the returned signals, and monitoring an uncertainty associated with each determined phase delay of each received signal; and
a processor, assigning a weighting coefficient to each determined phase delay, the weighting coefficient based upon the uncertainty associated with each determined phase delay, producing a data set comprising determined phase delays, frequencies associated with the phase delays, and weighting coefficients associated with the phase delays, and determining a distance between the RFID tag and the RFID tag reader using at least a portion of the data from the produced data set.

14. The method of claim 1 further comprising:
determining, by the processor, a rate of change of phase delays associated with the returned signals as a function of time; and
calculating, by the processor, a relative velocity between the RFID tag and the RFID tag reader from the rate of change of the phase delay as a function of time.

15. The method of claim 1 further comprising:
comparing, by the processor, the data set with a second data set of a second RFID tag; and
determining, by the processor, proximity of the RFID tag to the second RFID tag based on the comparison.

16. The method of claim 15, wherein comparing comprises calculating a correlation metric based on the data set and the second data set.

17. The method of claim 16, wherein determining proximity of the RFID tag to the second RFID tag further comprises comparing the calculated correlation metric with a threshold.

18. The method of claim 15, wherein determining proximity of the RFID tag to the second RFID tag further comprises estimating the location of the tag relative to the second tag based on a known location of the second tag.

19. The method of claim 15, further comprising:
comparing, by the processor, the data set with a third data set of a third RFID tag, wherein the locations of the second tag and the third tags are known; and
determining, based on the comparison of data sets, the location of the tag relative to the second tag and the third tag.

20. The method of claim 15, wherein the returned signals from the tag include at least one signal from a reflective path.

\* \* \* \* \*